(12) United States Patent
Lee et al.

(10) Patent No.: US 7,706,774 B1
(45) Date of Patent: Apr. 27, 2010

(54) CONTROL SYSTEM FOR ENABLING USE OF WIRELESS TELEPHONES

(75) Inventors: Johng Phil Lee, Teaneck, NJ (US);
Kenneth W. Myers, Ridgewood, NJ (US); Cary H. Solomon, Fair Lawn, NJ (US); Ik Gyon Woo, Fort Lee, NJ (US); Rosanna De La Cruz, Bronx, NY (US); Taewon Cho, Fort Lee, NJ (US); Alexsandr Livshits, East Hanover, NJ (US)

(73) Assignee: Locus Telecommunications, Inc., Englewood Cliffs, NJ (US)

( * ) Notice: Subject to any disclaimer, the term of this patent is extended or adjusted under 35 U.S.C. 154(b) by 636 days.

(21) Appl. No.: 11/500,861

(22) Filed: Aug. 8, 2006

Related U.S. Application Data

(60) Provisional application No. 60/707,284, filed on Aug. 11, 2005.

(51) Int. Cl.
*H04M 11/00* (2006.01)
(52) U.S. Cl. ............ 455/405; 455/408; 455/435.2; 455/445; 379/114.2
(58) Field of Classification Search ......... 455/405–409, 455/410–411, 435.2, 433; 379/114.2; 705/10, 705/14
See application file for complete search history.

(56) References Cited

U.S. PATENT DOCUMENTS

| | | | | |
|---|---|---|---|---|
| 5,420,914 A | * | 5/1995 | Blumhardt | 379/114.09 |
| 5,509,056 A | * | 4/1996 | Ericsson et al. | 379/114.15 |
| 5,577,100 A | * | 11/1996 | McGregor et al. | 455/406 |
| 5,579,379 A | * | 11/1996 | D'Amico et al. | 379/114.01 |
| 5,606,602 A | * | 2/1997 | Johnson et al. | 379/114.02 |
| 5,706,330 A | * | 1/1998 | Bufferd et al. | 455/405 |
| 5,758,288 A | * | 5/1998 | Dunn et al. | 455/456.5 |
| 5,774,535 A | * | 6/1998 | Castro | 379/114.2 |
| 5,799,071 A | * | 8/1998 | Azar et al. | 379/114.02 |
| 5,799,072 A | * | 8/1998 | Vulcan et al. | 379/114.02 |
| 5,815,561 A | * | 9/1998 | Nguyen et al. | 379/115.01 |
| 5,826,185 A | * | 10/1998 | Wise et al. | 455/405 |
| 5,915,214 A | * | 6/1999 | Reece et al. | 455/406 |
| 6,029,062 A | * | 2/2000 | Hanson | 455/408 |
| 6,038,292 A | | 3/2000 | Thomas | |
| 6,064,875 A | * | 5/2000 | Morgan | 455/410 |
| 6,185,413 B1 | * | 2/2001 | Mueller et al. | 455/405 |
| 6,188,752 B1 | | 2/2001 | Lesley | |
| 6,317,490 B1 | * | 11/2001 | Cameron et al. | 379/114.01 |
| 6,330,311 B1 | * | 12/2001 | Mijares et al. | 379/112.01 |
| 6,333,976 B2 | | 12/2001 | Lesley | |
| 6,381,315 B1 | * | 4/2002 | Nhaissi | 379/111 |
| 6,473,500 B1 | | 10/2002 | Risafi et al. | |
| 6,493,547 B1 | * | 12/2002 | Raith | 455/405 |
| 6,532,366 B1 | * | 3/2003 | Chung et al. | 455/445 |
| 6,628,766 B1 | | 9/2003 | Hollis et al. | |

(Continued)

*Primary Examiner*—Sharad Rampuria
(74) *Attorney, Agent, or Firm*—Greenberg Traurig, LLP

(57) ABSTRACT

Disclosed herein is a control system for enabling use of wireless telephones. In an exemplary embodiment of the present invention, each one of the wireless telephones are a prepaid wireless telephone associated with one of a plurality of carrier systems having disparate communication protocols. The control system receives a request having transaction information from a client system and processes the request in accordance with stored procedures corresponding with the associated carrier system. The control system sends the request to the carrier system to case usage of the prepaid wireless telephone to be enabled.

22 Claims, 37 Drawing Sheets

U.S. PATENT DOCUMENTS

| | | | |
|---|---|---|---|
| 6,628,934 B2 * | 9/2003 | Rosenberg et al. | 455/411 |
| 6,654,600 B1 | 11/2003 | Pollak et al. | |
| 6,745,022 B2 * | 6/2004 | Knox | 455/406 |
| 6,751,444 B1 * | 6/2004 | Meiyappan | 455/69 |
| 6,813,497 B2 * | 11/2004 | Hutcheson et al. | 455/453 |
| 6,859,653 B1 * | 2/2005 | Ayoub et al. | 455/435.2 |
| 6,873,690 B2 | 3/2005 | Moon et al. | |
| 6,917,671 B1 * | 7/2005 | Burg | 379/121.02 |
| 7,295,658 B2 | 11/2007 | Moon et al. | |
| 7,437,155 B2 * | 10/2008 | Levitan | 455/433 |
| 7,450,927 B1 * | 11/2008 | Creswell et al. | 455/405 |
| 7,486,945 B2 * | 2/2009 | Senn et al. | 455/406 |
| 7,539,294 B2 * | 5/2009 | Moon et al. | 379/114.2 |
| 7,586,869 B2 * | 9/2009 | Johnson et al. | 370/328 |
| 2002/0076018 A1 | 6/2002 | Banks et al. | |
| 2002/0147764 A1 | 10/2002 | Krupczak | |
| 2002/0153410 A1 | 10/2002 | Santini | |
| 2002/0197964 A1 | 12/2002 | Holmes | |
| 2003/0190908 A1 | 10/2003 | Craven | |
| 2003/0197059 A1 | 10/2003 | Tidball et al. | |
| 2004/0002923 A1 | 1/2004 | Ramaswamy et al. | |
| 2004/0018531 A1 | 1/2004 | Jamieson et al. | |
| 2004/0128237 A1 | 7/2004 | Obe | |
| 2004/0128238 A1 | 7/2004 | Obe | |
| 2004/0137890 A1 | 7/2004 | Kalke | |
| 2008/0125080 A1 * | 5/2008 | Phillips | 455/405 |
| 2008/0232574 A1 * | 9/2008 | Baluja et al. | 379/221.02 |
| 2009/0081989 A1 * | 3/2009 | Wuhrer | 455/406 |
| 2009/0202055 A1 | 8/2009 | Moon et al. | |

* cited by examiner

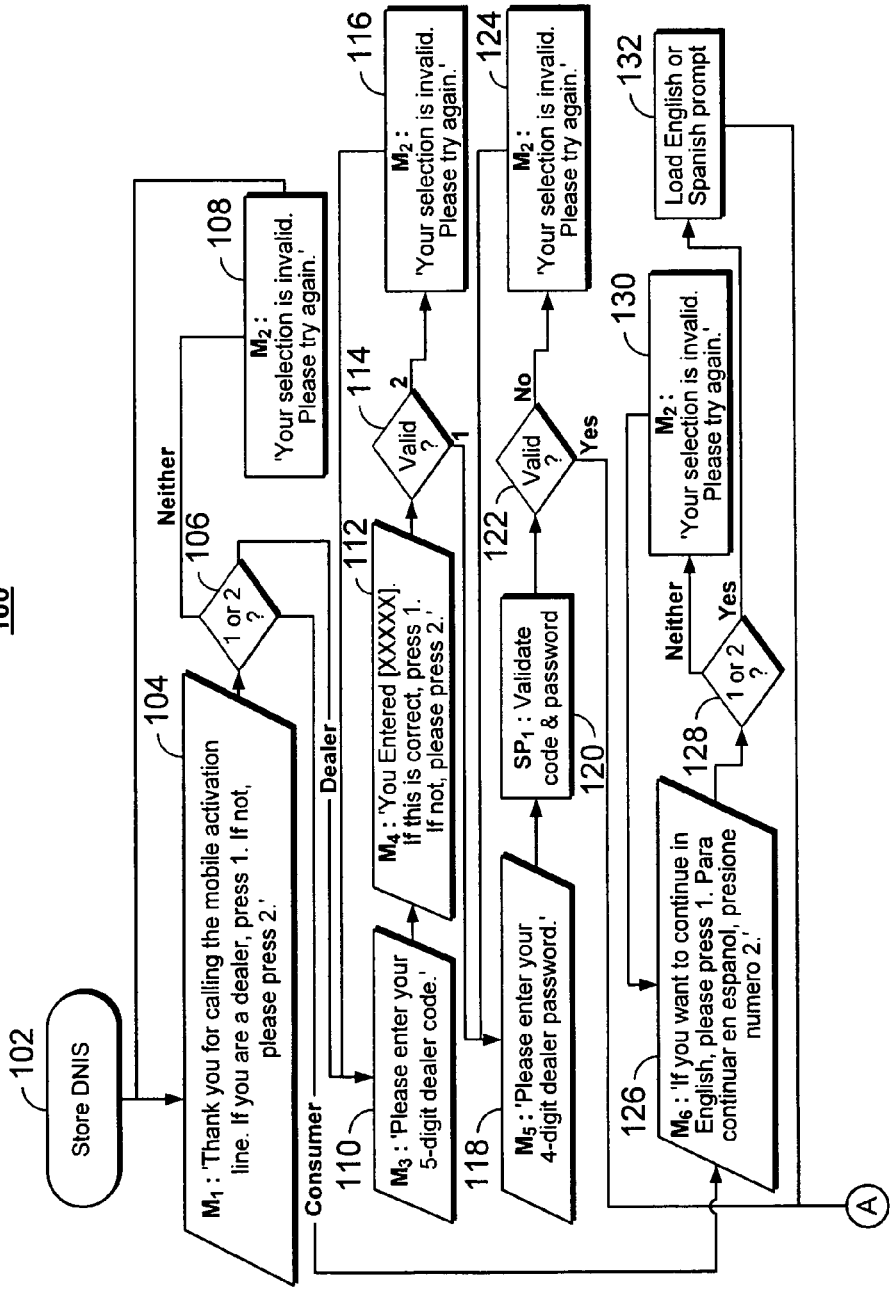

CONTROL SYSTEM FOR ENABLING USE OF WIRELESS TELEPHONES

CROSS-REFERENCE TO RELATED APPLICATIONS

The present application claims the benefit of U.S. Provisional Application No. 60/707,284 filed Aug. 11, 2005, which is hereby incorporated by reference in its entirety for all purposes.

FIELD OF THE INVENTION

The present invention relates generally to systems and methods for enabling use of prepaid wireless telephones. In particular, preferred embodiments of the invention relate to systems and methods that facilitate provisioning prepaid wireless telephones and loading airtime minutes onto accounts associated therewith.

BACKGROUND OF THE INVENTION

Prepaid wireless telephones are typically activated by a carrier of airtime minutes or a reseller thereof, and a user may initiate the activation process by calling the reseller. The caller typically provides the reseller with certain information over the phone relating to the activation process, such as the identity of the caller, the electronic serial number of the prepaid wireless telephone being activated, etc. Each carrier is typically associated with at least two distinct business entities, each of which have their own outdated infrastructures. To activate the prepaid wireless telephone, the reseller must typically undertake a lengthy, burdensome process, whereby a customer service representative places the caller's telephone call on hold, calls a first business to facilitate a provisioning process, and then calls another business to facilitate the process of loading airtime minutes onto an account associated with the prepaid wireless telephone being activated. Compounding these inefficiencies, the various carriers and prepaid wireless telephones utilize disparate communication protocols (e.g., CDMA, TDMA, GSM, etc.), which increases the burden on the reseller.

What is needed in the art is a better system and method for enabling use of the prepaid wireless telephone that overcomes the disadvantages of the prior art.

SUMMARY OF THE INVENTION

The present invention overcomes the disadvantages and shortcomings of the prior art by providing a control system for enabling use of prepaid wireless telephones. Furthermore, in an exemplary embodiment of the invention, each of the prepaid wireless telephones are associated with one of a plurality of disparate communication protocols.

In the exemplary embodiment of the invention, the control system receives transaction information from any of a plurality of client systems, such as a telephonic device and/or computer system. The client systems may be operated by consumer clients, such as end users of the prepaid wireless telephones, and/or dealer clients, such as retailers or distributors. The transaction information, which is further discussed below, may include an electronic serial number, a mobile designation number, and/or other information.

The control system, in the exemplary embodiment, communicates with a plurality of carrier systems having disparate communication protocols. In this regard, the control system communicates with a CDMA carrier system, a TDMA carrier system, a GSM carrier system, and/or another carrier system associated with another communications protocol. The control system provides an enablement request to a corresponding one of the carrier systems to cause enablement of a corresponding one of the prepaid wireless telephones. The enablement request may comprise, for example, a provisioning request, a loading request, an activation request, or a recharge request.

BRIEF DESCRIPTION OF THE DRAWINGS

For a more complete understanding of the present invention, reference is made to the following detailed description of exemplary embodiment(s) considered in conjunction with the accompanying drawings, in which:

FIG. 3b is a schematic diagram showing a plurality of modules of program code stored on the control system and the carrier systems of FIGS. 1 and 2 for implementing the exemplary process flow of FIG. 3a;

FIGS. 5a-d are sections of the flow chart showing preliminary data record creation steps of the enablement method relating to the CDMA phone and the TDMA phone;

DETAILED DESCRIPTION OF THE EXEMPLARY EMBODIMENTS

Figure 1:
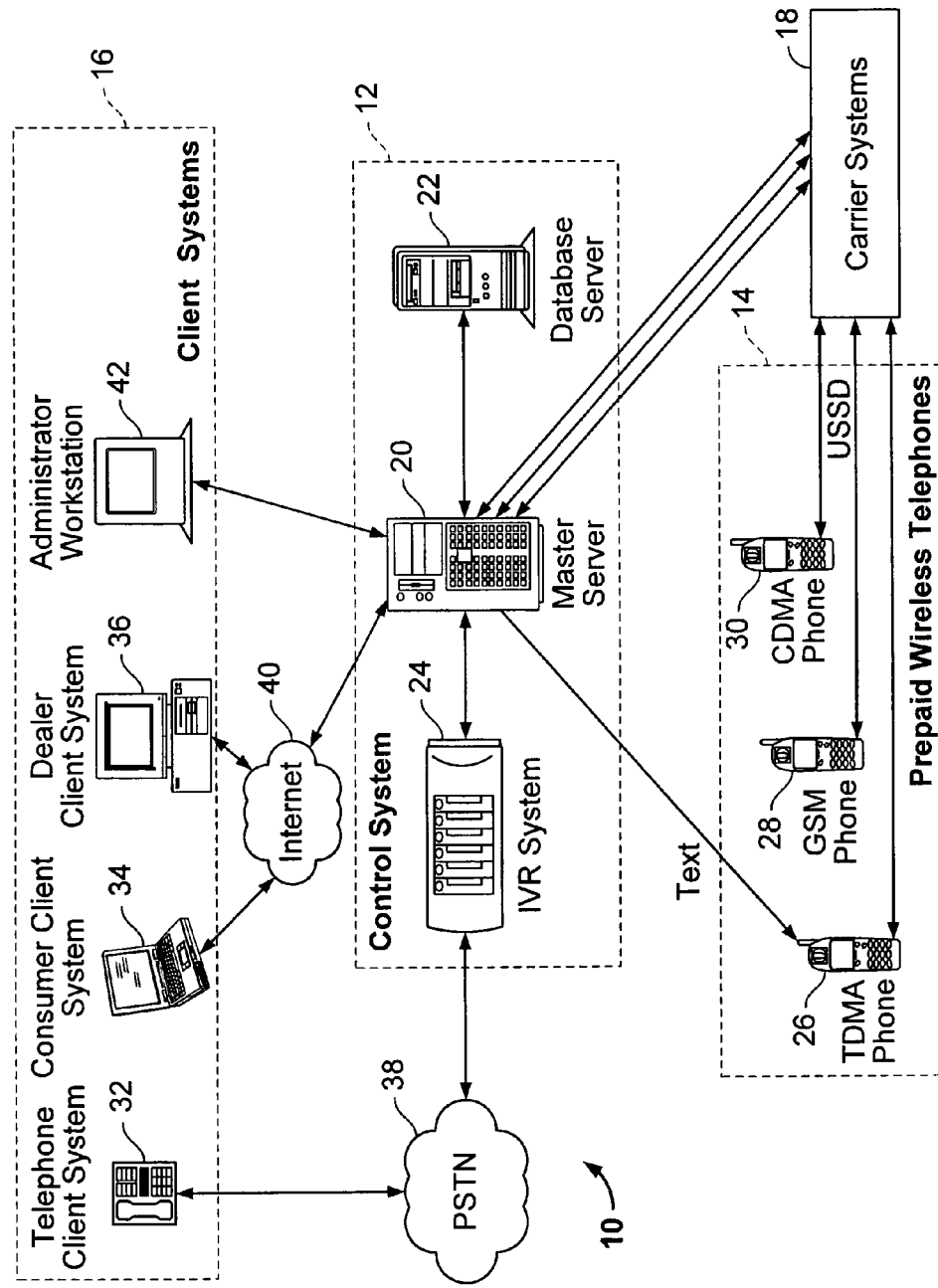
FIG. 1 is a network diagram showing a prepaid wireless communications network that includes a plurality of client systems, a plurality of prepaid wireless telephones including a TDMA phone, a CDMA phone, and a GSM phone, a plurality of carrier systems, and a control system having a master server, a database server, and an IVR system.

Referring to FIG. 1, a prepaid wireless communications network 10 is shown to include a control system 12 constructed in accordance with an exemplary embodiment of the invention. The prepaid wireless communications network 10 further includes a plurality of prepaid wireless telephones 14, a plurality of client systems 16, and a plurality of carrier systems 18, which shall each be discussed below.

It is noted that, as used herein, the terms "enable", "enablement", etc., refer broadly to either or both of the processes of "provisioning" one or more of the prepaid wireless telephones and of "loading" airtime minutes onto one or more accounts associated therewith. In this regard, the terms "activation", "activating", etc. refer to the steps for provisioning coupled with additional steps for optionally loading initial airtime minutes, such as promotional minutes, onto the account, whereas "recharging" refers to the process of adding airtime minutes to the account after activation has occurred.

The control system 12 includes a master server 20, a database server 22, and an interactive voice response (IVR) system 24. The master server 20 and the database server 22 are in communication with one another using sockets, and the master server 20 and the IVR system 24 are also in communication with one another via sockets. The master server 20, the database server 22, and the IVR system 24, each include one or more electronic processing devices, network interface devices, and temporary and/or permanent memory devices, however, they may each include any suitable components known in the art. In an exemplary embodiment of the invention, the master server 20 includes a 2.6 GHZ Intel Pentium 4 Processor, one gigabyte of random access memory, and a plurality of storage drives, and has a Windows 2000 operating system stored thereon. In the exemplary embodiment of the invention, the database server 22 includes Sun Enterprise 3500, six UltraSPARC-II CPUs, a RAID hard drive, six gigabytes of random access memory, and has a Solaris 2.6 operating system stored thereon and an Informix Database Version 9.2.1 stored thereon. The IVR system 24 includes two 1.0 GHZ processors, a RAID hard drive, five T1 cards for simultaneous support of one hundred and twenty channels, and a server. However, the master server 20, the database server 22, and the IVR system 24 may each include any suitable components known in the art.

The prepaid wireless telephones 14 include a TDMA phone 26, a GSM phone 28, and a CDMA phone 30. The TDMA phone 26 is a prepaid wireless telephone operative to communicate using the time division multiple access protocol or another similar protocol. The GSM phone 28 is a prepaid wireless telephone operative to communicate using the global system for mobile communications protocol or another similar protocol. The CDMA phone 30 is a prepaid wireless telephone operative to communicate using the code division multiple access protocol or other similar protocol. As further discussed below, the master server 20 is preferably in communication with the TDMA phone 26 for transmission of a text message via e-mail. As discussed below, the master server 20 may also initiate the sending of a message to the GSM phone 28 from a corresponding one of the carrier systems 18 using Unstructured Supplementary Service Data (USSD) technology. Although not shown, it shall be understood by one skilled in the art that the prepaid wireless telephones 14 of FIGS. 1 and 2 include any desired number and type of prepaid wireless telephones.

As stated above, the prepaid wireless communications network 10 also includes the plurality of client systems 16, such as a telephone client system 32, a consumer web client system 34, and a dealer web client system 36, which each include means for sending transaction information to the control system 12 (e.g., caller inputs) and receiving transaction information (e.g., voice prompts or screen messages) therefrom. One skilled in the art will appreciate that the client systems 16 may include any suitable number and type of client systems for communicating with the control system 12. The telephone client system 32, the consumer web client system 34, and the dealer web client system 36, shall each be discussed below in turn.

The telephone client system 32 communicates with the IVR system 24 via a network, such as the publicly switched telephone network (PSTN) 38 shown in FIG. 1. The telephone client system 32 preferably includes a touchtone telephone (e.g., guided, cellular, home wireless, etc.) for receiving voice and touchtone inputs from a user thereof and for sending transaction information to the IVR system 24. As used herein, the term "transaction information" generally references any and all types of information, data, etc. stored on and/or communicated between the control system 12, the prepaid wireless telephones 14, the client systems 16, and/or the plurality of carrier systems 18. The types and attributes of transaction information shall be further discussed below with reference to an exemplary process flow.

The dealer web client system 36 and the consumer web client system 34 allow dealers (e.g., retailers, distributors, etc.) and consumers, respectively, to communicate with the master server 20 over a network, such as the Internet 40. The consumer web client system 34 and the dealer web client system 36 each include one or more electronic processing devices, network interface devices, memory devices, user input devices, user output devices, etc. As shown in FIG. 1, the consumer web client system 34 includes a wireless laptop computer system and the dealer web client system 36 includes a desktop computer system. However, the consumer web client system 34 and the dealer web client system 36 may each include any suitable hardware and/or software. In this regard, it should be noted that the "consumer" web client system 34 and the "dealer" web client system 36 have been separately designated principally for the purpose of distinguishing between the typical users thereof and the types of transaction information typically communicated therewith.

The client systems 16 include an administrator workstation 42, which is preferably local to the master server 20. The administrator workstation 42 communicates with the master server 20 via sockets. The administrator workstation 42 preferably includes a computer workstation having a client-server relationship with the master server 20, but may include any suitable hardware and/or software. In this regard, it should be noted that the "administrator" workstation 42 has so been designated for the purpose of identifying the typical user thereof, but does not require specific hardware by virtue of so being designated. As will be further discussed below, a caller may telephone (or be transferred to) a customer service representative who uses the administrator workstation 42 to exchange transaction information with the master server 20, so as to facilitate enablement of one of the prepaid wireless telephones 14 associated with the caller. In some embodiments of the invention, the control system 12 comprises the administrator workstation 42.

Figure 2:
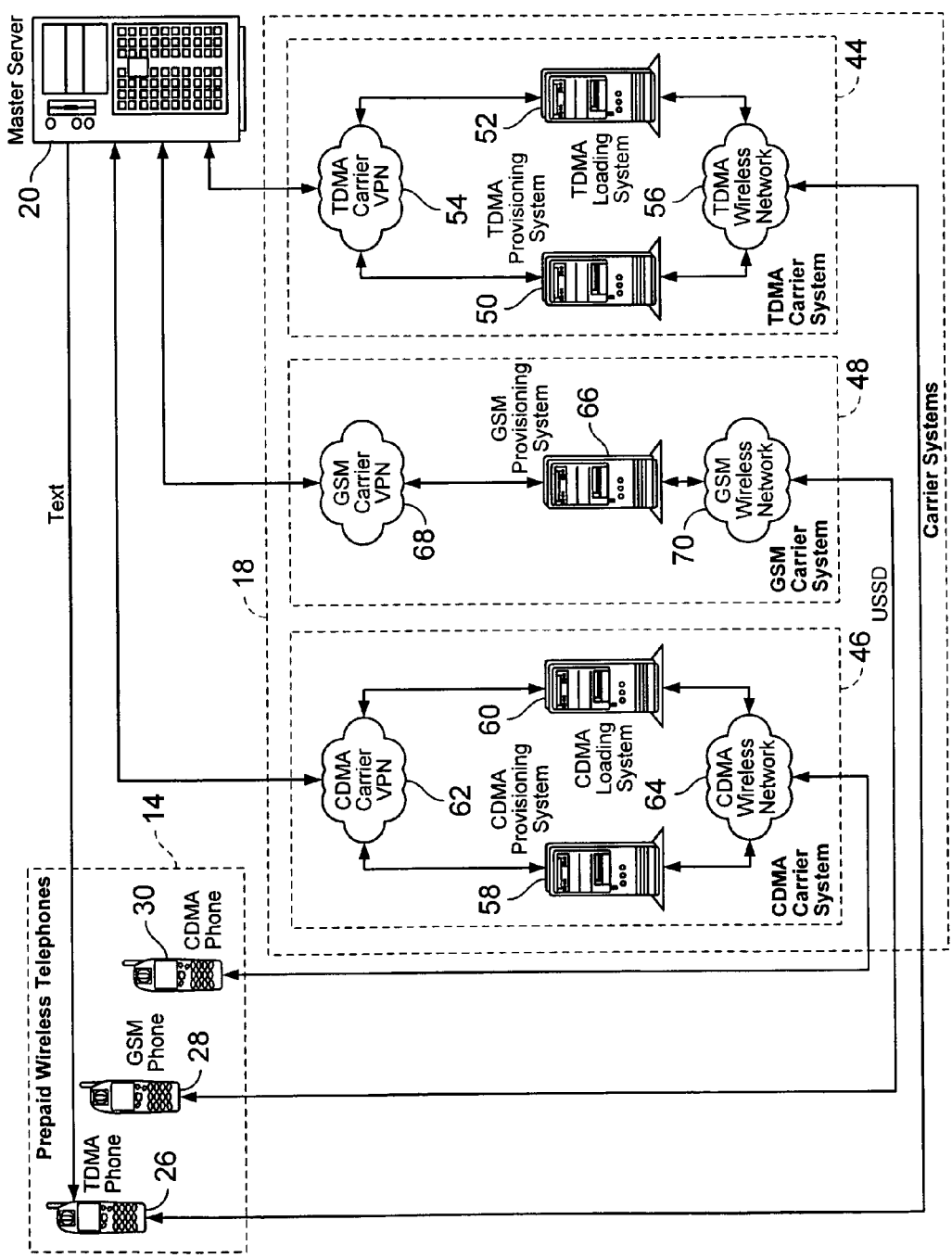
FIG. 2 is a network diagram showing the master server, the prepaid wireless telephones, and the carrier systems of FIG. 1.

Continuing with reference to FIG. 1, the plurality of carrier systems 16 are in communication with the master server 20. Referring to FIG. 2, the carrier systems 16 have disparate communication protocols, which are therein shown with further detail. The carrier systems 18 include a TDMA carrier system 44 for enabling use of the TDMA phone 26, a CDMA carrier system 46 for enabling use of the CDMA phone 30, a GSM carrier system 48 for enabling use of the GSM phone 28, and/or another carrier system (not shown) for enabling use of a prepaid wireless telephone (not shown) operating on a communications protocol compatible therewith. The TDMA carrier system 44, the CDMA carrier system 46, and the GSM carrier system 48 shall each be discussed below on a system-by-system basis.

The TDMA carrier system 44 includes a system for provisioning the TDMA phone 26, which is referenced herein as a TDMA provisioning system 50, and a system for loading airtime minutes onto an account associated with the TDMA phone 26, which is referenced herein as a TDMA loading system 52. The TDMA provisioning system 50 includes hardware with program code stored thereon, which may include any suitable hardware and/or software known in the art. In the exemplary embodiment of the invention, the TDMA provisioning system 50 is a command-driven system, and the control system 12 may communicate with the TDMA provisioning system 50 using information capture technology, which is further discussed below. The TDMA loading system 52 includes hardware and program code stored thereon, which may include any suitable hardware and/or software known in the art.

The master server 20 of the control system 12 preferably communicates with the TDMA provisioning system 50 and the TDMA loading system 52 through a virtual private network (VPN), which is referenced herein as a TDMA carrier VPN 54. The TDMA provisioning system 50 and the TDMA loading system 52 communicate with the TDMA phone 26 through a network, which is referenced herein as the TDMA wireless network 56. In preferred embodiments of the invention, the TDMA provisioning system 50 provisions the TDMA phone 26 by initiating an over-the-air (OTA) session between the TDMA phone 26 and the TDMA wireless network 56. The TDMA provisioning system 50 and the TDMA loading system 52 may communicate with another, such as to synchronize with one another, through the TDMA carrier VPN 54.

The CDMA carrier system 46 includes a system for provisioning the CDMA phone 30, which is referenced herein as a CDMA provisioning system 58, and a system for loading airtime minutes onto an account associated with the CDMA phone 30, which is referenced herein as a CDMA loading system 60. The CDMA provisioning system 58 includes hardware with program code stored thereon, which may include any suitable hardware and/or software known in the art. In the exemplary embodiment of the invention, the CDMA provisioning system 58 is a JAVA-based system, and the control system 12 may communicate with the CDMA provisioning system 58 using an application programming interface, which is further discussed below. The CDMA loading system 60 includes hardware and program code stored thereon, which may include any suitable hardware and/or software known in the art.

The master server 20 of the control system 12 preferably communicates with the CDMA provisioning system 58 and the CDMA loading system 60 through a virtual private network (VPN), which is referenced herein as the CDMA carrier VPN 62. The CDMA provisioning system 58 and the CDMA loading system 60 communicate with the CDMA phone 30 through a network, which is referenced herein as the CDMA wireless network 64. In preferred embodiments of the invention, the CDMA provisioning system 58 provisions the CDMA phone 30 by initiating an OTA session between the CDMA phone 30 and the CDMA wireless network 64. The CDMA provisioning system 58 and the CDMA loading system 60 may communicate with another, such as to synchronize with one another, through the CDMA carrier VPN 62.

The GSM carrier system 46 includes a system for provisioning the GSM phone 28, which is referenced herein as a GSM provisioning system 66. The GSM provisioning system 66 includes hardware with program code stored thereon, which may include any suitable hardware and/or software known in the art. The master server 20 of the control system 12 preferably communicates with the GSM provisioning system 66 through a virtual private network, which is referenced herein as the GSM carrier VPN 68. The GSM provisioning system 66 communicates with the GSM phone 28 through a network, which is referenced herein as the GSM wireless network 70. In preferred embodiments of the invention, the GSM provisioning system 66 provisions the GSM phone 28 by initiating an OTA session between the GSM phone 28 and the GSM wireless network 70 (e.g., to upload programming to a SIM card of the GSM phone 28). The GSM provisioning system 66 may have some functionality for facilitating the loading of airtime minutes onto an account associated with the GSM phone 28. Although the exemplary embodiment of the invention is not shown to include a GSM loading system, it is contemplated that the GSM carrier system 48 may include a GSM loading system having hardware with program code stored thereon, which may include any suitable hardware and/or software known in the art. The GSM loading system and the GSM provisioning system 66 may be in communication with one another, such as to synchronize with one another.

Figure 3A:
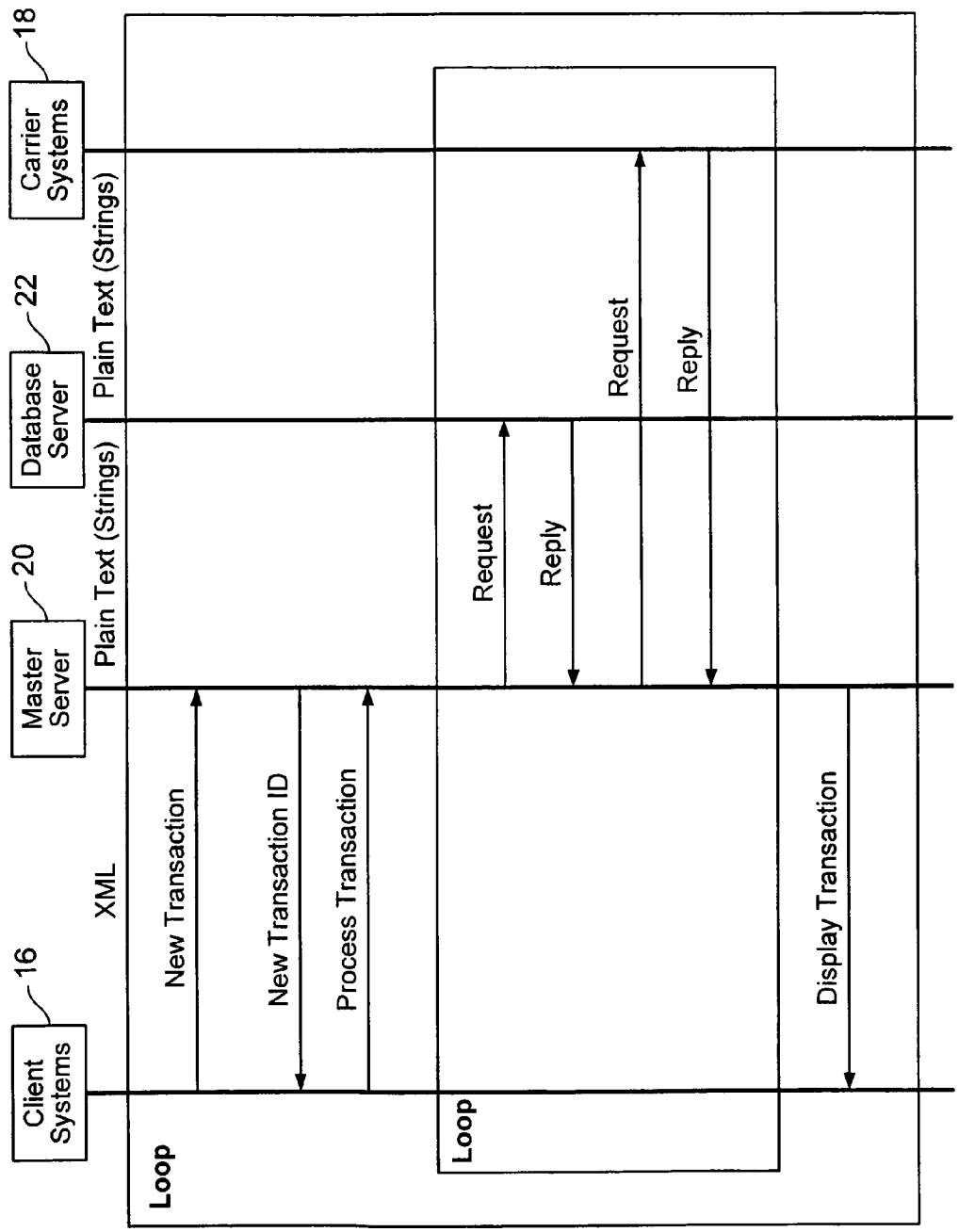
FIG. 3a is a process flow diagram showing an exemplary process flow of transaction information between the client systems, the master server, the database server, and the carrier systems of FIGS. 1 and 2.

Referring to FIG. 3a, an exemplary process flow for enabling use of the prepaid wireless telephones 14 shall now be discussed in connection with the master server 20, the database server 22, the carrier systems 18, and the client systems 16.

One of the client systems 16 sends transaction information to the master server 20 initiating a new transaction for enabling use of the one of the prepaid wireless telephones 14 corresponding therewith. The master server 20 provides a transaction ID in response thereto, and one of the client systems 16 may provide additional transaction information. The master server 20 communicates with the database server 22 and a corresponding one of the carrier systems 18 in a series of requests and replies causing enablement of the corresponding one of the prepaid wireless telephones 14.

Although not limiting the scope of the invention, the client systems 16, such as the consumer web client system 34 and the dealer web client system 36, are preferably browser-enabled and communicate with the master server 20 using Extensible Markup Language (XML). The master server 20 has program code stored thereon that is preferably written in a scripting language, such as the Practical Extraction and Report Language (PERL). The master server 20 preferably calls and receives transaction information to and from the database server 22 and carrier systems 18 in plain text (string) format.

Figure 3B:
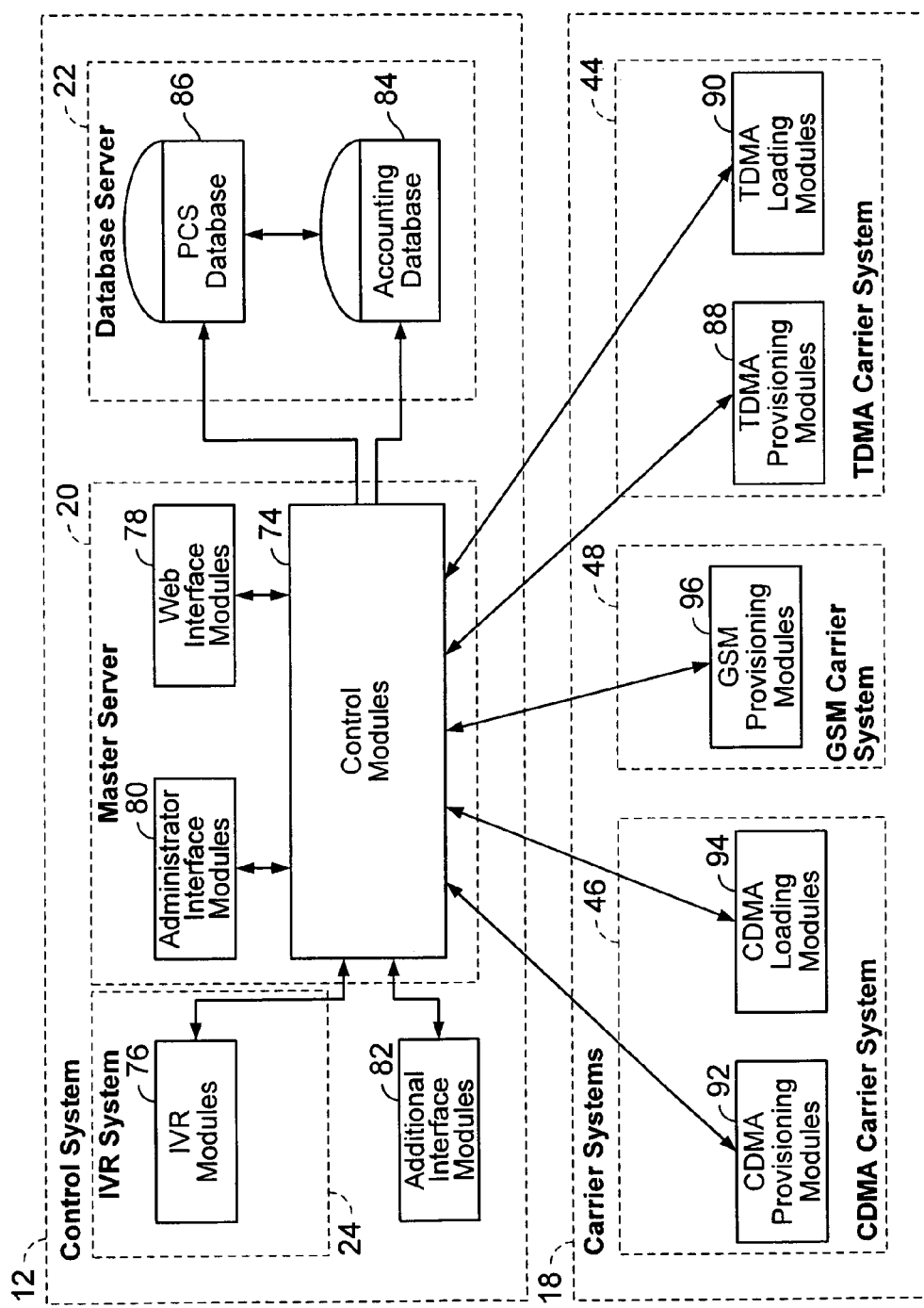

Referring to FIG. 3b, the exemplary process flow of FIG. 3a is further discussed in connection with exemplary modules of program code stored on the master server 20, the database server 22, the IVR system 24, and the carrier systems 18. As used herein, the term "module" is used to reference a distributed or non-distributed set of interrelated program code and/or hardwired logic. The term "program code" refers to data, executable instructions, and/or any other computer readable information.

Figure 19:
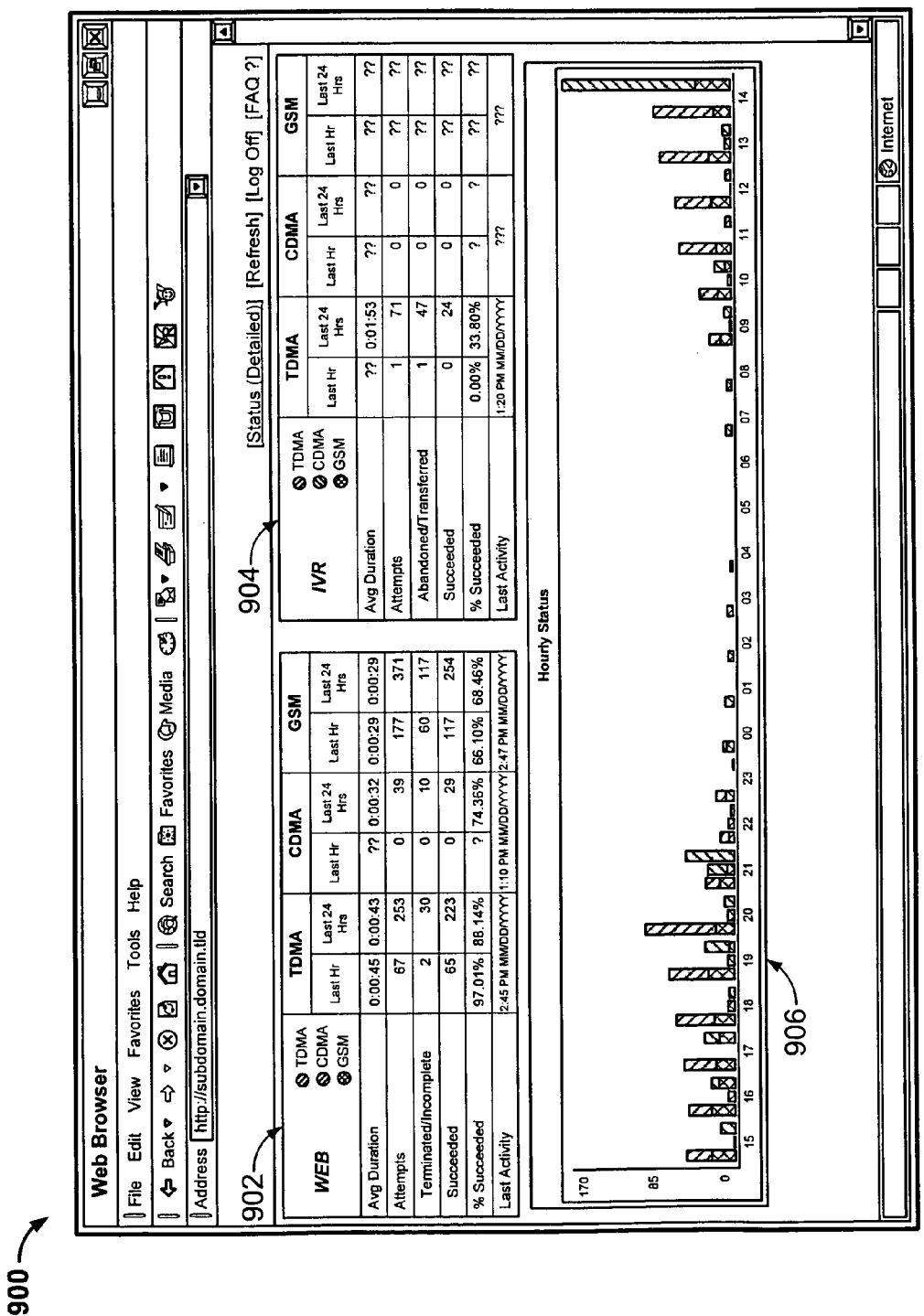
FIG. 19 is a screen shot of a client stat monitor.
Figure 20:
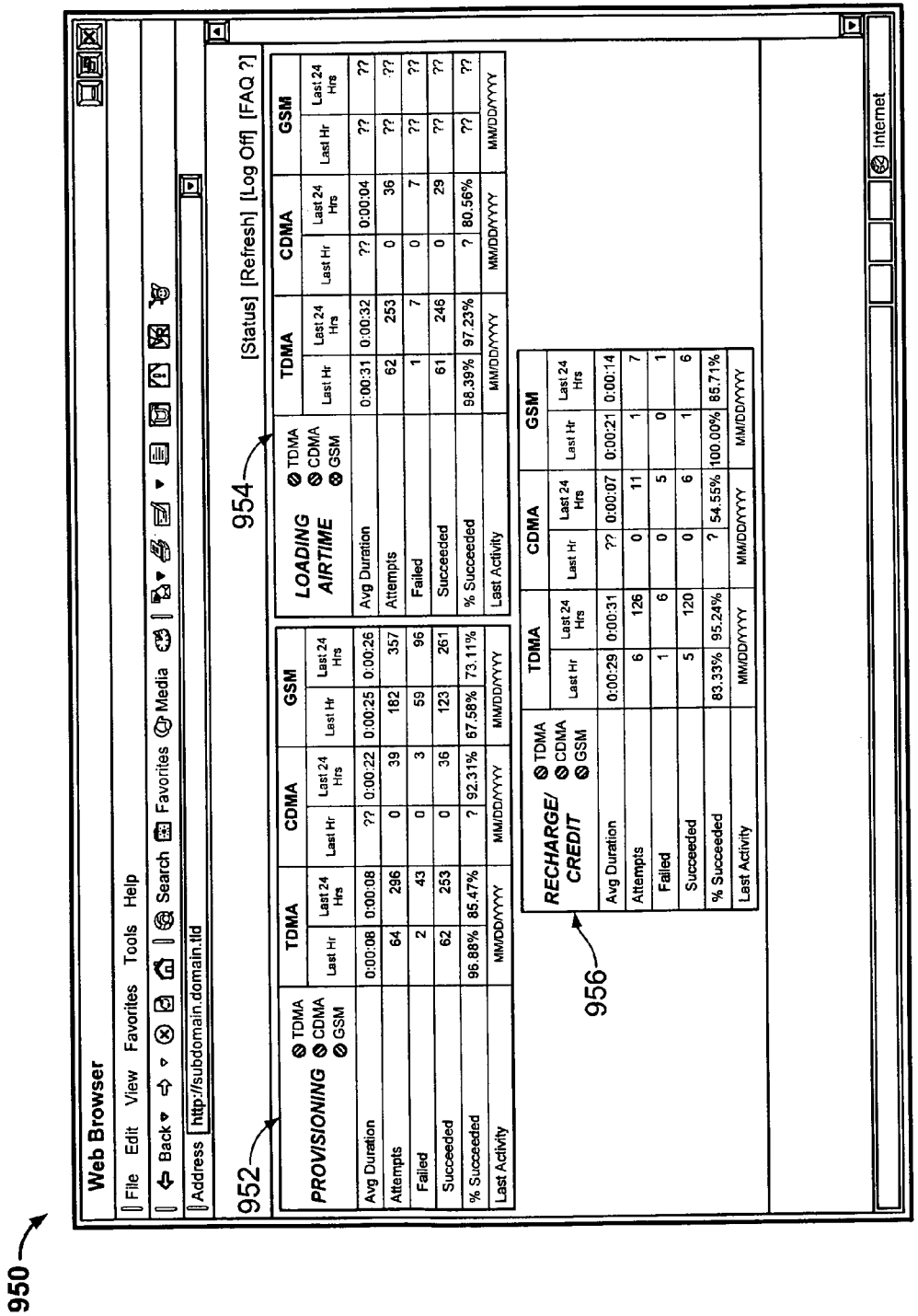
FIG. 20 is a screen shot of an action stat monitor.

The master server 20 has a plurality of control modules 74 stored thereon for controlling the flow of transaction information among the various systems of the prepaid wireless communications network 10. The control modules 74 preferably comprise one or more activation modules, information capture modules, monitoring modules, airtime loading modules, and various application programming interfaces (not shown). The control modules 74 are in communication with other modules of the prepaid wireless communications network 10 discussed below. Communications between the control modules 74 and the modules of the carrier systems 16 is preferably implemented at the application layer of the OSI model using socket communications to call the separate modules and initiate data exchange. One or more of the control modules 74, such as the monitoring module, manage and monitor traffic between the client systems 16, the carrier systems 18, and the database server 22, and provide detailed statistics relating thereto, as shown in FIGS. 19-20, for example. The control modules 74 preferably include program code for executable queries, which are referenced in the plural herein as stored procedures $SP_n$, and which are further discussed individually below in connection with FIGS. 4-8f. Many of the control modules 74 are coded in the Visual Basic program language, however, any suitable language or hardwiring may be used.

The master server 20 has a plurality of modules stored thereon for interfacing with the client systems 16 so as to facilitate the communication of transaction information therebetween. For example, the master server 20 has web interface modules 78 and administrator interface modules 80 stored therein. The web interface modules 78 interface with the consumer web client system 34 and the dealer web client system 36 over the Internet 40. The administrator interface modules 82 communicate with the administrator workstation 42 over, for example, a local area network (LAN). The master server 20 may also have one or more additional interface modules 82 stored thereon for sending and/or receiving transaction information to and/or from another client (not shown).

The database server 22 has a plurality of databases stored thereon, such as an accounting database 84 and another database, which is referenced herein as a PCS database 86. The accounting database 84 and the PCS database 86 are in communication with one another and the control modules 74. Financial records, as well as information relating to promotions and incentive programs, may be stored in the accounting database 84.

The PCS database 86 and/or the accounting database 84 preferably include a plurality of modules for implementing database-related processes. For example, the PCS database 86 preferably uses an Informix Database System with a graphical user interface (GUI) created using PowerBuilder. The PCS database 86 may also include program code for inventory control, reporting, fraud protection, and system integration functionalities.

The PCS database 86 preferably includes transaction information, such as mobile designation numbers (MDNs) associated with the prepaid wireless telephone 14, electronic serial numbers (ESNs) associated with the CDMA phone 30 and the TDMA phone 26, international mobile equipment identity (IMEI) numbers associated with SIM cards for the GSM phone 28, personal identification numbers (PINs) associated with users thereof, passwords, activation dates, dealer codes, ESN changes, consumer names and addresses, etc. The types of transaction information and the attributes thereof shall be further discussed below with reference to FIGS. 4-8f.

The IVR system 24 has a plurality of IVR modules 74 stored thereon. For example, the IVR modules 74 may include program code for speech recognition and for detection of successful and/or failed communications. The IVR modules 76 communicate with the control modules 74 so as to allow communication of transaction information between the control modules 74 and the telephone client system 32 over the PSTN 38.

The carrier systems 18 have a plurality of modules stored on the systems thereof. The TDMA carrier system 44 includes TDMA provisioning modules 88 stored on the TDMA provisioning system 50 and TDMA loading modules 90 stored on the TDMA loading system 52. The CDMA carrier system 46 preferably includes CDMA provisioning modules 92 stored on the CDMA provisioning system 58 and CDMA loading modules 94 stored on the CDMA loading system 60. The GSM carrier system 48 preferably includes GSM provisioning modules 96 stored on the GSM provisioning system 66. Although the exemplary embodiment of the invention is not shown in FIG. 3b to include GSM loading modules, it is contemplated that the GSM carrier system 48 may include a GSM loading system (or other system) having GSM loading modules stored thereon. Furthermore, as described herein, the GSM provisioning modules 96 preferably have code stored thereon that facilitates activation of the GSM phone.

The control modules 74 control and manage the process flow, and the control modules 74 include monitoring modules and one or more activation modules, such as an information capture module and/or an application programming interface. The information capture module and the loading modules preferably incorporate screen scraping technology or another information capture technology and are able to login and obtain information from the modules of the carrier systems 16 as if being in-network therewith.

The control modules 74 communicate and process transaction information between the client systems 16, the database server 22, and the carrier systems 18. The control modules 74 send enablement requests to the TDMA carrier system 44, the CDMA carrier system 46, and the GSM carrier system 48 to have the prepaid wireless telephones 14 associated therewith provisioned and to have airtime minutes loaded onto accounts associated therewith. The control modules 74 include one or more Daemons and manage one more message queues, preferably of an XML format, for communications between the control modules 74 and the PCS database 86, the accounting database 84, the CDMA provisioning modules 92, the CDMA loading modules 94, the GSM provisioning modules 96, the TDMA provisioning modules 88, and the TDMA loading modules 90.

Referring to FIGS. 4-8f, an exemplary method for enabling use of the prepaid wireless telephones 18 is shown and described. The exemplary method, referenced herein as an enablement method 100, shall be discussed with particular attention given to the types and attributes of the transaction information, the associations created therebetween, and the manner in which executable steps operate thereupon. For the purpose of nonlimiting example, the enablement method 100 of FIGS. 4-8f is shown and described in connection with the telephone client system 32 and the IVR interface module 74. However, one skilled in the art shall appreciate that the present invention is not so limited. For example, a method similar to the enablement method 100 may be used in connection with a consumer web client system 34 or dealer web client system 36. It shall be understood by one skilled in the art that, in the exemplary embodiment of the invention, the enablement method 100 is implemented by the master server 20 and/or other structure discussed in connection therewith.

Figure 4:
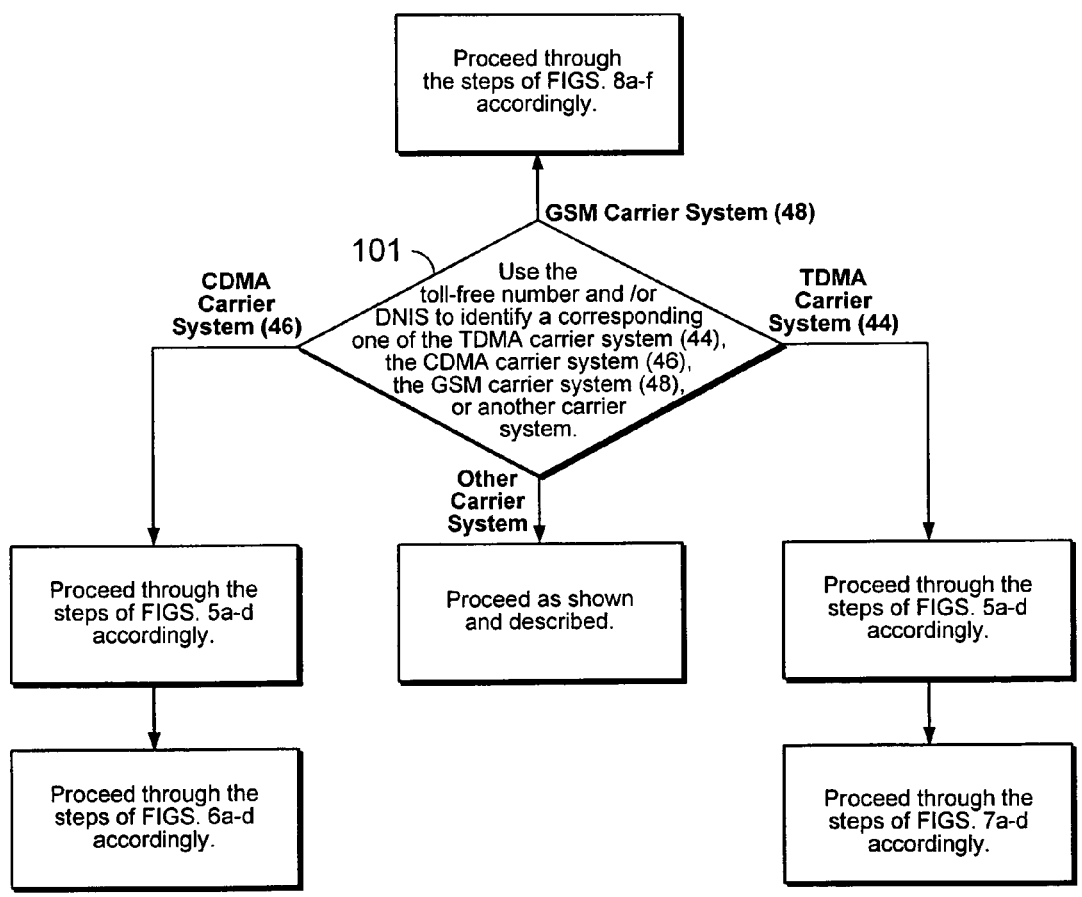
FIG. 4 is a section of a flow chart that is distributed across FIGS. 4-8f, wherein the flow chart shows an enablement method for enabling use of the prepaid wireless telephones of FIG. 1, and wherein said section shows a carrier identification step thereof.

Referring to FIG. 4, the enablement method 100 is used in connection with the CDMA carrier system 46, the TDMA carrier system 44, the GSM carrier system 48, and another carrier system that is not shown in FIG. 2. Consumers and dealers are typically made aware of a toll-free telephone number that may be dialed to activate and/or recharge one of the prepaid wireless telephone 14 being sought to be enabled for use. The consumer and/or dealer, referenced below as a caller, dials the toll-free telephone number at the telephone client system 32 to initiate communications with the control system 12.

At step 101 of the enablement method 100, the control system 12 uses a dialed number identification service (DNIS) to identify the toll-free telephone number dialed and/or the last four-digits thereof, which are referenced herein as the DNIS number. The control system 12 has an association stored thereon in a data structure between the DNIS number and the identity of one of the carrier systems 16 corresponding to the one of the prepaid wireless telephone 14 being sought to be enabled for use. The control system 12 compares the DNIS number against stored values to identify whether the caller seeks to enable use of the TDMA phone 26 (in connection with the TDMA carrier system 44), the CDMA phone 30 (in connection with the CDMA carrier system 46), the GSM phone 28 (in connection with the GSM carrier system 48), or another phone in connection.

In this regard, the control system 12 identifies the steps through which the enablement method 100 shall proceed. If the DNIS number is associated with the CDMA carrier system 46, then the enablement method 100 proceeds through steps 102-220 as shown and described in connection with FIGS. 5a-5d and then proceeds through steps 222-312 as shown and described in connection with FIGS. 6a-6d. If the DNIS number is associated with the TDMA carrier system 44, then the enablement method 100 proceeds through steps 102-220 as shown and described in connection with FIGS. 5a-5d and then proceeds through steps 314-428 as shown and described in connection with FIGS. 7a-7d. If the DNIS number is associated with the GSM carrier system 48, then the enablement method 100 proceeds through steps 502-650 as shown and described in connection with FIGS. 8a-8f. It shall be appreciated by one skilled in the art that the enablement method 100 and the control system 12 are scalable for use with any suitable number and type of carrier systems and communication protocols. In this regard, at step 101, the control system 12 may identify whether the caller wishes to enable use of a prepaid wireless phone (not shown) associated with another carrier system (not shown).

Referring to FIGS. 5a-5d, steps 102-220 of the enablement method 100 are shown and described in connection with enabling use of the CDMA phone 30 and/or the TDMA phone 26. At step 102 of FIG. 5a, the control system 12 stores the dialed DNIS number thereon in a temporary data structure, referenced herein as a preliminary data record. The enablement method 100 proceeds to step 104, where the IVR system 24 sends a voice prompt $M_1$ to the telephone client system 32 requesting the caller to indicate whether the caller is a dealer or a consumer, by pressing "1" or "2", respectively. The caller inputs a response at the telephone client system 32, which may be inputted using a touchtone keypad, by speaking into a microphone, or by other means, such as a keyboard. At step 106, the IVR system 24 at least temporarily stores the caller input as part of an "activation type" in the preliminary data record.

If the activation type is neither "1" nor "2", then the enablement method 100 proceeds to step 108, where the IVR system 24 sends a voice prompt $M_2$ to the telephone client system 32 indicating to the caller that the caller input was invalid, and where the enablement method 100 then loops back to step 106. If the activation type is "1", then the enablement method 100 proceeds to step 110 for dealer-specific processing, and, if the activation type is "2", then the enablement method 100 skips to step 126, discussed below. In this regard, all of the transaction information provided by the caller in response to any of the voice prompts $M_n$ discussed herein is preferably verified for string correctness. It is also noted that the error-checking feature of steps 106 and 108 may be utilized throughout the enablement method 100 to error-check any suitable input of transaction information. Furthermore, each time a user is requested to provide transaction information, the user is preferably given two opportunities to do so, the transaction information corresponding therewith being error-checked each time.

At step 110, the IVR system 24 sends a voice prompt $M_3$ to the telephone client system 32 requesting the caller to enter a five-digit dealer code, which is then received and at least temporarily stored by the IVR system 24. At step 112, the IVR system 24 sends a voice prompt $M_4$ to the telephone client system 32 requesting the caller to confirm the accuracy of the stored dealer code. At step 114, the IVR system 24 receives the caller response to step 112 and therewith identifies whether the stored dealer code was accurately inputted. If the stored dealer code has been inaccurately inputted, then the enablement method 100 proceeds to step 116, where the IVR system 24 sends the voice prompt $M_2$ to the telephone client system 32 informing the caller of the invalidity, and where the enablement method 100 loops back to step 110. If the stored dealer code has been accurately inputted, then dealer code is stored in the preliminary data record and the enablement method 100 proceeds to step 118, where the IVR system 24 sends a voice prompt $M_5$ to the telephone client system 32 requesting a four-digit dealer password, which is then received and at least temporarily stored by the IVR system 24. The enablement method 100 then proceeds to step 120.

At step 120, the IVR system 24 sends a call to the master server 20 for implementation of a stored procedure $SP_1$. As discussed above, the master server 20 has a plurality of stored procedures $SP_n$ stored thereon, many of which implement processes that, with respect to the steps of the enablement method 100, may be characterized as substeps thereof. The master server 20 implements the stored procedures $SP_n$ to process the transaction information, to call, send, and/or receive transaction information, and to perform other desired functions. Each of the stored procedures $SP_n$ shall be individually discussed below in connection with one or more steps of the enablement method 100 corresponding thereto.

At step 120, the master server 20, in response to the call for the stored procedure $SP_1$, validates the dealer code and the dealer password against corresponding transaction information stored in the PCS database 86 of the database server 22, and sends the results of said validation to the IVR system 24. At step 122, the IVR system 24 identifies whether the dealer code and dealer password are valid. If the dealer code and the dealer password are valid, the enablement method 100 skips to step 134, which is discussed below in connection with FIG. 5b. If the dealer code and the dealer password are invalid, then the enablement method 100 proceeds to step 124, where the IVR system 24 sends the voice prompt $M_2$ to the telephone client system 32 informing the caller of said invalidity, and where the enablement method 100 loops back to step 118.

At step 126, where the caller had previously indicated the caller was a consumer, the IVR system 24 sends a voice prompt $M_6$ to the telephone client system 32 requesting the caller to choose between English language and Spanish language voice prompts by inputting "1" or "2". At step 128, the IVR system 24 receives the caller response to step 126 and therewith determines whether the caller response is a valid selection. If the caller response is invalid, then, at step 130, the IVR system 24 sends the voice prompt $M_2$ to the telephone client system 32 informing the caller of the invalidity, and the enablement method 100 loops back to step 126. At step 132, the IVR system 24 loads the voice prompts in the selected language, and the enablement method 100 proceeds to step 134 of FIG. 5b.

Figure 5B:
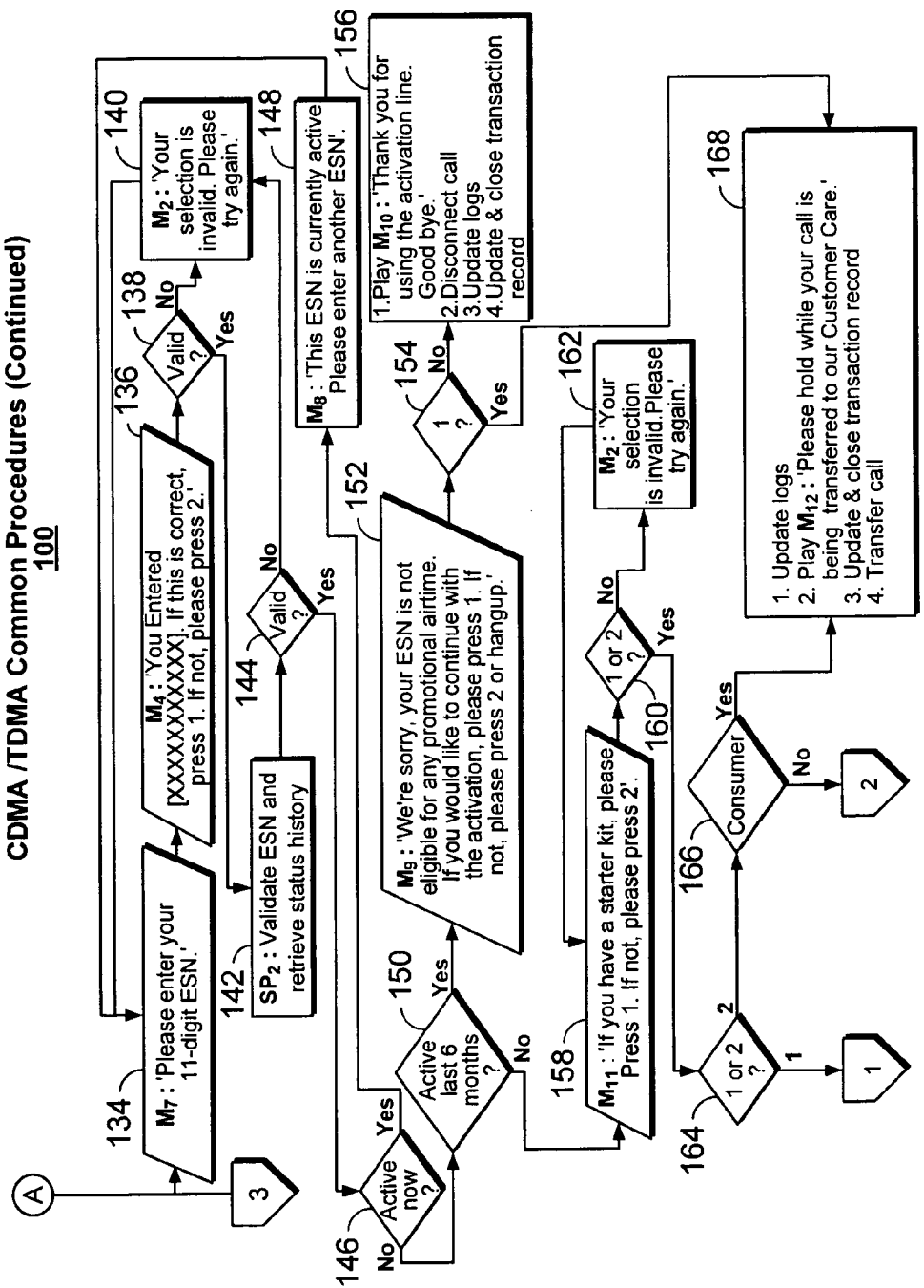

With reference to FIG. 5b, at step 134, the IVR system 24 sends a voice prompt $M_7$ to the telephone client system 32 requesting the caller to enter an eleven-digit electronic serial number (ESN) associated with one of the prepaid wireless telephone 14 to be enabled for use (e.g., the CDMA phone 30 or the TDMA phone 26). The ESN is received and at least temporarily stored by the IVR system 24. At step 136, the IVR system 24 sends the voice prompt $M_4$ to the telephone client system 16 requesting the caller to confirm the accuracy of the stored ESN. At step 138, the IVR system 24 receives the caller response to step 136 and identifies whether the stored ESN was accurately inputted. If the stored ESN was inaccurately inputted, then at step 140, the IVR system 24 sends the voice prompt $M_2$ to the telephone client system 32 informing the caller of the inaccuracy, and the enablement method 100 loops back to step 134. If the stored ESN is accurate, the ESN is stored in the preliminary data record and the enablement method 100 proceeds to step 142.

At step 142, the IVR system 24 calls a stored procedure $SP_2$ from the master server 20 to validate the ESN and obtain a status history thereof, which is referenced herein as the ESN status history. The master server 20, in response to the call for the stored procedure $SP_2$, validates the ESN and obtains the ESN status history against corresponding transaction information stored in the PCS database 86 of the database server 22. In preferred embodiments of the invention, the database server 22 stores information in the ESN status history, which indicates whether one of the prepaid wireless telephones 14 associated with the ESN is currently active, and whether it has been active in the past (and when). The ESN status history assists in preventing dealer fraud, which shall be further discussed below in connection with steps 150-156. The master server 20 sends the results of the validation and the status check to the IVR system 24.

At step 144, the IVR system 24 identifies whether the ESN is valid. If the ESN is invalid, the enablement method 100 proceeds to step 140, where the IVR system 24 sends the voice prompt $M_2$ to the telephone client system 32 informing the caller of said invalidity, and where the enablement method 100 then loops back to step 134. If the ESN is valid, the enablement method 100 proceeds to step 146.

At step 146, the IVR system 24 identifies from the ESN status history whether the one of the prepaid wireless telephones 14 associated therewith (e.g., the CDMA telephone 30 or the TDMA telephone 26) is active at a point in time substantially concurrent therewith. If the ESN is concurrently active, the enablement method 100 proceeds to step 148, wherein the IVR system 24 sends the voice prompt $M_8$ to the telephone client system 32 informing the caller of said activity, and where the enablement method 100 then loops back to step 134. If the ESN is not concurrently active, then the enablement method 100 proceeds to step 150.

At step 150, the IVR system identifies from the ESN status history whether the ESN had been active at any point within a predefined period of time precedent thereto (e.g., the previous six months). If the ESN has not been active at some point within the predefined period of time precedent thereto, then the enablement method 100 skips to step 158, discussed below. If the ESN has been active at some point within the predefined period of time precedent thereto, then the enablement method 100 proceeds to step 152.

At step 152, the IVR system 24 sends a voice prompt $M_9$ to the telephone client system 32 informing the caller that the one of the prepaid wireless telephones 16 subject to the transaction is ineligible for promotional airtime minutes and gives the caller an opportunity to proceed with enablement. At step 154, the IVR system 24 identifies whether the caller wishes to continue. If the caller wishes to continue, the enablement method 100 skips to step 170, discussed below, where the caller may confer with an administrator, such as a customer service representative. However, if the caller does not wish to continue or hangs-up, then the enablement method 100 proceeds to step 156. At step 156, the IVR system 24 flags the preliminary data record as being associated with a potentially fraudulent prepaid wireless transaction, updates the status history associated with the ESN, and closes the preliminary data record. At step 156, if the caller has not disconnected the call from the telephone client 32, the IVR system 24 sends a voice prompt $M_{10}$ to the telephone client system 32 indicating that the call is terminating.

Steps 150-156 of the enablement method 100 assist in identifying and preventing dealer fraud, such as when a dealer repeatedly attempts to provision the same prepaid wireless telephone in a short period of time. A reseller of carrier services often provides incentives to dealers, such as free airtime minutes, which are typically based on the number of prepaid wireless telephones sold by the dealer and enabled for use by the reseller. By repeatedly enabling a prepaid wireless telephone for use with the reseller, the dealer could fraudulently acquire promotional airtime minutes. However, steps 150-156 disallow repetitive provisioning of the same prepaid wireless telephone.

At step 158, the IVR system 24 sends a voice prompt $M_{11}$ to the telephone client system 32 asking the caller to input a "1" if the caller has a starter kit and to input a "2" if the caller does not have a starter kit. A starter kit is a promotional kit provided by the reseller to the dealer, which may then accompany a sale of a prepaid wireless telephone and/or services relating thereto. For example, a starter kit is typically free and provides a consumer with promotional (free) airtime minutes. The starter kit may be used by the reseller as an incentive for consumers to buy one of the reseller's prepaid wireless telephones and/or enabling services.

At step 160, the IVR system identifies the caller response to step 158 and, if the caller has not inputted a "1" or "2", then the enablement method 100 proceeds to step 162, where the IVR system 24 sends the voice prompt $M_2$ to the telephone client system 32 indicating that the caller input was invalid, and where the enablement method 100 loops back to step 158. If the caller has inputted a "1" or "2", then the enablement method 100 skips to step 164. At step 164, the IVR system 24 identifies which of "1" or "2" was inputted by the caller. If the caller inputted a "1" indicating that the caller has a starter kit, then the enablement method 100 skips to step 170 of FIG. 5c. Otherwise, the enablement method 100 proceeds to step 166. At step 166, the IVR system refers to the presence or absence of a dealer code to identify whether the caller is a dealer or consumer. If the caller is a dealer, then the enablement method 100 skips to step 186 of FIG. 5c. If the caller is a consumer (that does not have a starter kit), then the enablement method 100 proceeds to step 168. At step 168, the IVR system 24 sends a voice prompt $M_{12}$ to the telephone client system 32 indicating that the caller will be transferred to a customer service representative, transfers the caller to a customer service representative accessing administrator workstation 42, creates a transaction record from the preliminary data record, updates a plurality of logs associated with the transaction, and updates and closes the preliminary data record. The customer service representative can then view the transaction record at the administrator workstation 42.

Figure 5C:
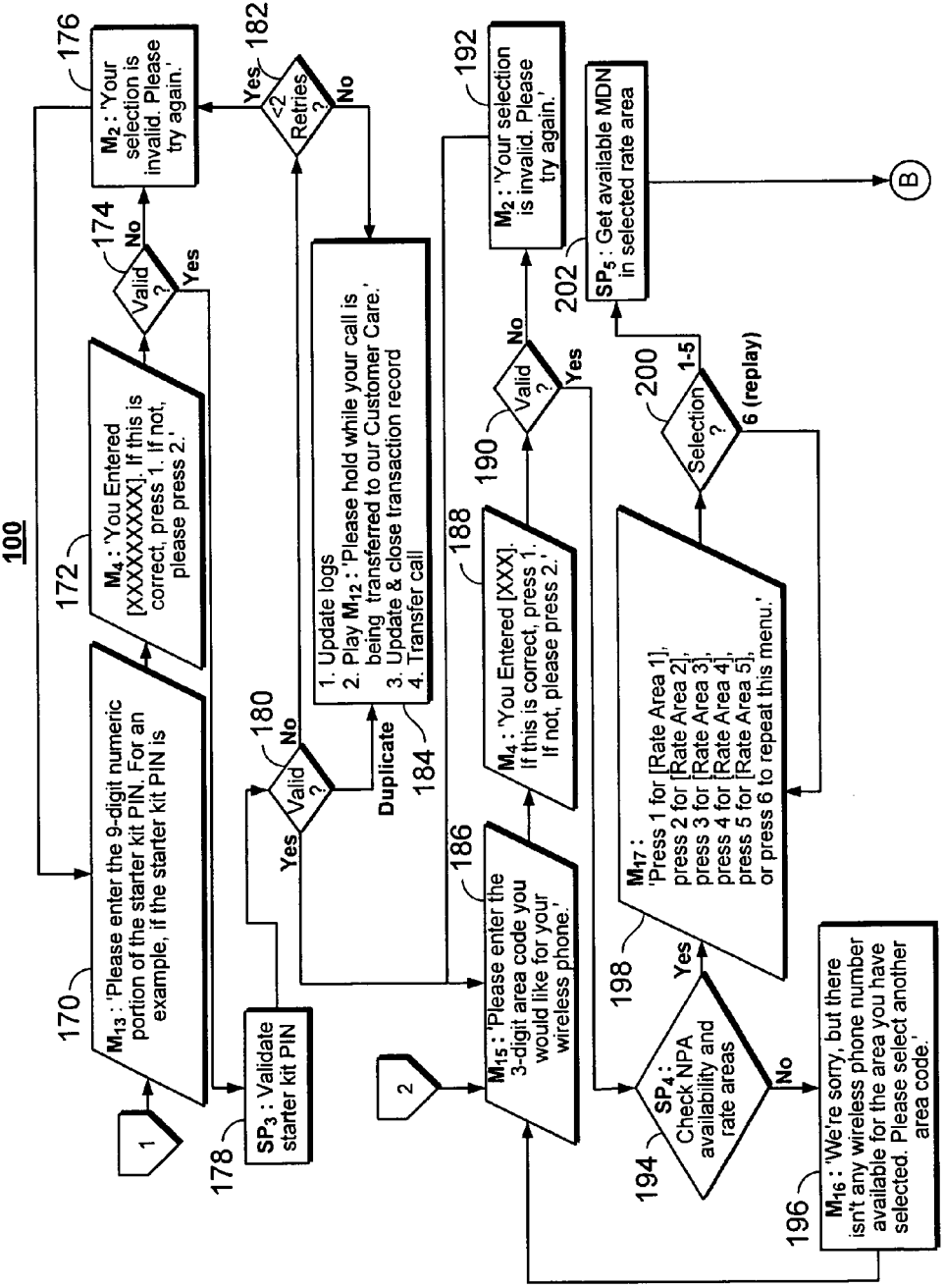

With reference to FIG. 5c, the IVR system 24 sends a voice prompt $M_{13}$ to the telephone client system 32 requesting that the caller input a nine-digit numeric portion of an alphanumeric starter kit code disposed on the starter kit. At step 172, the IVR system 24 receives and temporarily stores the caller response to step 170 as a "starter kit PIN" and requests the caller to confirm that the IVR system 24 accurately stored and received the starter kit PIN. At step 174, the IVR system 24 identifies the caller response to step 172. If the stored starter kit PIN was incorrect, the enablement method 100 proceeds to step 176, where the IVR system 24 sends the voice prompt $M_2$ to the telephone client system 32 indicating that the input was invalid, and where the enablement method 100 loops back to step 170. If the caller confirmed that the stored starter kit PIN is accurate, the starter kit PIN is stored in the preliminary data record and the enablement method 100 proceeds to step 178.

At step 178, the IVR system 24 sends a call to the master server 20 for implementation of a stored procedure $SP_3$ to validate the starter kit PIN. The master server 20, in response thereto validates the starter kit PIN against corresponding transaction information stored in the PCS database 86 of the database server 22 and sends the results of said validation to the IVR system 24. At step 180, the IVR system 24 identifies whether the master server 20 has indicated that the master server 20 has identified the starter kit PIN as being valid. The enablement method 100 skips from step 180 to step 186 if the starter kit PIN is neither invalid nor a duplicate of a previously used starter kit PIN.

If the starter kit PIN is invalid, then the enablement method 100 proceeds from step 180 to step 182, where the IVR system 24 identifies whether the caller has entered an invalid starter kit PIN less than two times, and if so, the enablement method 100 loops back to step 176 If not, the enablement method 100 proceeds to step 184. Step 182 is an example of the double error checking discussed above in connection with steps 106 and 108.

At step 184, the IVR system 24 sends the voice prompt $M_{12}$ to the telephone client system 16 and transfers the caller to a customer service representative accessing the administrator workstation 42, a transaction record is created from the preliminary data record, and the master server 20 sends the transaction record to the administrator workstation 42. If the starter kit PIN is valid, but it is a duplicate of a starter kit PIN already used, then the enablement method 100 skips to step 184. In the event that a caller inputs an invalid or duplicate starter kit PIN, the IVR system 24 flags the preliminary data record as being related to a potentially fraudulent transaction.

At step 186, the IVR system 24 sends a voice prompt $M_{15}$ to the telephone client system 32 requesting that the caller input a three-digit telephone area code that the caller desires to be associated with the one of the prepaid wireless telephones 14 sought to be enabled (e.g., the CDMA phone 30 or the TDMA phone 26). This three digit telephone area code is referenced herein as the numbering plan area (NPA) code. The IVR system 24 receives and temporarily stores the caller response to step 186 and, at step 188, requests the caller to confirm that the IVR system 24 accurately stored and received the NPA code. At step 190, the IVR system 24 identifies whether the caller response to step 186 is valid. If the caller response is invalid, the enablement method 100 proceeds to step 192, where the IVR system 24 sends the voice prompt $M_2$ to the telephone client system 16 indicating that the input was invalid, and the enablement method 100 loops back to step 186. If the caller response is valid, the enablement method 100 proceeds to step 194, where a stored procedure $SP_4$ is called.

At step 194, the master server 20 accesses the PCS database 86 of the database server 22 to identify whether there are any available seven-digit wireless telephone numbers that are associated with the NPA code and, if so, what rate areas (e.g., cities, markets, etc.) are associated with the NPA code. If no wireless telephone numbers are available, then the enablement method 100 proceeds to step 196, where the IVR system 24 sends a voice prompt $M_{16}$ to the telephone client system 32 indicating that no wireless telephone numbers are available for the selected NPA code, and where the enablement method 100 loops back to step 186.

If there are wireless telephone numbers available, the enablement method 100 skips to step 198, where the IVR system 24 sends a voice prompt $M_{17}$ articulating each of the available rate areas and a numerical input associated with each of the areas. The caller is also afforded an opportunity to have the voice prompt $M_{17}$ repeated. The enablement method 100 then proceeds to step 200, where the IVR system 24 identifies the caller response. If the caller has chosen to have the voice prompt $M_{17}$ repeated, the enablement method loops back to step 198. If the caller has chosen a valid rate area, then the enablement method 100 proceeds to step 202, where the IVR system 24 calls a stored procedure $SP_5$ to have the master server 20 retrieve a seven-digit wireless telephone number, referenced herein as a mobile designation number (MDN), and provides the MDN to the IVR system 24. The enablement method 100 proceeds from step 202 to step 204 of FIG. 5d.

Figure 5D:
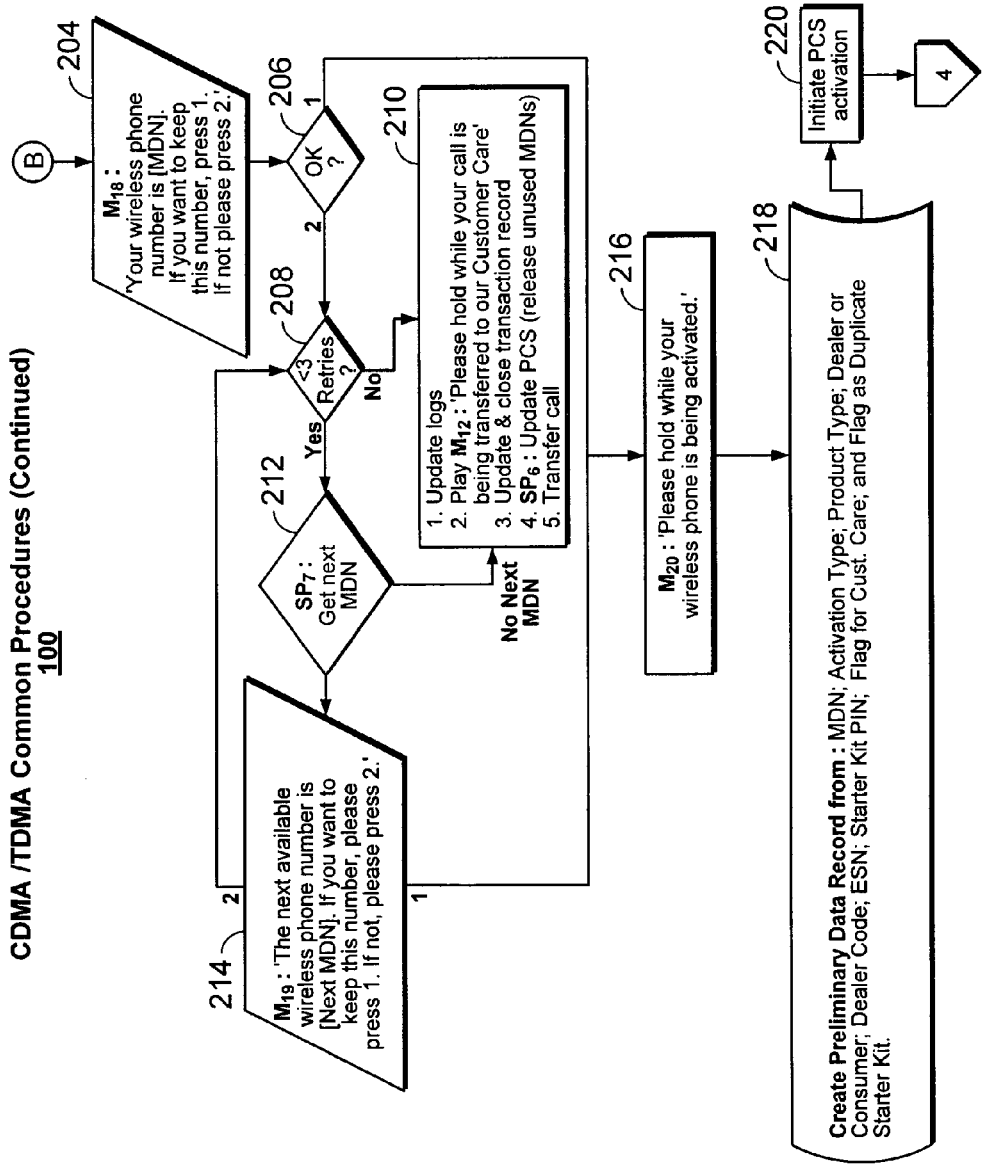

Referring to FIG. 5d, at step 204, the IVR system 24 sends a voice prompt $M_{18}$ to the telephone client system 32 that identifies the MDN and asks whether the caller would like to have the MDN associated with one of the prepaid wireless phones 14 being sought to be enabled for use. At step 206, the IVR system identifies whether the caller has chosen to accept the MDN, and if so, the MDN is stored in the preliminary data record and the enablement method 100 skips to step 216. If the caller does not accept the MDN, the IVR system 24 identifies whether the caller has done so more than three times. If the caller has opted more than three times to not accept the MDN, the enablement method 100 proceeds to step 210, where the IVR system 24 sends the voice prompt $M_{12}$ to the telephone client system 32 and takes action associated therewith. The IVR system calls a stored procedure $SP_6$ from the master server 20 that releases any MDNs not accepted by the caller.

If the caller has opted three or less times to not accept the MDN, the enablement method 100 proceeds to step 212, where the IVR system 24 calls a stored procedure $SP_7$ to have the master server 20 retrieve the "next MDN" associated with the selected NPA code and rate center. If there are no other MDNs associated with the selected NPA code and rate center, then the enablement method 100 loops back to step 210. If there is another MDN associated with the NPA code and rate center, then the enablement method 100 proceeds to step 214, where the IVR system 24 sends a voice prompt $M_{19}$ to the telephone client system 32 asking whether the caller would accept the next MDN. If the user chooses not to accept the next MDN, then the enablement method 100 loops back to step 208. If the caller accepts the next MDN, then the next MDN is stored in the preliminary data record and the enablement method 100 proceeds to step 216, which shall be discussed further below.

At step 216, the IVR system 24 sends a voice prompt $M_{20}$ to the telephone client system 32 indicating that activation is about to occur. The enablement method 100 proceeds to step 218, where the IVR system imparts its imprimatur to the preliminary data record, and then proceeds to step 220, where the preliminary data record is forwarded to the master server 20.

As stated above, steps 102-220 of FIGS. 5a-d show common (shared) procedures for enabling use of the CDMA phone 30 and the TDMA phone 26. As used herein, "common procedures" refers to steps that are utilized by the control system 12 for enabling use of the CDMA phone 30 and for enabling use of the TDMA phone. In accordance with step 101 of FIG. 4, if the caller is seeking to enable use of the CDMA phone 30, then the enablement method 100 proceeds from step 220 of FIG. 5d to step 222 of FIG. 6a. However, if the caller is seeking to enable use of the TDMA phone 26, then the enablement method 100 skips to from step 220 of FIG. 5d to step 314 of FIG. 7a.

Figure 6A:
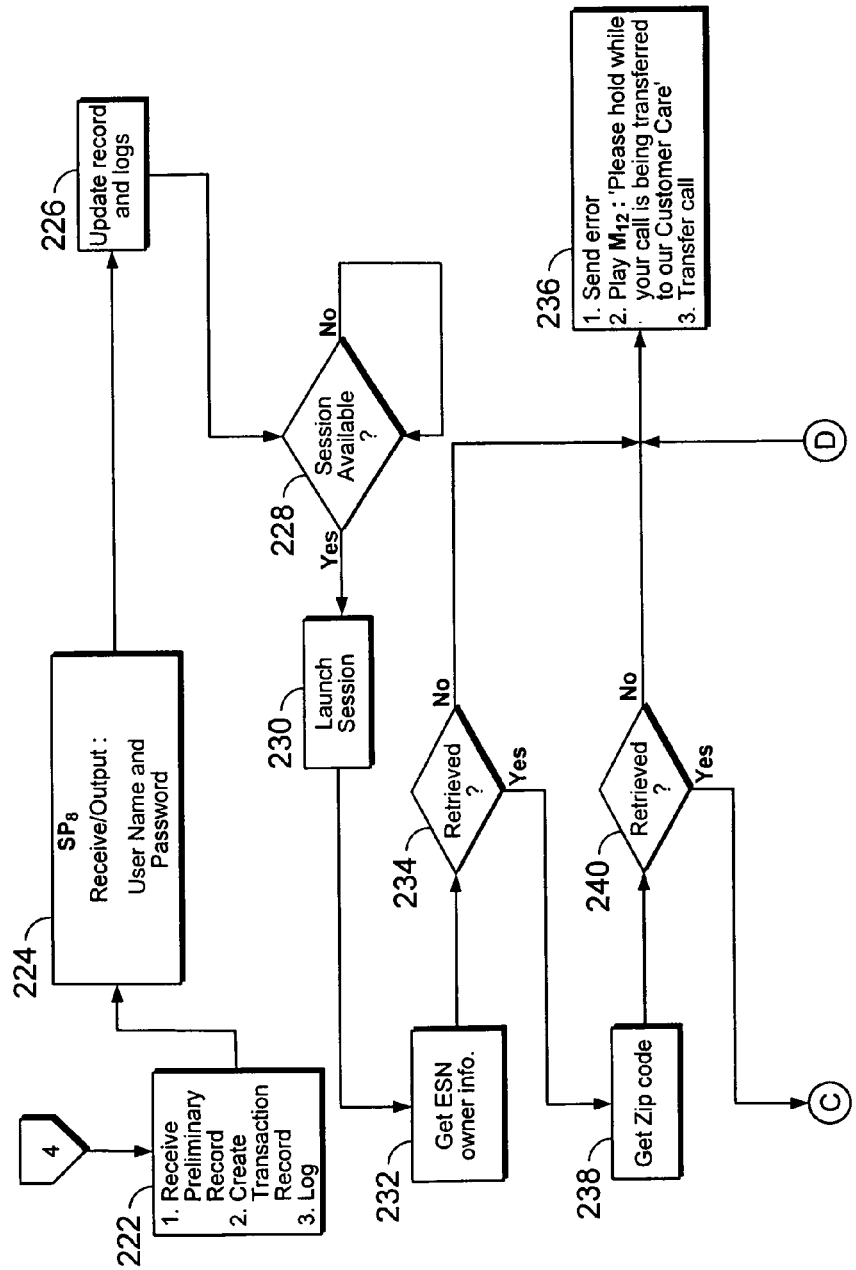
FIGS. 6a-d are sections of the flow chart showing provisioning and loading steps of the enablement method relating to the CDMA phone.
Figure 6B:
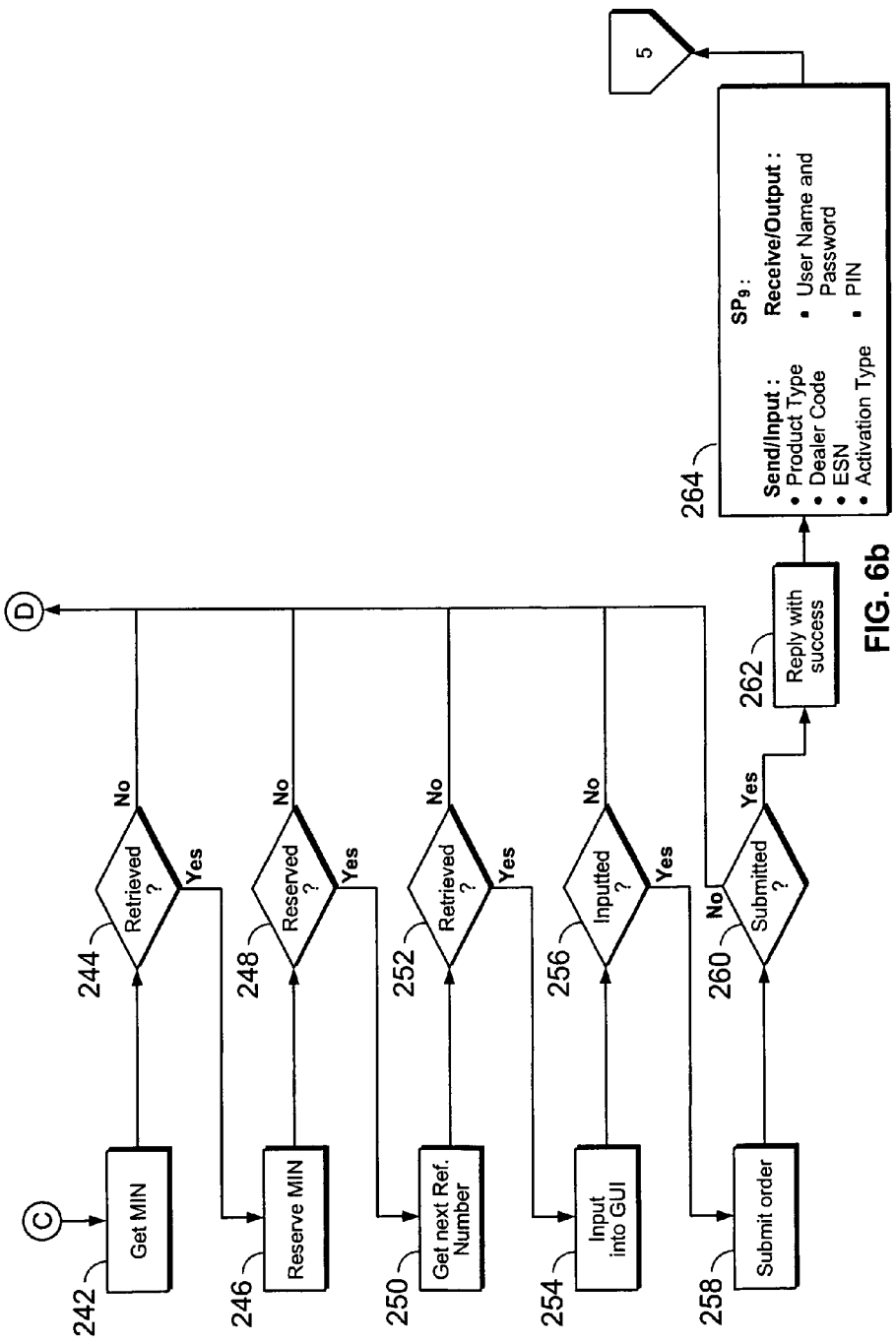
Figure 6C:
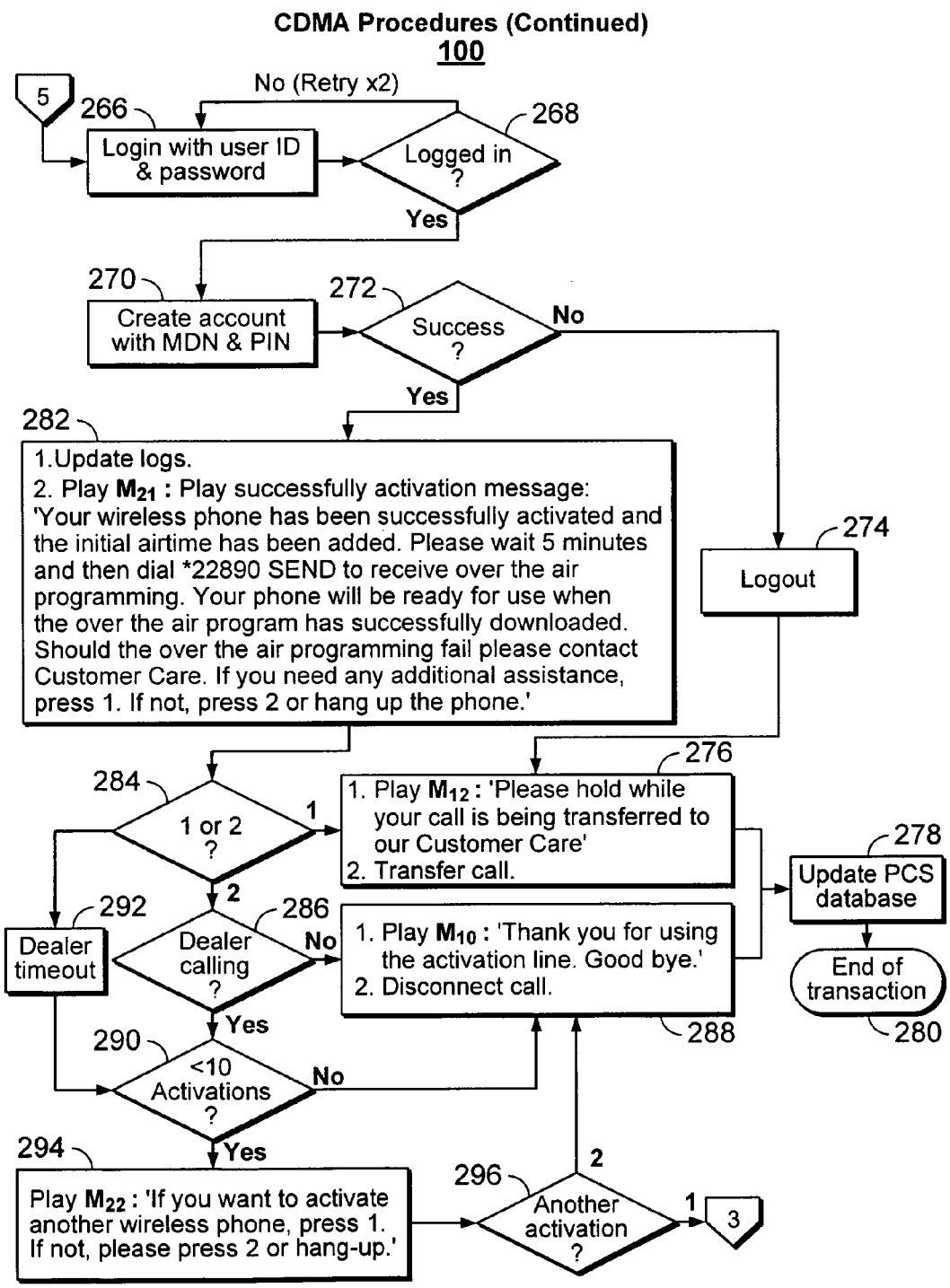
Figure 6D:
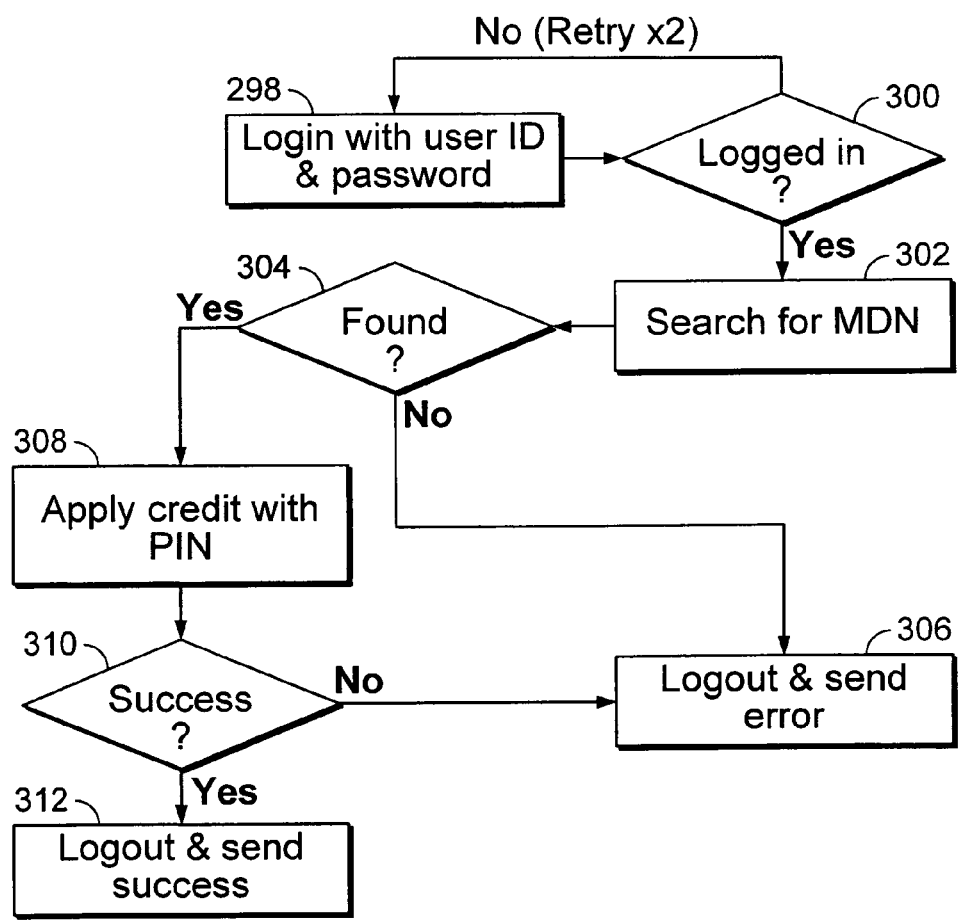

Referring to FIGS. 6a-d, the CDMA-related procedures shall now be discussed in further detail. FIGS. 6a-c show steps of the enablement method 100 relating to "activation" of the CDMA phone 30, which preferably include provisioning the CDMA phone 30, creating an account associated therewith, and the loading of promotional airtime minutes onto the account. FIG. 6d shows the loading of additional minutes onto the account (e.g., recharging).

Referring to step 222 of FIG. 6a, the master server 20 receives the preliminary data record, logs receipt thereof, creates a transaction record therefrom, assigns a transaction ID number thereto, and proceeds to step 224, where the master server 20 implements a stored procedure $SP_8$ that returns the user name and password for accessing the CDMA provisioning system 58. The user name and password are preferably unique with respect to each control system 12 (e.g., to each reseller). At step 20, the master server 226 updates its logs accordingly and proceeds to step 228.

At step 228, the master server 20 launches an application programming interface (API) for communicating with the CDMA provisioning module 92. The control modules 74 identify whether a session therewith is available. If a session is not available, then the enablement method 100 may loop for a defined period of time to check for a session. If a session is not available, then the caller is transferred to a customer service representative. If a session is available, then the enablement method 100 proceeds to step 230, where the master server 20 communicates with the CDMA provisioning modules 92 to launch the session. The enablement method 100 then proceeds to step 232.

At steps 232-252, the master server 20 typically undergoes a series of steps for retrieving transaction information to be provided to the CDMA provisioning modules 92 and for confirming receipt thereof. In the event that the transaction information is not received, the enablement method proceeds to step 236, where the master server 20 has the IVR system 24 send the voice prompt $M_{12}$ to the telephone client system 32 indicating that the caller will be transferred to a customer service representative. At step 236, the caller is then transferred to a customer service representative accessing the administrator workstation 42. Steps 232-252 shall now be discussed with further detail.

At step 232, the control modules 74 attempt retrieval of the ESN from the transaction record and, at step 234, check whether the attempted retrieval of the ESN was successful (regardless of whether the ESN had previously been used). If the ESN was successfully retrieved, the enablement method 100 skips to step 238, otherwise the enablement method 100 proceeds to step 236 where the voice prompt $M_{12}$ is initiated as discussed above.

At step 238, the control modules 74 attempt retrieval of a zip code associated with the selected ten digit NPA/MDN combination by looking up the first six digits thereof. At step 240, the control modules 74 verify whether the attempted retrieval of the zip code was successful. If the zip code was properly retrieved, the enablement method 100 proceeds to step 242, otherwise the enablement method 100 proceeds to step 236 where the voice prompt $M_{12}$ is initiated.

Referring to FIG. 6b at step 242, the control modules 74 attempt retrieval of a mobile identification number (MIN) from the CDMA provisioning system 58. The MIN is typically a number, such as a ten-digit number, used by a carrier to associate its systems with the ten-digit NPA/MDN combination. In some cases, a given MIN and a given ESN may be uniquely associated with one another. The MIN and codes analogous thereto, such as the MSID discussed below, are collectively referenced herein as "wireless carrier telephone numbers." Because the MDN is not directly associated with a given carrier, the MDN can be easily moved from said carrier to a new carrier, simply by re-associating the MDN with the MIN (or MSID, etc.) of the new carrier.

At step 244, the control modules 74 check whether the attempted retrieval of the MIN was successful. If the MIN was successfully retrieved, the enablement method 100 proceeds to step 246, otherwise the enablement method 100 goes to step 236 where the voice prompt $M_{12}$ is initiated. At step 246, the control modules 74 have the CDMA provisioning modules 92 "reserve" the MIN, which means that the CDMA provisioning modules 92 at least temporarily create a stored association between the retrieved MIN and the caller selected MDN. If the MIN was successfully reserved, then the enablement method 100 proceeds to step 250, otherwise the enablement method 100 skips to step 236 where the voice prompt $M_{12}$ is initiated.

At step 250, the control modules 74 undergo a series of other substeps for retrieving any additional information the CDMA carrier systems 46 may benefit from having and, at step 252, confirms whether said retrieval was successful. Such information may include, for example, a reference number of an order number created from the next available number. If the additional information was properly retrieved, the enablement method 100 proceeds to step 254, otherwise the enablement method 100 skips to step 236 where the voice prompt $M_{12}$ is initiated.

At step 254, the control modules 74 input the retrieved transaction information into one or more fields of a graphical user interface (GUI) of the CDMA provisioning modules 92, and at step 256, confirm whether said submission was successful. If the transaction information was properly inputted, the enablement method 100 proceeds to step 258, otherwise the enablement method 100 skips to step 236 where the voice prompt $M_{12}$ is initiated. At step 258, the control modules 74 submit a provisioning request to, for example, an API. At step 260, the control modules 74 confirm whether said submission was made. If the submission was made, the enablement method 100 proceeds to step 262, otherwise the enablement method 100 skips to step 236 where the voice prompt $M_{12}$ is initiated. At step 262, the master server 20 receives a reply from the CDMA provisioning modules 92 (e.g., via the API) indicating that the provisioning request was successful. The enablement method 100 proceeds to step 264, where the master server 20 implements a stored procedure $SP_9$ that send transaction information, such the DNIS, the dealer code, the ESN, the activation type, the starter kit PIN, if any, and the MDN. In return, the corresponding PIN and user name and password are retrieved. The enablement method proceed from step 264 of FIG. 6b to step 266 of FIG. 6c.

Referring to FIG. 6c, at step 266, the master server 20 provides the user ID and password to the CDMA loading system 60. At step 268, the control modules 74 confirm that the master server 20 has effectively logged into the CDMA loading system 60. If the master server 20 fails to log into the CDMA loading system 60, then the enablement method 100 loops back to step 266, affording the caller two retries before causing the voice prompt $M_{12}$ to be sent to the caller and connecting the caller to a customer service representative accessing the administrator workstation 42. If the master server 20 has successfully logged onto the CDMA loading system 60, then the enablement method proceeds from step 268 to step 270.

At step 270, an account is created in association with the CDMA phone 30 being enabled for use. The account is created using the MDN and PIN associated with the CDMA phone 30. Promotional airtime minutes may be loaded onto the account in accordance with the dealer code, the starter kit PIN, and any other information that may be representative of a promotion. At step 272, the account creation is verified for success, and if the account was successfully created, the enablement method skips to step 282, discussed below. If the account was not successfully created, the enablement method 100 proceeds to step 274. At step 274, the control modules 74 logout of the CDMA loading system 60 and, at step 276, the master server 20 causes the IVR system 24 to send the voice prompt $M_{12}$ to the caller and forwards the caller and the transaction record to the customer service representative and the administrator workstation 42, respectively. The enablement method 100 proceeds to step 278, where the PCS Database 86 is updated, and the call ends at step 280.

At step 282, the IVR system 24 sends a voice prompt $M_{21}$ to the telephone client system 32 indicating that the CDMA phone 30 has been activated and providing instructions as to how the caller can initiate transmission of over-the-air programming. The CDMA provisioning system 58 initiates an OTA session between the CDMA phone 30 and the CDMA wireless network 64 accordingly. The voice prompt $M_{21}$ also gives the caller an opportunity to obtain further assistance by asking the caller to input a "1" for further assistance or a "2" for no further assistance.

At step 284, the master server 20 identifies whether the caller would like additional assistance or not. If the caller does not prefer additional assistance, then the enablement method 100 proceeds to step 276, discussed above. If the caller does not need any additional assistance, then the enablement method 100 proceeds to step 286, where the status of the caller is maintained (e.g., preferably in a manner similar to that of step 104). If the caller is not a dealer, then the enablement method 100 proceeds to step 288, where the IVR system 24 sends the voice prompt $M_{10}$ to the telephone client system 32 indicating that the call is terminating. If the caller is a dealer, then the enablement method 100 skips to step 290. The dealer may also bypass steps 286 and 288 by proceeding from step 284 to step 290 via a dealer timeout 292.

At step 290, the master server 20 identifies whether the dealer has already activated ten prepaid wireless telephones. If the dealer has already activated ten prepaid wireless telephones, then the enablement method skips to step 288, where the IVR system 24 sends the voice prompt $M_{10}$ to the telephone client system 32 indicating that the call is terminating. If the dealer has not already activated ten prepaid wireless telephones, then the enablement method 100 proceeds to step 294, where the voice prompt $M_{22}$ is sent and the dealer is afforded an opportunity to elect to activate another one of the prepaid wireless telephones 14. At step 296, the master server 20 identifies whether the dealer wishes to enable use of another one of the prepaid wireless telephones 14, and if so, the enablement method 100 loops back to step 134 of FIG. 5b.

Referring to steps 298-312 of FIG. 6d, a caller may have minutes loaded onto the account in addition to those promotional minutes, if any, that were previously loaded onto the account after provisioning of the CDMA phone 30. Steps 298-312 may also typically be implemented to "recharge" an account, which is when the user of the CDMA phone 30 has "used up" his or her airtime minutes and wishes to purchase additional airtime minutes and have said additional airtime minutes loaded onto the account associated with the CDMA phone 30. Because steps 298-312 may be implemented independently of steps 101-296, no connection of flow is shown between FIG. 6d and the steps of FIGS. 6a-c. Because recharging typically occurs after activation, however, steps 298-312 shall be discussed at this point in the description of the exemplary embodiments.

At step 298, the master server 20 logs into the CDMA loading system 60 and provides the user ID and password and proceeds to step 300, where the master server 20 identifies whether the login was successful. If the login was not successful, then the enablement method 100 loops back to step 298. If the login was successful, then the enablement method proceeds to step 302. At step 302, the master server 20 searches the database server 22 for the MDN corresponding to the CDMA phone 30 that is sought to be enabled for use. The enablement method 100 proceeds to step 304, where the master server 20 identifies whether it has successfully located the MDN. If the master server 20 has not located the MDN, then the enablement method 100 proceeds to step 306, where the master server 20 is logged out from its session with the CDMA loading system 60, and an error is noted on the transaction record. If the master server 20 does identify the MDN, the enablement method 100 proceeds to step 308.

At step 308, the CDMA loading modules 94 apply a credit of airtime minutes to the account associated with the CDMA phone 30, which is done by validating the PIN. The PIN may be provided by the caller; however, it is preferred that the PIN is not known to the caller. Rather, the control system 12 provides a transaction ID to the caller upon successfully loading airtime. A PIN is a code that is commonly under the control of the carrier, while the transaction ID is a representation of the successful loading of airtime minutes (e.g. using the PIN). The PCS database 86 stores an association between the PIN and the transaction ID.

Continuing with reference to step 308, the master server 20 retrieves the PIN from the PCS database 86 and provides the PIN to the CDMA loading system 60. The CDMA loading system 60 provides additional airtime minutes onto the account associated with the CDMA phone 30 sought to be enabled for use. At step 310, the master server 20 identifies whether the loading of airtime minutes was successful and, if it was not, the enablement method 100 skips to step 306, where the master server 20 is logged out from its session with the CDMA loading system 60. If the master server 20 was successful in loading the minutes, the enablement method 100 proceeds to step 312, where the master server 20 is logged out and a voice prompt is sent to the telephone client device 32 indicating to the caller that the recharge was successful.

Referring to FIGS. 7*a*-*d*, steps 314-428 of the enablement method 100 are shown and described in connection with enabling use of the TDMA phone 26. As discussed above, in the event the caller desires to enable use of the TDMA phone 26, the caller uses the telephone client system 32 to connect with the IVR system 24. At step 101 of FIG. 4, it is identified that the TDMA carrier system 44 corresponds to one of the prepaid wireless telephones 14 being enabled for use, and the enablement method 100 proceeds through steps 102-220 of FIGS. 5*a*-*d*. Then, at step 220, the enablement method 100 proceeds to step 314 of FIG. 7*a*, and steps 314-428 are implemented as shown and described.

For the purpose of clarity, it is noted that the flow of steps 314-428 is shown to weave between the flow chart sections of FIGS. 7*a*-*d*. The flow is shown as such so as to group steps having some common features on the same drawing sheet. For example, many of steps 322-352 and steps 372-378 relate to provisioning and have thus been shown together on FIGS. 7*a* and 7*b*. Furthermore, many of steps 354-370 and steps 380-406 relate to loading and have thus been shown together on FIGS. 7*c*-*d*.

Figure 7A:
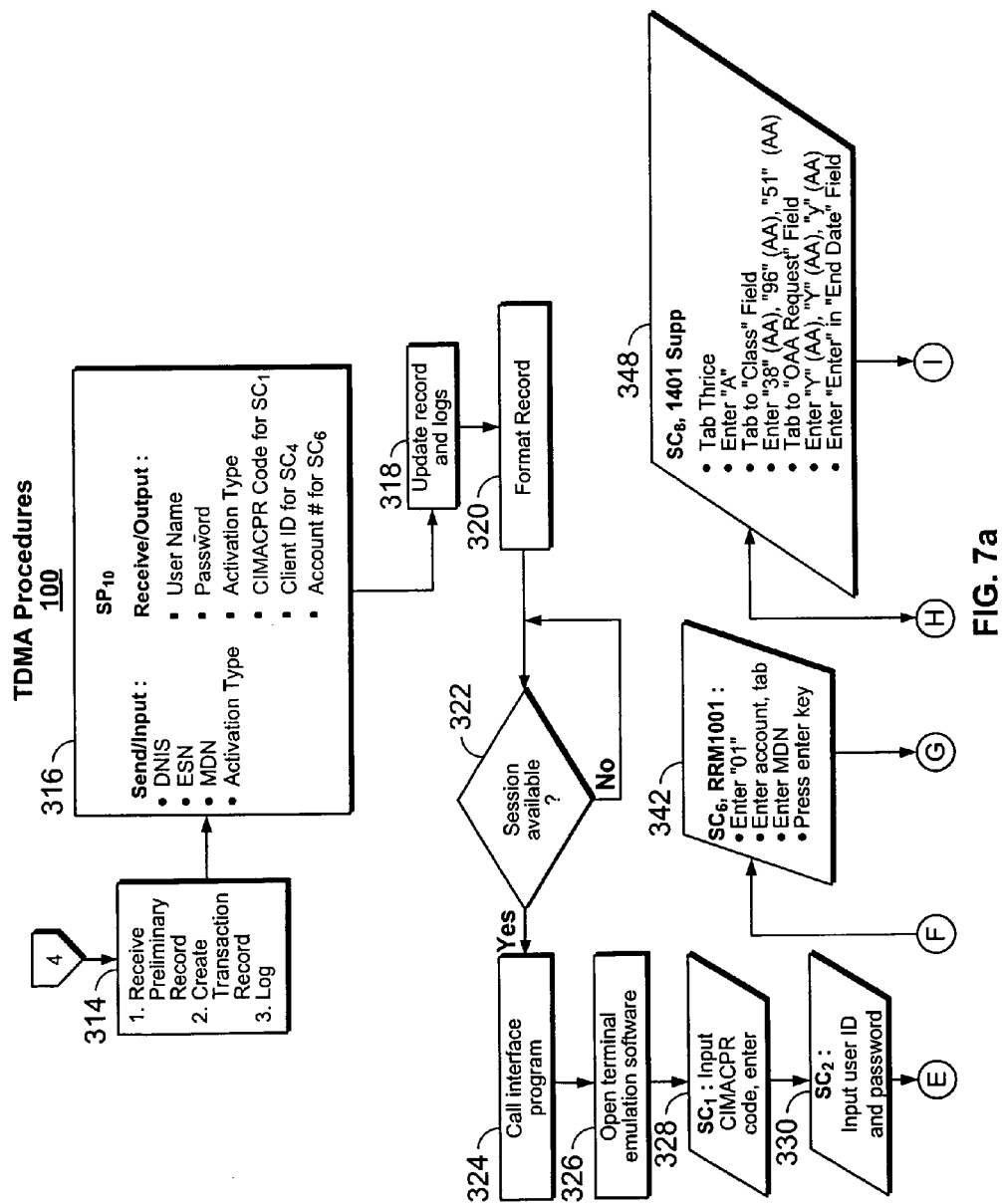
FIGS. 7a-d are sections of the flow chart showing provisioning and loading steps of the enablement method relating to the TDMA phone.

Referring to FIG. 7*a*, at step 314, the master server 20 receives the preliminary data record from the IVR system 24, logs said receipt thereof, creates a transaction record therefrom, assigns a transaction ID number thereto, and proceeds to step 316. At step 316, the master server 20 implements a stored procedure $SP_{10}$, which sends transaction information associated with the transaction record to the PCS database 86, such as the DNIS, the ESN, the MDN, and the activation type. In return, the database server 22 provides to the master server 20 a user name and password for accessing the TDMA provisioning modules 88. The master server 20 may retrieve additional transaction information from the database server 22 at step 316 particular to the type of TDMA provisioning system 50 being utilized. In the exemplary embodiment of the invention, the master server 20 outputs the user name and password, the activation type, a CIMACPR code (analogous to the "rate area" discussed above, but associated with certain markets), a client ID, and an account number.

The promotion code is stored in the accounting database 84 in association with the activation type and dealer code. The master server 20 can identify the promotion code by providing the dealer code and the activation type to the database 22 and by requesting the promotion code in response thereto. There are preferably three types of promotions, including "RP", where the dealers buy and activate phones sold by the reseller, "DP", where the dealers activate phones not purchased from the reseller, and "SK", where the dealers sell the starter kit to end users who may activate their one of the prepaid wireless telephones 15. In each of the three cases, the dealers and consumers preferably receive free, promotional airtime minutes. However, the quantity may vary, depending upon the activation type (e.g., promotions). During activation of the TDMA phone 26, the promotional minutes are preferably loaded onto the consumer's account associated with the TDMA phone 26. It is noted that one skilled in the art shall appreciate that embodiments of the invention relating to the CDMA phone 30 and/or the GSM phone 28 may also incorporate the promotion features herein described in connection with the TDMA phone 26.

Continuing with reference to FIG. 7*a*, after the master server 20 receives the transaction information from the database server 22 at step 316, the enablement method 100 proceeds to step 318, where the master server 20 updates its logs accordingly. The enablement method 100 then proceeds to step 320, where the master server 20 formats a record having the user name and password for accessing the TDMA provisioning modules 88, the CIMACPR code, the customer ID, the MDN selected by the caller, the ESN, and an account number. The enablement method 100 proceeds to step 322, where the master server 20 identifies whether a session is available with the TDMA provisioning modules 88 and loops for a predefined period of time until a session is available. If a session is available, the enablement method 100 proceeds to step 324, where the master server 20 calls the interface program at the TDMA provisioning system 50. The call may be forwarded to a customer service representative if a session is unavailable.

Figure 7B:
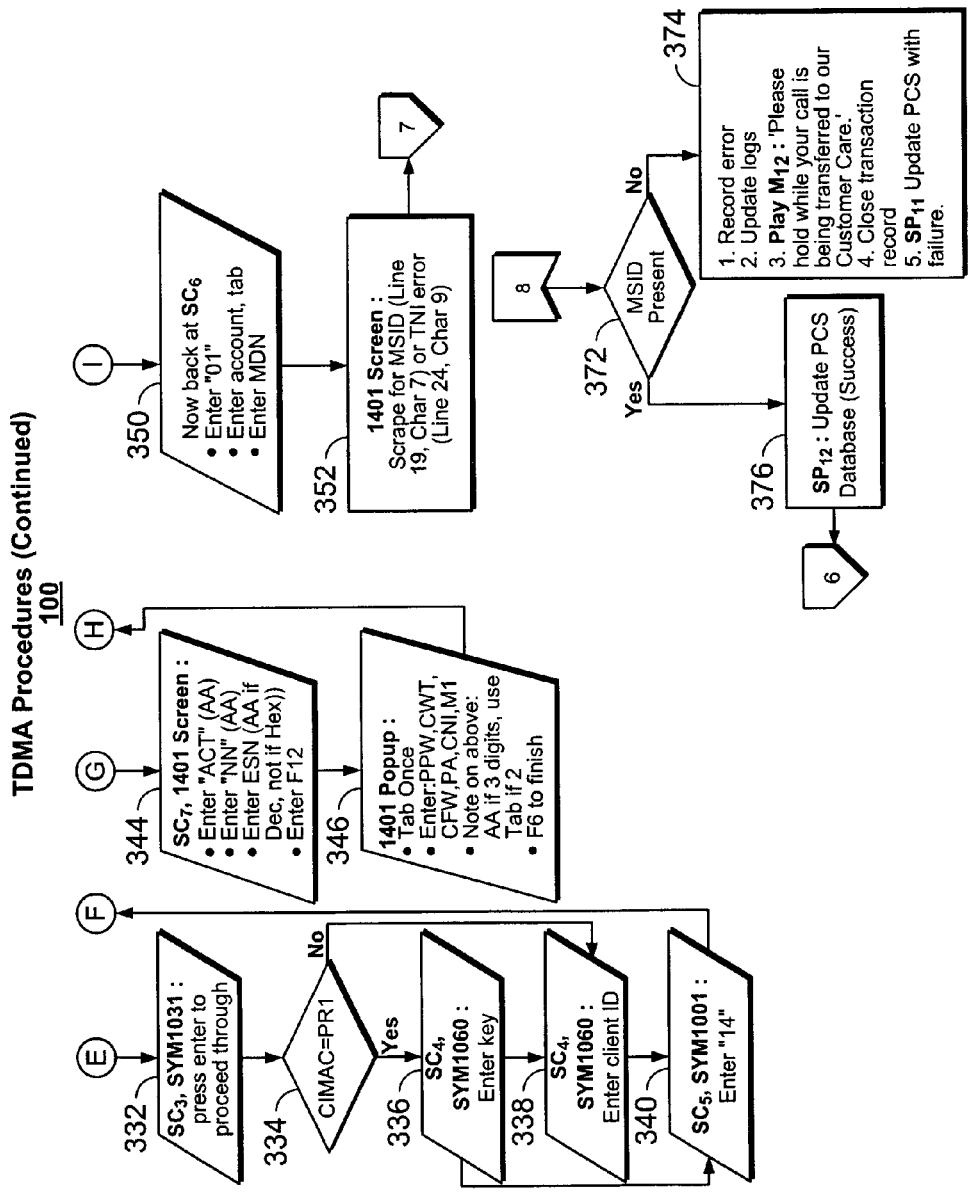
Figure 7C:
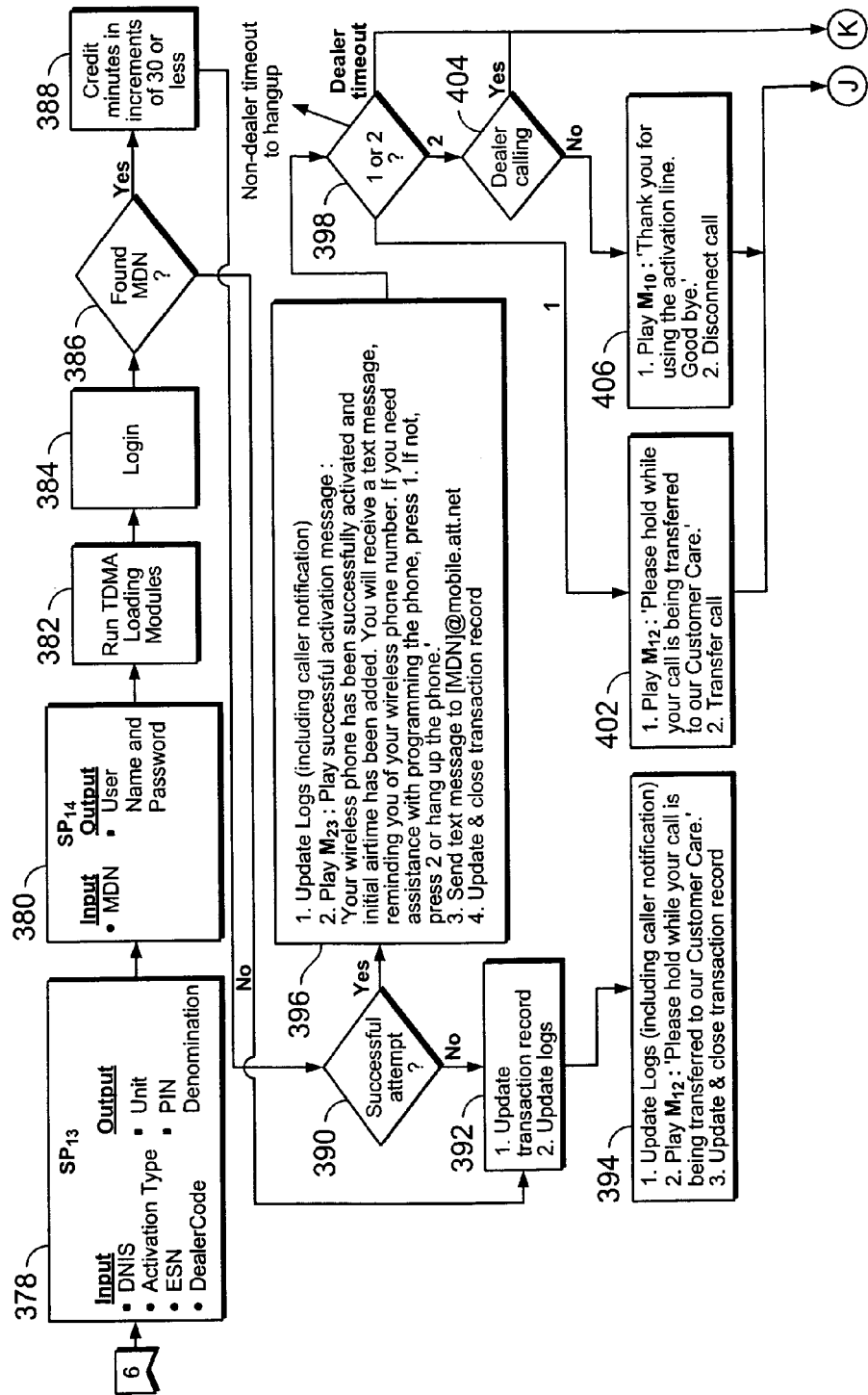
Figure 7D:
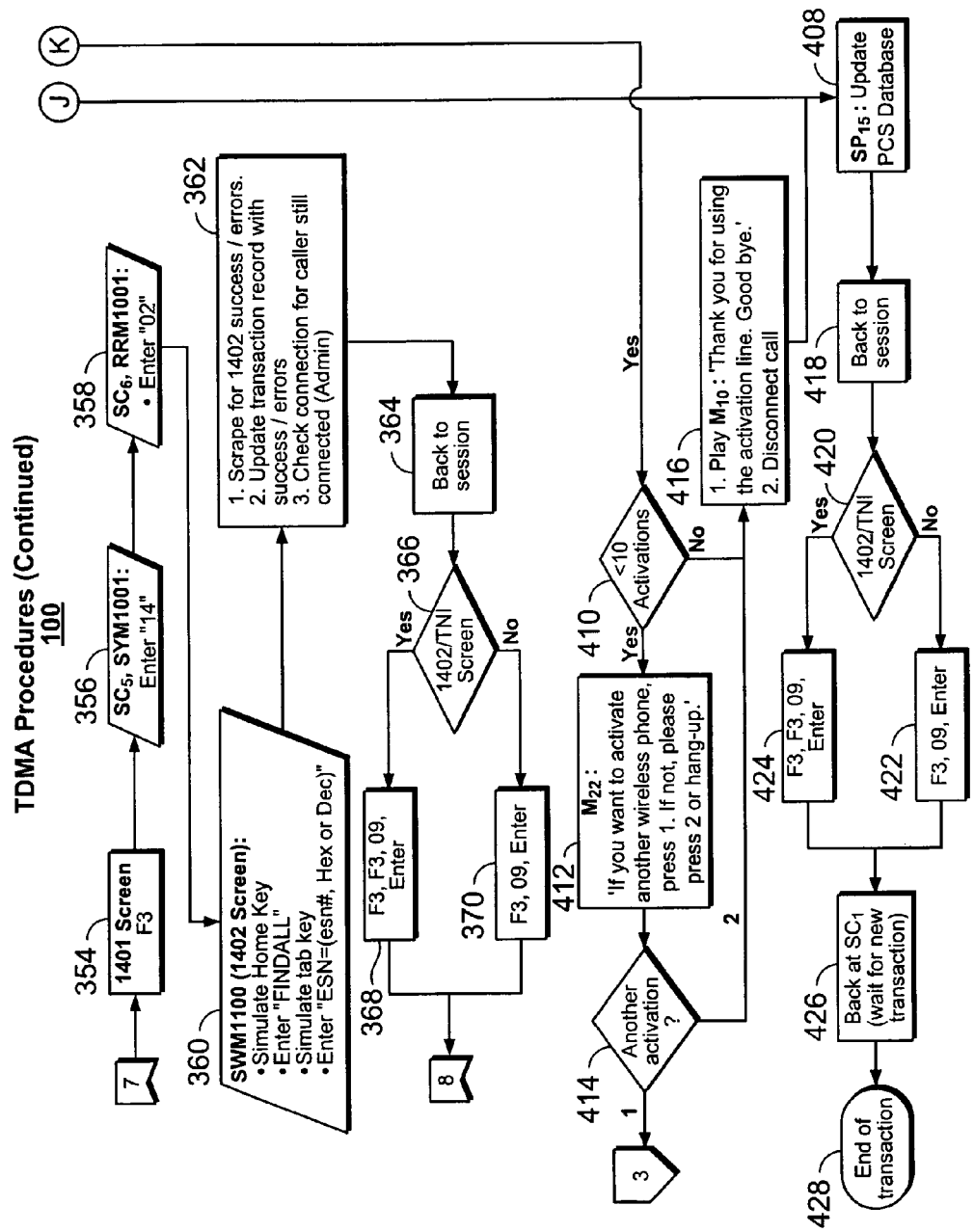

The enablement method 100 proceeds to step 326, where terminal emulation software is opened. Provisioning of the TDMA phone 26 then proceeds in connection with steps 328-352 of the enablement method 100 as shown in FIGS. 7*a*-*b* (and then later proceeds through steps 372-378 also shown in FIG. 7*b*). Various TDMA provisioning modules are known in the art, and for the purpose of illustration, exemplary screens thereof are referenced as screen $SC_n$, wherein n is representative of a screen number. As stated above, the control modules 74 preferably comprise display capture modules, such as those incorporating a screen scraping technology, for communicating with the TDMA provisioning system 50. As used herein, the terms "screen scraping", etc., refer to software that extracts data from a screen without requiring substantial user intervention.

At step 328, the control modules 74 pass the CIMACPR code to the TDMA provisioning modules 88 by sending the CIMACPR code to a field thereof corresponding to a screen $SC_1$ and by appending the CIMACPR code with an enter function code. The enablement method 100 proceeds to step 330, where the control modules 74 pass the user name and password for accessing the TDMA provisioning system 50 to the TDMA provisioning modules 88 by sending the user name and password to fields thereof corresponding a screen $SC_2$. The enablement method 100 proceeds to step 332, where the control modules 74 pass the enter function code to the TDMA provisioning modules 88 by sending the enter function code to a field thereof corresponding to a screen $SC_3$, SYM1031. The enablement method 100 then proceeds to step 334. At step 334, if the CIMAC is not equal to PR1, then the enablement method 100 skips to step 338. This is an exception case for when CIMAC equals PR1 (for a certain market set by the TDMA carrier system 44).

At step 336, the control modules 74 pass the enter function code to the TDMA provisioning modules 88 by sending the enter function code to a field thereof corresponding to a screen $SC_4$, SYM1060, and the enablement method 100 skips to step 340. At step 338, the control modules 74 pass the client ID to the TDMA provisioning modules 88 by sending the enter function code to a field thereof corresponding to the screen $SC_4$, SYM1060, and the enablement method 100 proceeds to step 340. At step 340, the control modules 74 pass the string "14" to the TDMA provisioning modules 88 by sending the string to a field thereof corresponding to a screen $SC_5$, SYM1001. The enablement method 100 proceeds to step 342.

At steps 342-352, further transaction information is passed into the fields of the TDMA provisioning modules 88 corresponding with the screen displays thereof. At step 342 and a screen $SC_6$, RRM1001, the string "01", the account number, a tab function code, the MDN, and the enter function code are passed to the TDMA provisioning modules 88. At step 344 at a "1401" Screen, the string "ACT", the string "NN", the ESN, and the F12 function code are passed to the TDMA provisioning modules 88. At step 346 at a "1401" Popup, the tab function code, and PPW (prepaid wireless), CWT (call waiting), CFW (call forward), PA (voicemail and text message), CNI (caller ID), M1 (test message activation code) information are passed, as well as the F5 function code. At step 348 at a screen $SC_8$, "1401" Supp, three tab function codes, the string "A", the tab function code to the "Class" Field, sting "38", string "96", string "51", tab function code entry to the "OAA Request" Field, string "Y" twice, string "y" once, and the string "Enter" in the "Enter" field are passed. At step 350 at a screen $SC_6$, the string "01", the account number, a tab function code, and the MDN are passed. At step 352 at a "1401" Screen, the control modules 74 "scrape" for the MSID (Line 19, Char 7) or TNI Error (Line 24, Char 9). The enablement method 100 preferably then proceeds to the loading process at step 354 of FIG. 7d.

At step 354 at a "1401" screen, an F3 function code is passed, and at step 356 and the screen $SC_6$, SYM1001, the string "14" is passed. At step 358 at the screen $SC_6$, RRM1001, the string "02" is passed, and at step 360 at the screen SWM1100 (1402 Screen), the home key function code, the string "FINDALL", the tab function code, the string "ESN=" and the ESN are passed in either hex or dec format. At step 362, the control modules 74 preferably screen scrape for 1402 success or errors, update the transaction record accordingly, and check to confirm that the telephone client system 32 is still in communication therewith. The enablement method then proceeds to step 364.

At step 364, the control system 12 proceeds back to the session with the TDMA provisioning modules 88, and at step 366, identifies whether there is a 1402/TNI screen. If there is a 1402/TNI screen, then the enablement method 100 proceeds to step 368, where the F3 function code is passed, the F3 function code is again passed, and the string "09" is passed, and the enablement method 100 proceeds to step 372 of FIG. 7b. If there is no 1402/TNI screen, then the enablement method 100 skips to step 370, where the F3 function code, the string "09", and the enter function code are passed, and the enablement method proceeds to step 372 of FIG. 7b.

At step 372 of FIG. 7b, the control modules 74 identify whether the MSID number was successfully retrieved. The MSID number is analogous to the MIN discussed above in connection with the CDMA carrier system 46, and, similarly thereto, is a type of a "wireless carrier telephone number," as such term has been discussed above. In the event that the MSID number has not been successfully retrieved, then the enablement method 100 proceeds to step 374, where an error is recorded, the logs are updated, and the transaction record is closed. Also at step 374, the master server 20 implements a stored procedure $SP_{11}$ to update the PCS database 86 in accordance with the error, and the IVR system 24 sends the voice prompt $M_{12}$ to the telephone client system 32 indicating that the call will be transferred to a customer service representative. In the event that the MSID has been successfully received, then the enablement method 100 skips to step 376, where the master server 20 implements a stored procedure $SP_{12}$ to update the PCS database 86 accordingly. The enablement method proceeds from step 376 of FIG. 7b to steps 378 of FIG. 7c.

At step 378, the control modules 74 create a replenishment record, which is a term used to describe the account associated with the TDMA phone 26 onto which airtime minutes may be loaded. The master server 20 implements a stored procedure $SP_{13}$, which provides the DNIS, activation type, ESN, and the dealer code to the database server 22 and retrieves the units and PIN denominations from the database server for the TDMA loading modules 90. At step 380, the master server 20 implements a stored procedure SP14, which provides the MDN to the database server 22 and receives the user name and password for the TDMA loading modules 90. At step 382, the control modules 74 run the TDMA loading modules 90, and at step 384, the control system 12 logs therein, and the enablement method 100 proceeds to step 386.

At step 386, it is confirmed whether the MDN has been found, and if it has so been, then the enablement method 100 proceeds to step 388 where airtimes minutes are loaded onto the account. The airtime minutes are preferably, but not necessarily, loaded in increments of thirty or less minutes. The enablement method 100 proceeds from step 388 to step 390. If the MDN was not successfully found, then the enablement method skips from step 386 to step 392. At step 390, the control modules 12 identify whether airtime minutes were successfully loaded onto the account associated with the TDMA phone 26, and if they were not, then the enablement method 100 proceeds to step 392. At step 392, the transaction record and logs are updated accordingly, and where the enablement method 100 proceeds to step 394 to further update the logs, notify the caller of the failure, close the transaction record, and send the voice prompt $M_{12}$. As stated above, if the airtime minutes were successfully loaded, then the enablement method proceeds from step 390 to step 396.

At step 396, the control modules 12 update the logs, and the IVR system 24 sends a voice prompt $M_{23}$ to the telephone client system 32 indicating that activation has been successful. As shown in FIGS. 1 and 2, the control system 12 may then send a text message to the TDMA phone 26 for display of the MDN to the user thereof. Referring back to FIG. 7c, the caller is asked whether assistance is needed with programming the TDMA phone 26, and the caller may indicate that such assistance is needed, by inputting "1", or not needed, by inputting "2". The transaction record is updated accordingly and closed, and the enablement method 100 proceeds to step 398.

At step 398, it is identified whether the caller pressed "1", whether the caller pressed "2", or whether a dealer timeout occurred. If the caller pressed "1", the enablement method 100 proceeds to step 402 where the voice prompt $M_{12}$ is sent, where the call is transferred to a customer service representative, and the enablement method 100 proceeds to step 408, discussed below. If a dealer timeout has occurred, then the enablement method 100 proceeds to step 410, discussed below. If the caller pressed "2", then the enablement method 100 proceeds to step 404, where it is identified whether the caller is a dealer. If the caller is a dealer, then the enablement method proceeds to step 408, discussed below. If a dealer is not calling, then the enablement method 100 proceeds to step 406, where the voice prompt $M_{10}$ is sent, the call is disconnected, and the enablement method proceeds to step 408, discussed below.

As stated above, the enablement method 100 proceeds to step 410 upon dealer timeout. At step 410, the control modules 74 identify whether the dealer has already activated ten prepaid wireless telephones 14 on the same call. If the caller has done so, then the enablement method 100 proceeds to step 416, where the voice prompt $M_{10}$ is sent to the telephone client system 32, the call is disconnected, and the enablement method 100 proceeds to step 408, discussed below. If less than ten activations have occurred on the same call, then voice prompt $M_{22}$ is sent to the telephone client system 32 to ask the dealer whether additional prepaid wireless telephone 14 are to be activated. If the dealer indicates that no further activations are to occur, then the enablement method 100 proceeds to step 416, discussed above, and then proceeds to step 408. If the caller desires to activate another one of the prepaid wireless telephone 14, then the enablement method loops back to step 134 of FIG. 5*b*.

At step 408, the master server 20 implements the stored procedure $SP_{15}$ to update the PCS database 82 accordingly. The enablement method 100 proceeds to step 418 back to the session with the TDMA provisioning modules 88. At step 420, the control modules 74 identify whether there is a 1402/TNI screen. If the 1402/TNI screen is not identified, then the enablement method 100 proceeds to step 422, where the F3 function code, the string "09", and the enter function code are passed. If the 1402/TNI screen is identified, then the enablement method 100 proceeds to step 424, where the F3 function code is twice passed, the string "09" is passed, and the enter function code is passed. From step 422 and/or step 424, the enablement method 100 proceeds to step 426 at screen $SC_1$ to await another transaction, and, to step 428, the present transaction ends.

Referring to FIGS. 8*a-f*, steps 502-650 of the enablement method 100 are shown and described in connection with enabling use of the GSM phone 28. As discussed above, in the event the caller desires to enable use of the GSM phone 28, the caller uses the telephone client system 32 to connect with the IVR system 24. At step 101 of FIG. 4, it is identified that the GSM carrier system 48 corresponds to the one of the prepaid wireless telephones 14 being enabled for use, and the enablement method 100 proceeds to step 502 shown in FIG. 8 for implementation of steps 502-650 as shown and described.

Figure 8A:
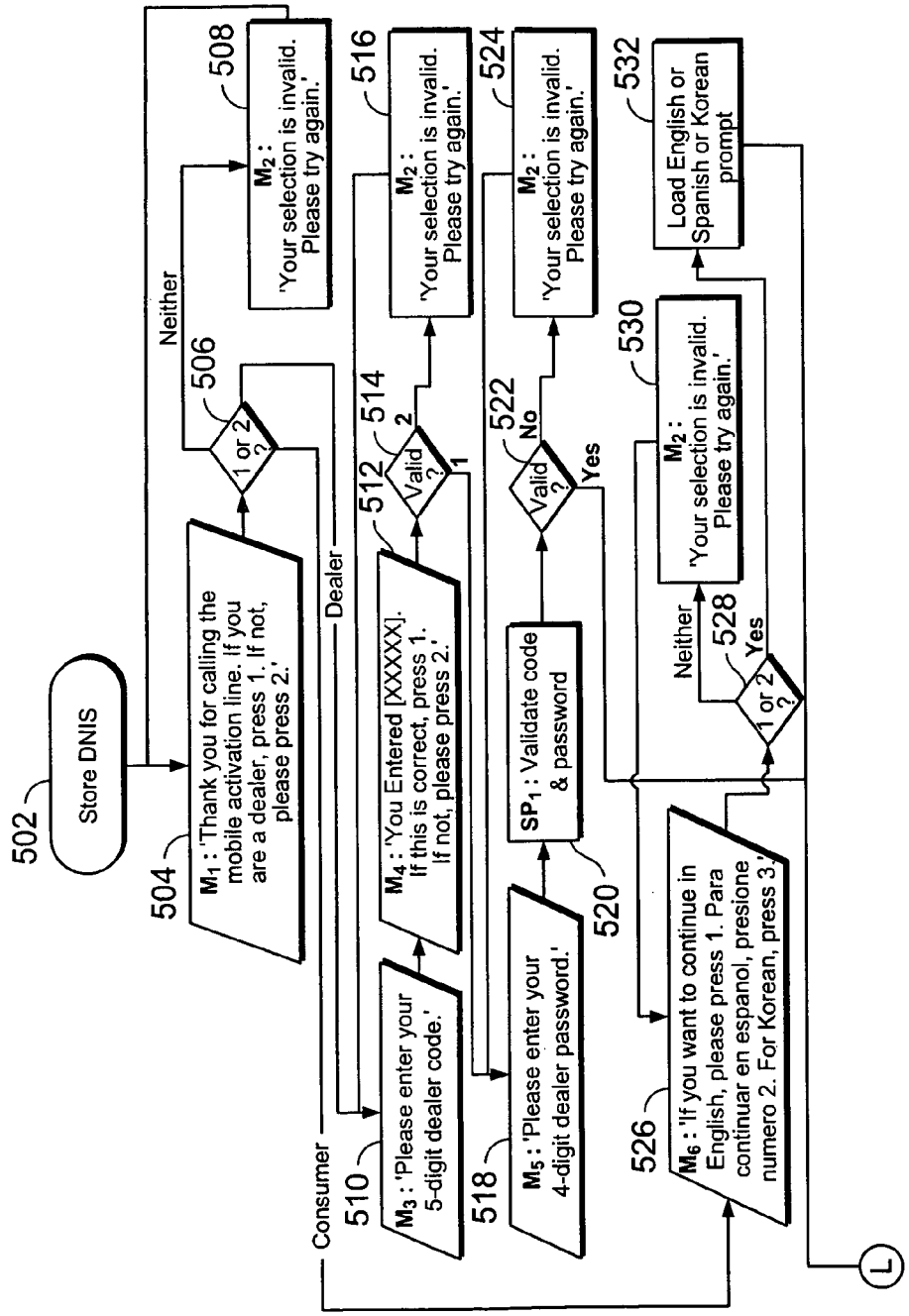
FIGS. 8a-8f are sections of the flow chart showing steps of the enablement method relating to the GSM phone.

Steps 502-532 of FIG. 8*a* are similar to the steps 102-132 described above in connection with FIG. 5*a*, and steps 502-532 have been so designated by reference numbers corresponding thereto being increased by four hundred. In proceeding through steps 502-532, the DNIS number is stored in the preliminary data record and the caller identified whether the caller is a dealer or consumer. The control system 12 obtains and stores in the preliminary data record the dealer code, if any, the dealer password, if any, and the caller's selected language. However, whereas it is shown and described in connection with FIG. 5*a* that the language choices include English and Spanish, it is shown and described in connection with FIG. 8*a* that the language choices include English, Spanish, and Korean. It shall be clear to one skilled in the art that any suitable language may be implemented. The enablement method proceeds from step 532 of FIG. 8*a* to step 534 of FIG. 8*b*.

Figure 8B:
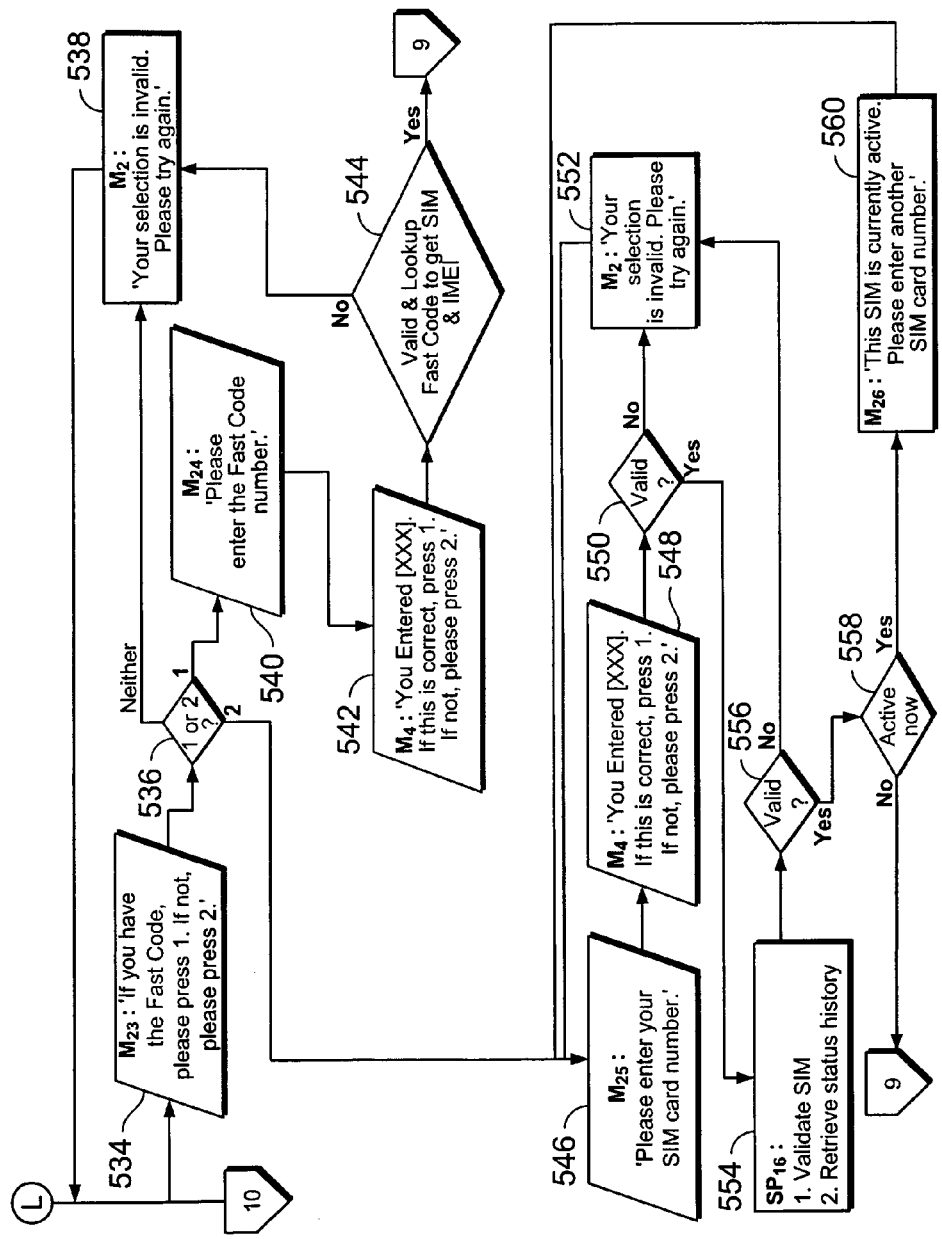

Referring to FIG. 8*b* at step 534, the IVR system 24 sends a voice prompt $M_{25}$ to the telephone client system 32 asking the caller to input a "1" if the caller has a "fast code" or a "2" if the caller does not have a fast code. As used herein, the term "fast code" is used to reference a number typically assigned to the GSM phone 28 by the reseller and associated therewith in the PCS database 86. Whereas the fast code may be eight digits in length, for example, the SIM card number and IMEI may be about thirty-five digits in length. By entering the fast code instead of the SIM card number and IMEI number, the caller enters less digits, and is less susceptible to inadvertently entering a wrong digit as a result of lack of finger coordination, "fat fingers", etc.

At step 526, the caller's response to voice prompt $M_{25}$ is identified. If the caller has provided an invalid response, then the enablement method 100 proceeds to step 538, where the IVR system 24 sends the voice prompt $M_2$ to indicate said invalidity and loops back to step 534. If the caller indicates having a fast code, then the enablement method 100 proceeds to step 540, where the voice prompt $M_{26}$ is sent requesting the fast code. The caller response thereto is analyzed and, at step 542, the voice prompt $M_4$ is sent requesting confirmation that the fast code was accurately identified.

If the caller indicates that the fast code was correctly identified, the fast code is stored in the preliminary data record and the control modules 74 validate the fast code against the PCS database 86, which may be done using a stored procedure. The control modules 74 retrieve a subscriber identity module (SIM) card number, status relating thereto referenced as the SIM status history, and a serial number, such as an international mobile equipment identity (IMEI), corresponding to the GSM phone 28. If step 544 is successful, then the SIM card number, SIM status history, and IMEI are stored in the preliminary data record, and the enablement method 100 proceeds to step 586, which is discussed below in connection with FIG. 8*c*. If it is not successful, then the enablement method 100 loops back to step 538, where voice prompt $M_2$ is sent, and where the enablement method 100 then loops back to step 534, thereby affording the caller another opportunity to provide the fast code.

If the caller did not have a fast code, then at step 546, the IVR system 24 sends a voice prompt $M_{27}$ to the telephone client system 32 requesting that the caller provide the SIM card number and the control system 12 identifies the response of the caller thereto. At step 548, the IVR system sends the voice prompt $M_4$ to confirm the accuracy of the identified SIM card number, and at step 550, the control system 12 identifies the response of the caller thereto. If the caller has indicated that the identified SIM card number is inaccurate, then the enablement method 100 proceeds to step 552, where the voice prompt $M_2$ is sent to the caller indicating that the caller should reenter the SIM card number, and where the enablement method 100 loops back to step 546. If the caller has indicated that the identified SIM card number is accurate, then the SIM card number is stored in the preliminary data record and the enablement method 100 proceeds to step 554. The IMEI is preferably stored in the PCS database 86 in association with the SIM card number, and may be stored in the preliminary data record.

At step 554, the IVR system 24 calls a stored procedure $SP_{16}$ from the master server 20 to validate the SIM card number and obtain a status history thereof, referenced herein as SIM status information. The master server 20, in response to the call for the stored procedure $SP_{16}$, validates the SIM card number and obtains the SIM status information therefore against corresponding transaction information stored in the PCS database 86 of the database server 22. The master server 20 sends the results of the validation and status check to the IVR system 24. In preferred embodiments of the invention, the database server 22 stores information in the SIM status history indicating that an instance of attempted activation has occurred in connection with the SIM card number, and may also store additional information associated with said instance of attempted activation (e.g. the dealer code, etc.). The SIM status history assists in preventing fraud, such as that described above in connection with the ESN status history and steps 150-156 of FIG. 5*b*.

At step 556, the control system 12 identifies whether the SIM card number is valid. If the SIM card number is invalid, the enablement method 100 loops back to step 552, where the IVR system 24 sends the voice prompt $M_2$ to the telephone client system 32 informing the caller of said invalidity, and the enablement method 100 then loops back to step 546. If the SIM card number is valid, the enablement method 100 proceeds to step 558.

At step 558, the IVR system 24 identifies from the SIM status information whether the GSM phone 28 is active concurrently therewith. If the SIM card number is active, the enablement method 100 proceeds to step 560, where the IVR system 24 sends the voice prompt $M_8$ to the telephone client system 32 informing the caller of said activity, and the enablement method 100 loops back to step 546, allowing the caller to provide another SIM card number. If the SIM card number is not currently active, then the SIM card number, SIM status history, and IMEI number corresponding thereto are saved in the preliminary data record, and the enablement method 100 proceeds from step 558 of FIG. 8*b* to step 586 of FIG. 8*c*.

Figure 8C:
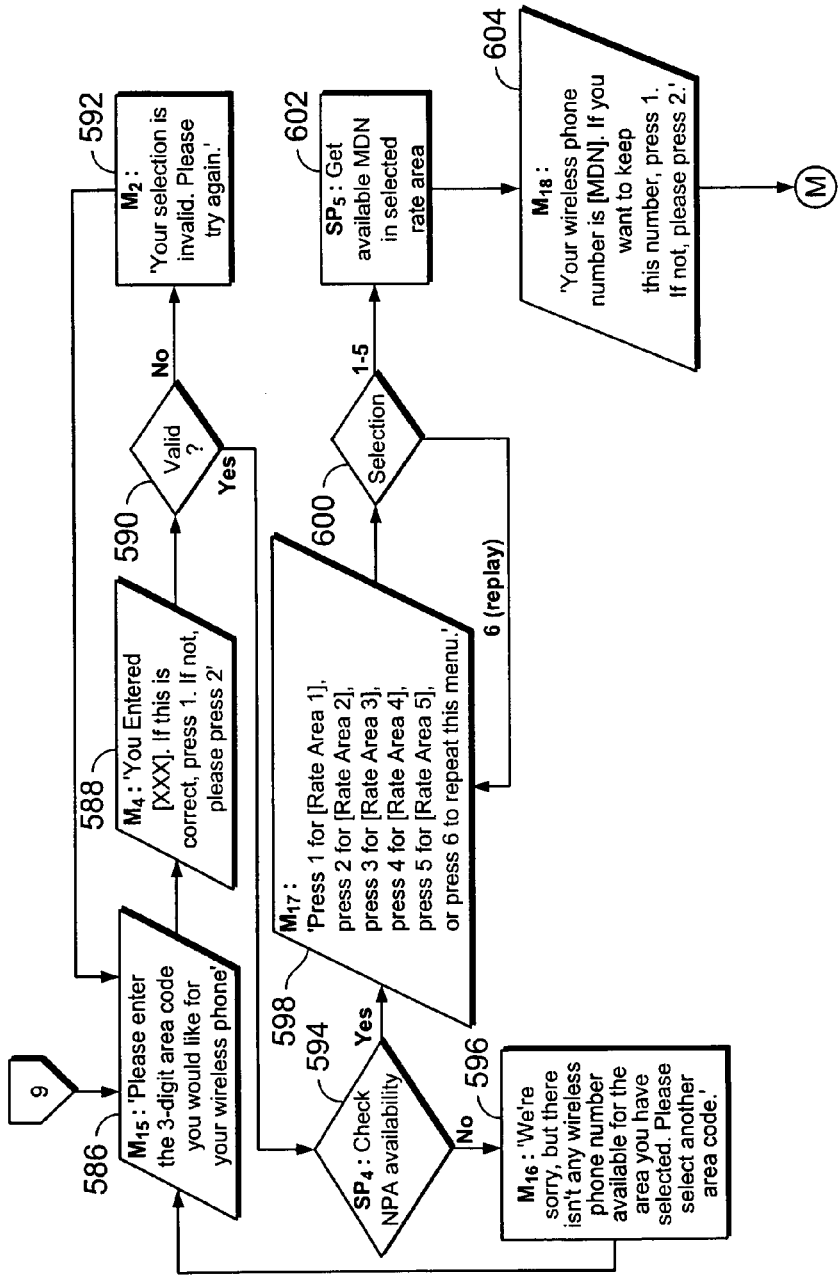
Figure 8D:
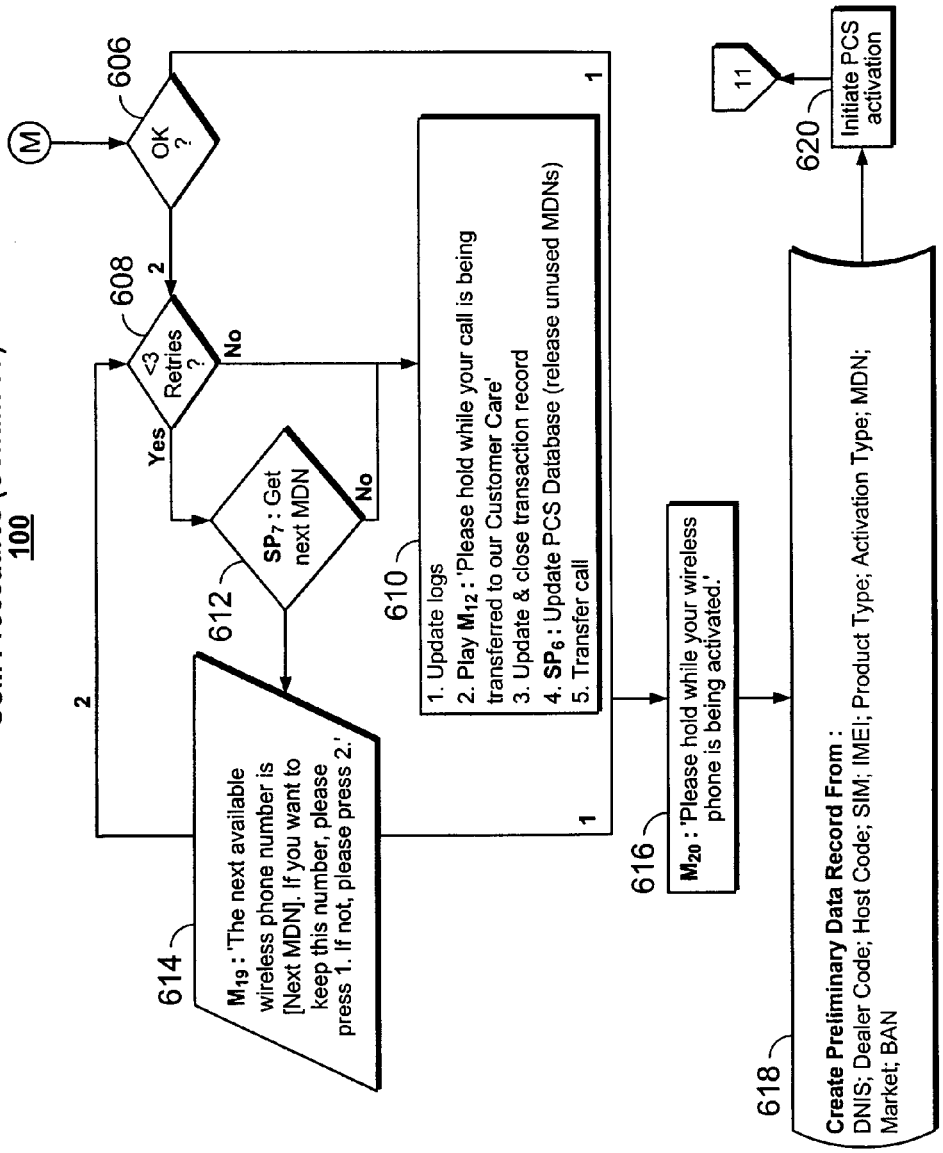

Steps 586-616 of FIGS. 8*c-d* are similar to the steps 186-216 described above in connection with FIGS. 5*c-d*, and steps 586-616 have been so designated by reference numbers corresponding thereto being increased by four hundred. In proceeding through steps 586-616, the NPA code, the "market" (which corresponds to the rate area), and a caller-selected MDN are received by the control system 12 and stored in the preliminary data record. A billing account number (BAN) associated the GSM phone 28 is also stored therein, as well as an indication of which activation software is associated with the transaction. Although FIG. 4 shows one set of GSM provisioning modules 96, two alternative sets of provisioning modules may be used, wherein each set is associated with a different business entity and, in some embodiments of the invention, a different GSM provisioning system. In this regard, each MDN is associated with one of the two systems and, in order to implement the appropriate system, the master server 20 evaluates the MDN.

At step 618, the IVR system 24 imparts its imprimatur to the preliminary data record, and the enablement method 100 then proceeds to step 620, where the preliminary data record is forwarded to the master server 20. The enablement method then proceeds to step 622 of FIG. 8*e* for processing in connection with the activation of the GSM phone 30.

Figure 8E:
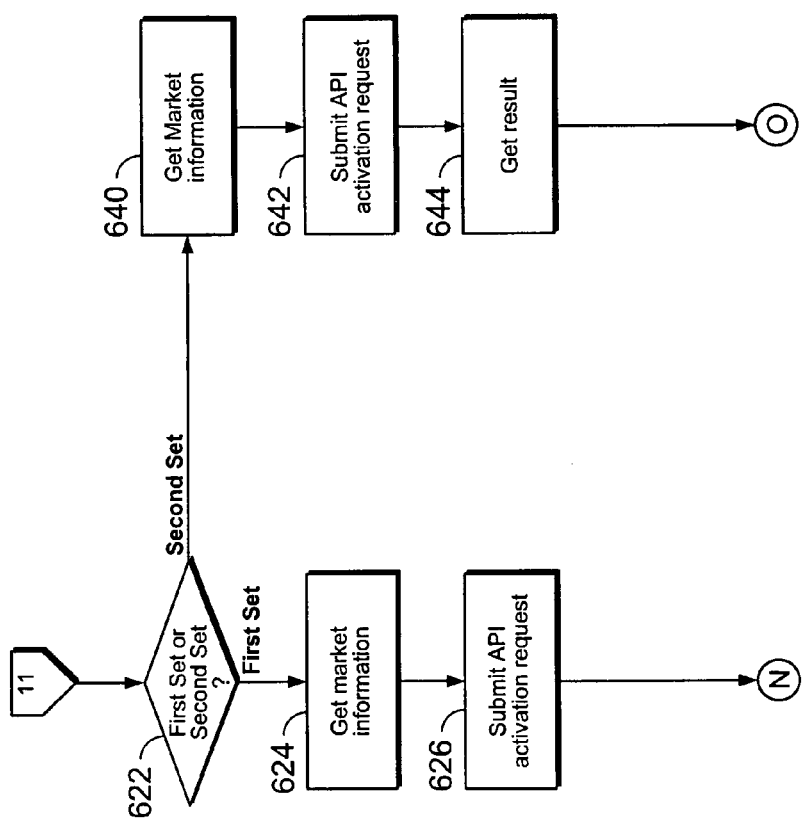
Figure 8F:
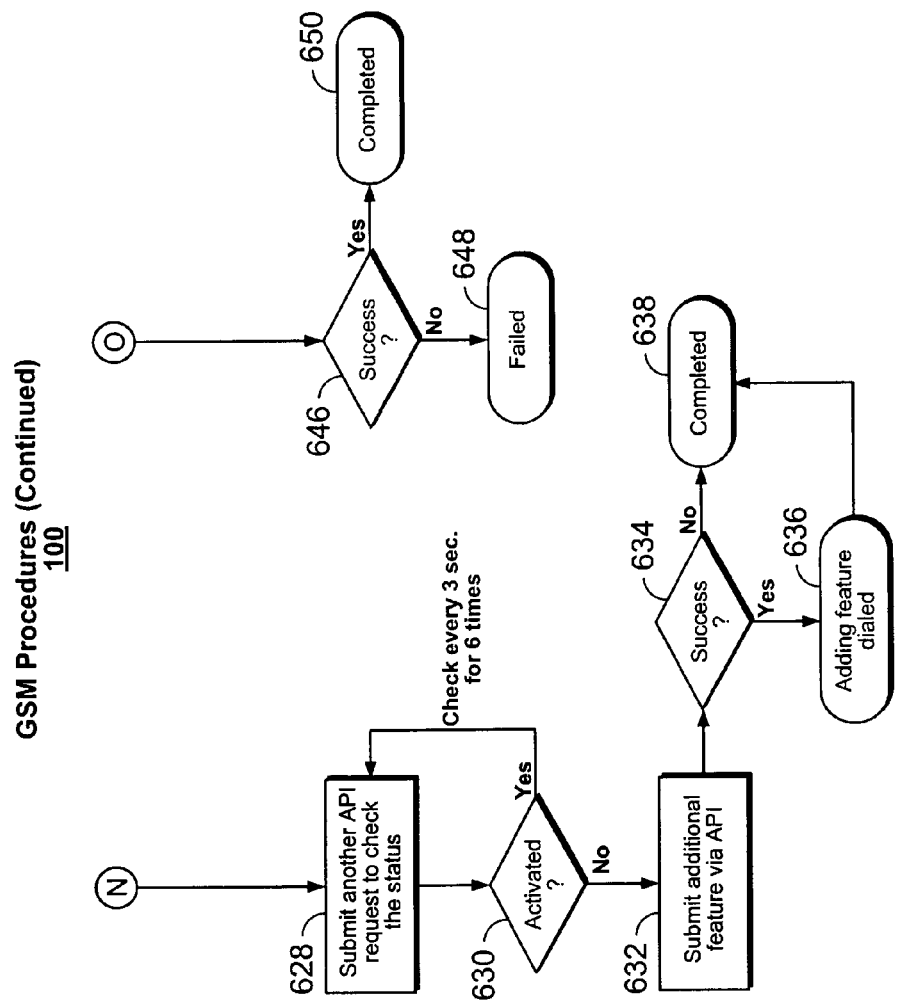

Referring to FIGS. 8*e-f*, at step 622 the control system 12 identifies which set of GSM provisioning modules are to be used to provision the GSM phone 28. The control modules 74 include an application programming interface (API) for communication with the GSM provisioning modules 96 through the GSM carrier VPN 68. If a first set, for example, is to be used, then the enablement method 100 proceeds to step 624. If a second set, for example, is to be used, then the enablement method 100 proceeds to step 640.

At step 624, the market information is retrieved by the control modules 74, and at step 626, the control modules 74 submit an API activation request to the GSM provisioning modules 96 associated with the first set. The enablement method 100 proceeds to step 628 to check the status of the API activation request, and at step 630, the control modules 74 check to identify whether the GSM provisioning system 66 has activated the GSM phone 28. The enablement method 100 preferably checks six times, once every three seconds, whether activation has occurred, looping back to step 628 each time a check is undertaken. Once activation has been achieved, the enablement method 100 proceeds to step 632, where additional service features may be added to the GSM phone 28 using the API. At step 634, the submission of additional features is checked for success, and if successful, the enablement method 100 proceeds to step 636, where the additional features are dialed into the GSM phone 28. The GSM provisioning system 66 initiates wireless communications with the GSM phone 28 for communicating with the SIM card thereof, and programming is uploaded to the SIM card relating to provisioning. In some embodiments of the invention, the GSM wireless network 70 may communicate a confirming USSD message to the GSM phone 28. The enablement method 100 proceeds from step 636 and step 634 to step 638, where the transaction ends.

At step 640, the market information is retrieved by the control modules 74, and at step 642, the control modules 74 submit an API activation request to the GSM provisioning modules 96 associated with the second set. The enablement method 100 proceeds to step 644 to get the result thereof and step 646 to identify if the request was successful. If the request was a failure, the enablement method 100 proceeds from step 646 to step 648 where the control modules 74 log a failure. If the request was successful, the enablement method 100 proceeds from step 646 to step 650 where the control modules 74 log a success.

It shall be clear to one skilled in the art that the systems and methods for enabling use of the prepaid wireless telephones 14 may relate to any subcombination of steps of the enablement method 100. For example, at least some embodiments of the invention may relate to any one or more of provisioning, loading, activating, and recharging. It is also noted that the terms and phrases "step [X]", "proceeds from step [X] to step [Y]", "skips from step [X] to step M", "substeps", "at step [X]", "loops to step [X]", etc. shall not be construed to limit the scope of the invention so as to require that certain features of the invention be implemented in a particular sequence. For example, the "steps" of the enablement method 100 may proceed in accordance with any suitable sequence and/or logic appreciated by one skilled in the art. In some embodiments of the invention, the logic of a single step may be distributed across multiple steps and/or multiple steps may be combined into a single step. Moreover, multiple steps may be processed at substantially the same step, such as when master server 20 has parallel processing capabilities.

Referring to FIGS. 9-20, screen shots are shown and shall be described in connection with the administrator interface modules 80 shown in FIG. 4 and the administrator workstation 42 shown in FIG. 1. The administrator interface modules 80 provide a graphical user interface (GUI), which the customer service representative or other administrator may access using the administrator workstation 42. As shown and described in connection with FIG. 1, the administrator workstation 42 is preferably local to the master server 20 and communicate therewith using via sockets. The administrator workstation 42 may be networked with the master server 20 on a reseller intranet, for example. However, the administrator workstation 42 and the administrator interface modules 80 may communicate by any suitable method and across any physical distance (e.g., between New York City, United States and New Delhi, India), such as a VPN connection established across any distance between the master server 20 and the administrator workstation 42. The administrator workstation 42 preferably has web browser software stored therein for communicating transaction information with the administrator interface modules 80 of the master server 20. The administrator interface modules 80 may also be accessible over the Internet at an address, such as one in the format, http://subdomain.domain.tld, or any other format known in the art.

Referring to FIGS. 9-17, the administrator interface modules 80 enable an interactive administrative display 700 having disposed therein a plurality of network status indicators 702, a transaction information spreadsheet 704 (shown with greater detail in FIGS. 18*a*-18*b*), and an interactive menu 706, each of which shall be discussed below in further detail. The interactive administrative display 700 also has disposed therein an interactive center panel, which is separately designated and discussed below in connection with FIGS. 9-17.

The network status indicators 702 preferably include a matrix of simulated LEDs. The matrix preferably includes nine simulated LEDs arranged in three columns and three rows. The columns are preferably labeled "TDMA", corresponding to the TDMA carrier system 44, "CDMA" corresponding to the CDMA carrier system 46, and "GSM" corresponding to the GSM carrier system 48, and the rows are preferably labeled "IVR/Web", "Activation", and "Recharge." Each of the simulated LEDs is capable of being displayed in one of the colors green, red, or yellow to indicate the status of the IVR/Web interfaces, the activation features, and the recharging features for a carrier network corresponding thereto. The representative meaning of each color may be assigned by the reseller operating the control system 12. It shall be understood that additional columns may be added to be representative of the status of carrier systems other than the TDMA carrier system 44, the CDMA carrier system 46, and the GSM carrier system 48.

The transaction information spreadsheet 704 has disposed therein the transaction information associated with multiple transactions enabling use of the prepaid wireless telephones 14. The transaction information spreadsheet 704 may be wider the screen it is displayed on, in which case the customer service representative may scroll the interactive administrative interface 700 to the right or left to view the right and left sections of the transaction information spreadsheet 704. Left and right sections of the transaction information spreadsheet 704 are discussed below with reference to FIG. 18a and FIG. 18b, respectively.

The interactive menu 706 has disposed therein a list of administrator-selectable function tabs, including a Single Activation Request, a Batch Activation Request, a Single Recharge Request, a Batch Recharge Request, a Single Credit Request, a transaction search filter ("Search Transactions"), an SID Search Filter, an Export Batch, and a Batch Monitor, each of which shall be discussed below with reference to FIGS. 9-17.

Figure 9:
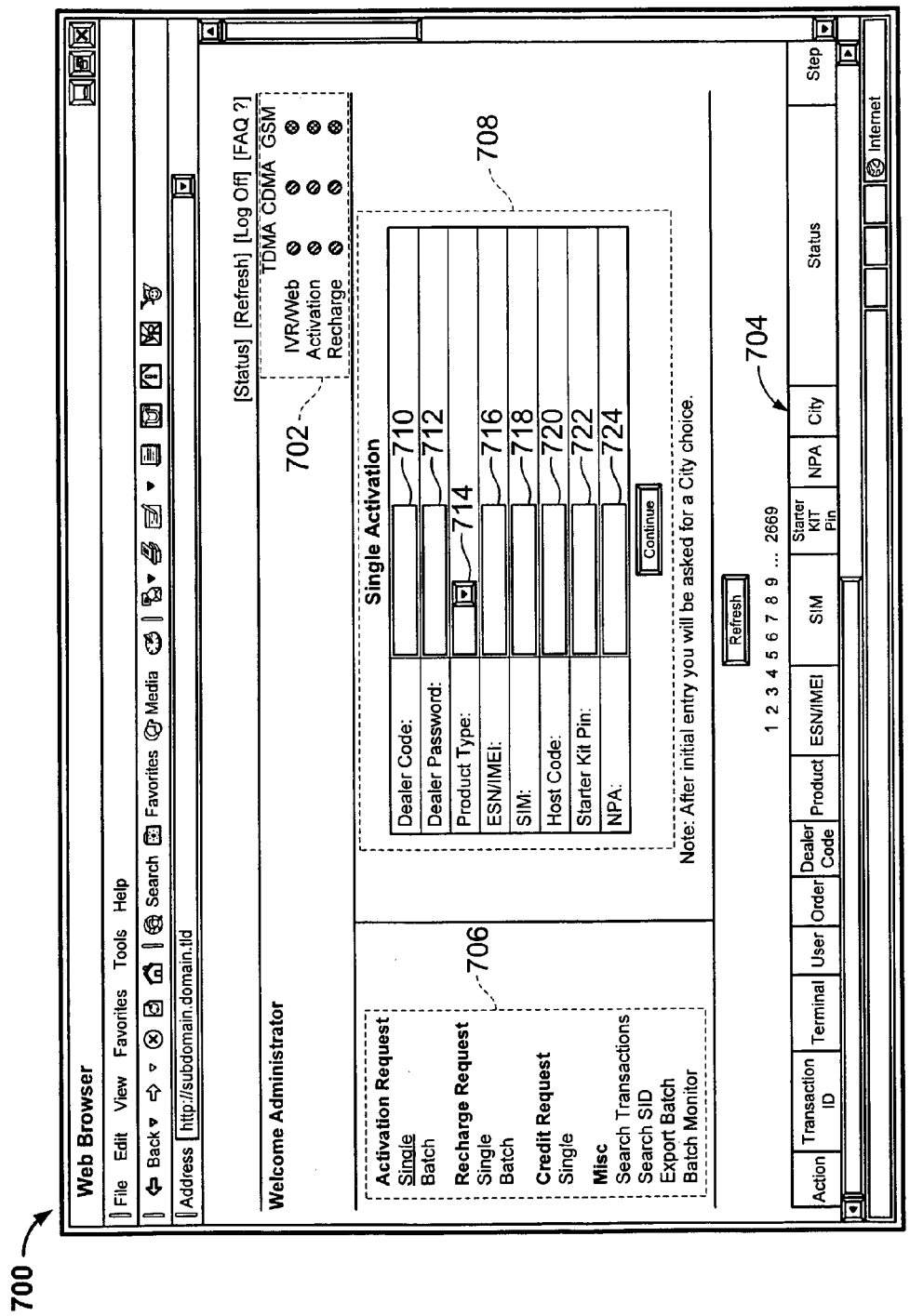
FIG. 9 is a screen shot of an interactive administrative display showing an interactive single activation panel, the interactive administrative display typically being scrollable to show a transaction spreadsheet, such as that of FIGS. 18a-b.

Referring to FIG. 9, the interactive administrative display 700 includes an interactive single activation panel 708 corresponding to the Single Activation Request tab of the interactive menu 706. The customer service representative may initiate activation of one of the prepaid wireless telephones 14 from the interactive single activation panel 708, which includes fields and drop-down menus. The interactive single activation panel 708 includes a dealer code field 710, a dealer password field 712, a product type drop-down menu 714, an ESN/IMEI field 716, a SIM field, a fast code field 720, a starter kit PIN field 722, and an NPA field. A customer service representative can use the interactive single activation panel 708 to activate (e.g. provision and load initial airtime minutes) one of the prepaid wireless telephones 14 by inputting information into some or all of the fields (and/or drop-down menus) and selecting "Continue". The customer service representative may then input the rate area and/or market in another screen (not shown).

Figure 10A:
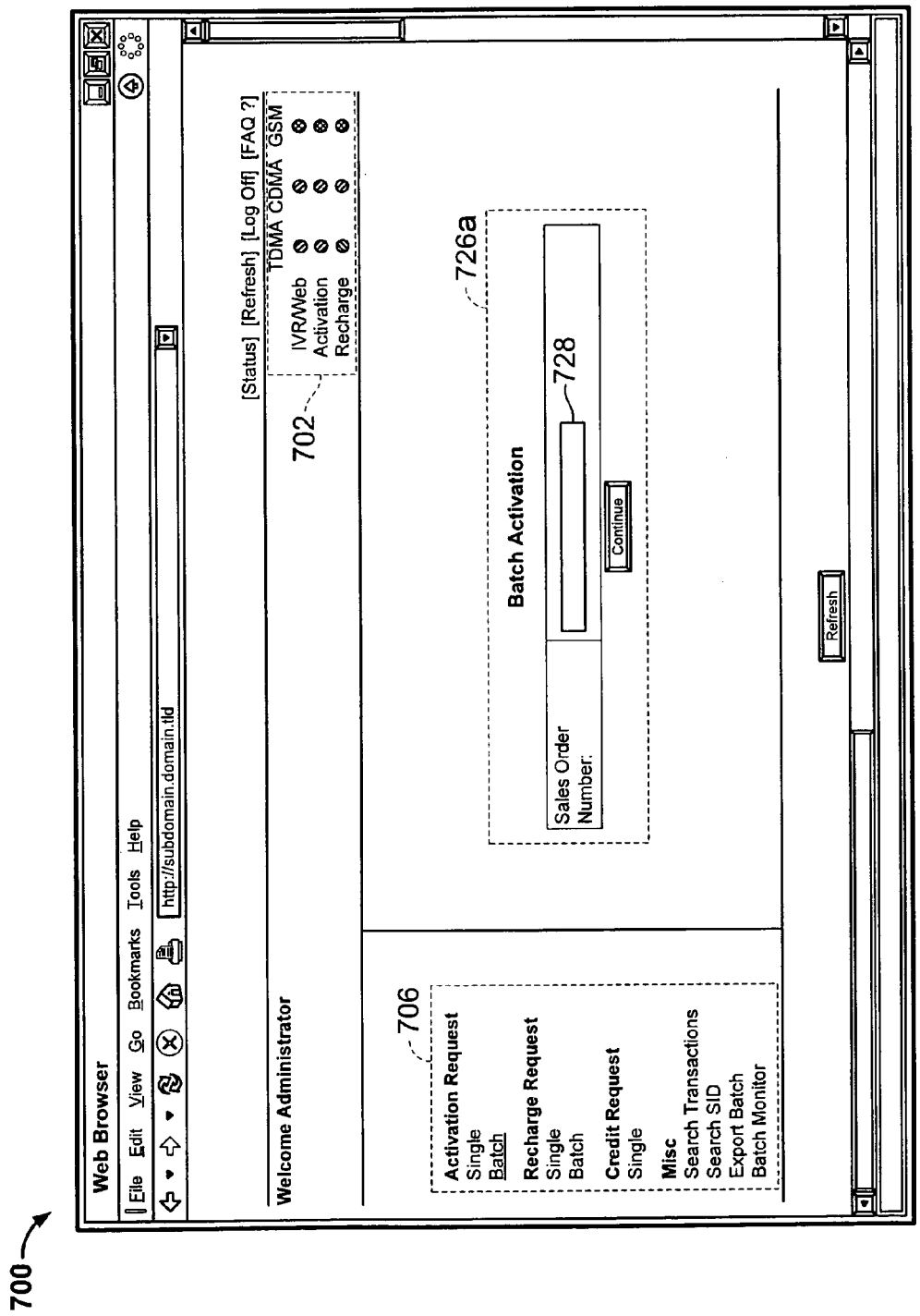
FIGS. 10a-b are screen shots of the interactive administrative display showing interactive batch activation panels.
Figure 10B:
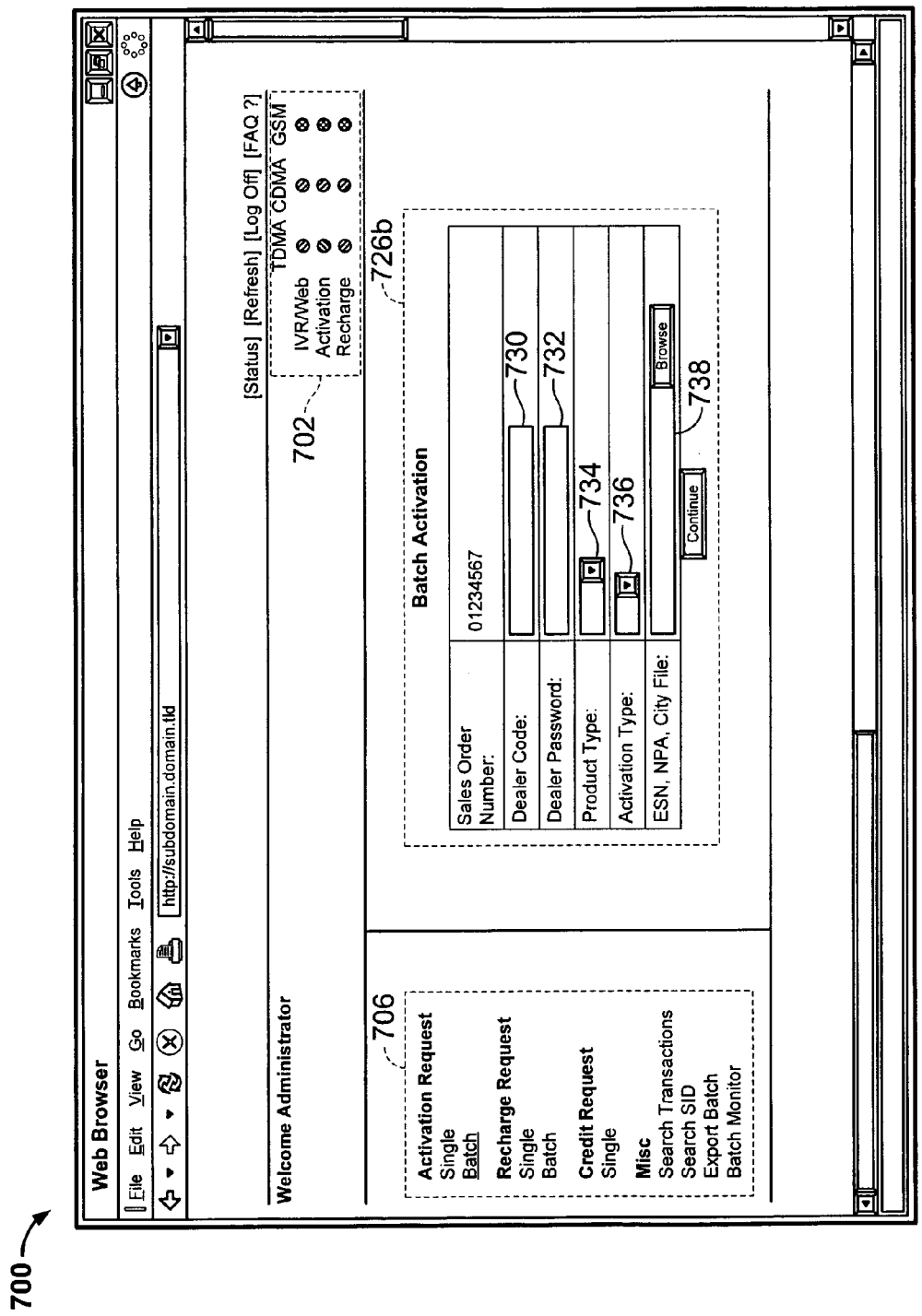

Referring to FIGS. 10a-b, the interactive administrative display 700 includes two interactive batch activation panels 726a, 726b, which correspond to the Batch Activation Request tab of the interactive menu 706. The customer service representative may initiate activation (e.g. provisioning and loading of initial airtime minutes) of a plurality of the prepaid wireless telephones 14 associated with a dealer sales order number from the interactive batch activation panels 726a, 726b. At the first interactive batch activation panel 726a, the customer service representative inputs the dealer sales order number into a sale order number field 728 and selects "Continue". Then, at the second interactive batch activation panel 726b, the customer service representative inputs corresponding information into a dealer code field 730, a dealer password field 732, a product type drop-down menu 734, an activation type drop-down menu 736, and an ESN, NPA, and/or rate area search field 738 where the customer service representative can upload a file containing, for example, ESNs, NPAs, and city names.

It is noted that many of the fields discussed herein shall be disposed in more than one of the interactive center panels; however each of said fields are separately designated herein for reference purposes. For example, the interactive single activation panel 708 has the dealer code field 710, while the interactive batch activation panel 726b has the dealer code field 730. Although the dealer code fields 710, 730 have similar attributes, they may be used in a different context.

Figure 11:
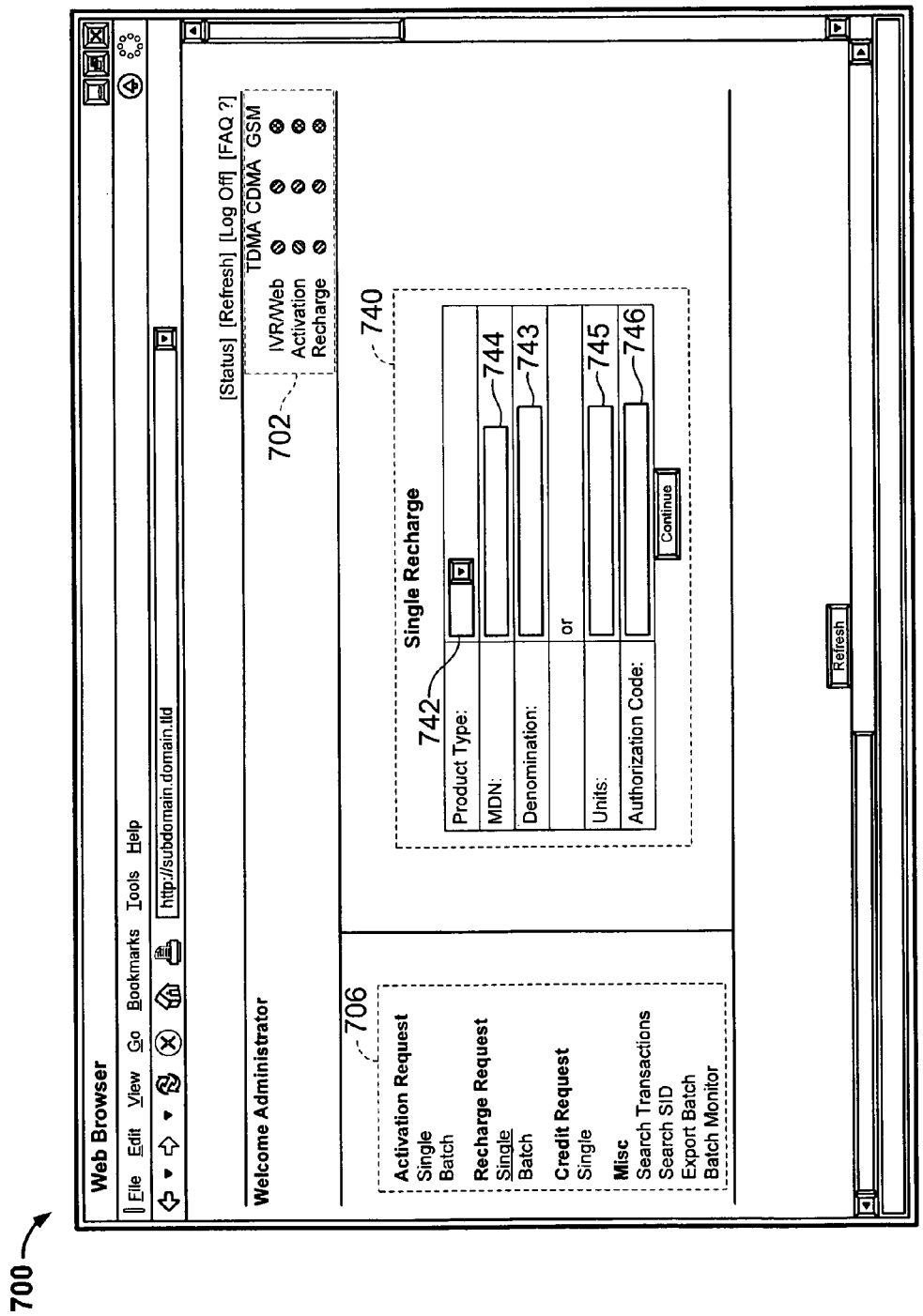
FIG. 11 is a screen shot of the interactive administrative display showing an interactive single recharge panel.
Figure 12:
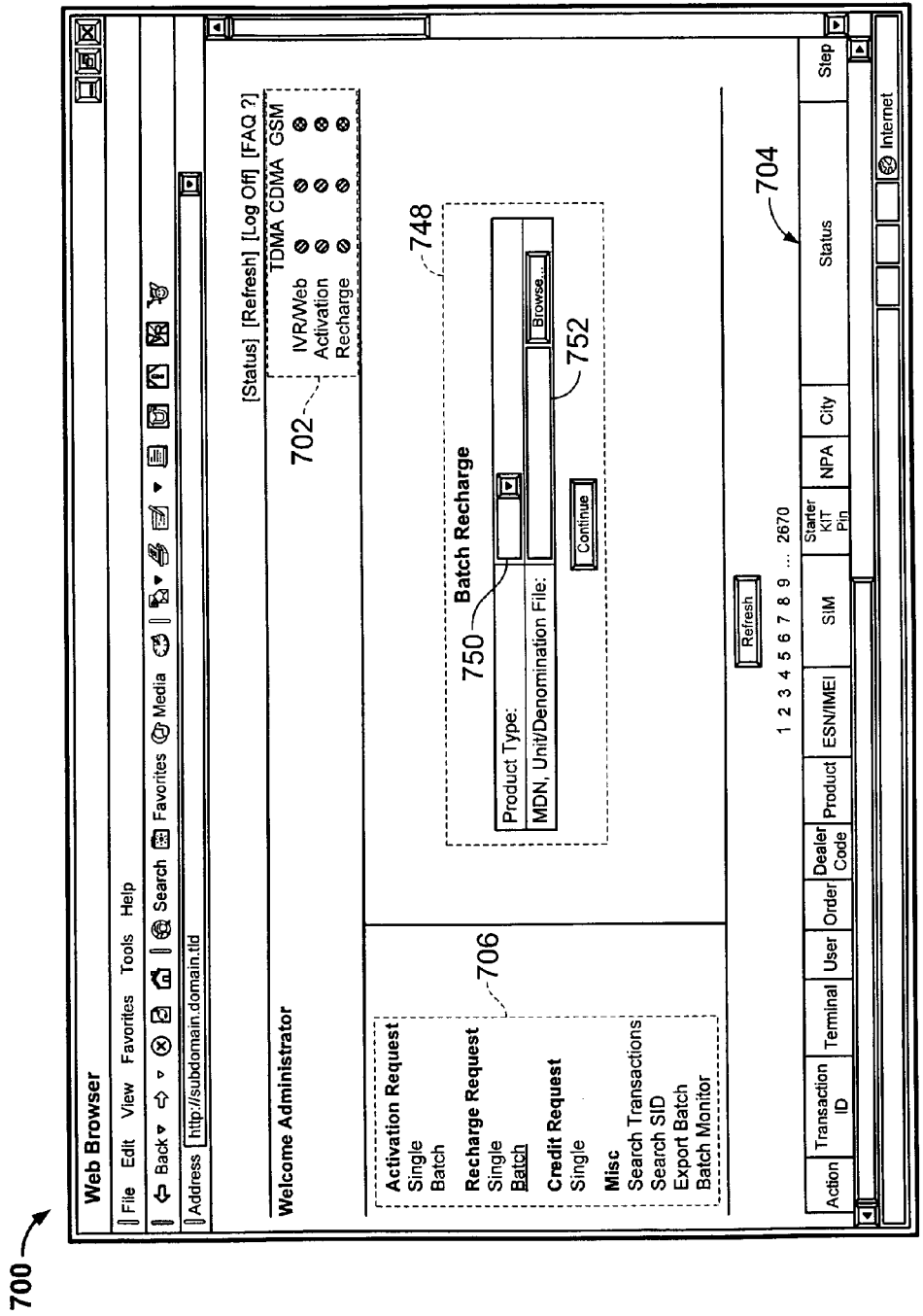
FIG. 12 is a screen shot of the interactive administrative display showing an interactive batch recharge panel.

Referring to FIG. 11, the interactive administrative display 700 includes an interactive single recharge panel 740 which corresponds to the Single Recharge Request tab of the interactive menu 706. The customer service representative may initiate a recharge (loading of airtime minutes) of one of the prepaid wireless telephones 14. At the interactive single recharge panel 740, the customer service representative inputs corresponding information into a product type field 742, an MDN field 744, and an authorization code 746 for the recharge. The customer service representative also input the amount of airtime minutes to be added in either a denomination field 743 or a units field 745, depending on the way in which the carrier systems 16 measure airtime minutes. For example, the CDMA carrier system 46 and the GSM carrier system 48 might require that a denomination be provided, where the TDMA carrier system 44 might require that units be provided. Referring to FIG. 12, a batch recharge request may be initiated from an interactive batch recharge panel 748 of the interactive administrative display 700, which corresponds to the Batch Recharge Request tab of the interactive menu 706. The interactive batch recharge panel is shown in FIG. 12 to include a product type drop-down menu 750 and an MDN, Unit/Denomination search field 752 and may be used to initiate the loading of airtime minutes into a plurality of accounts.

Figure 13:
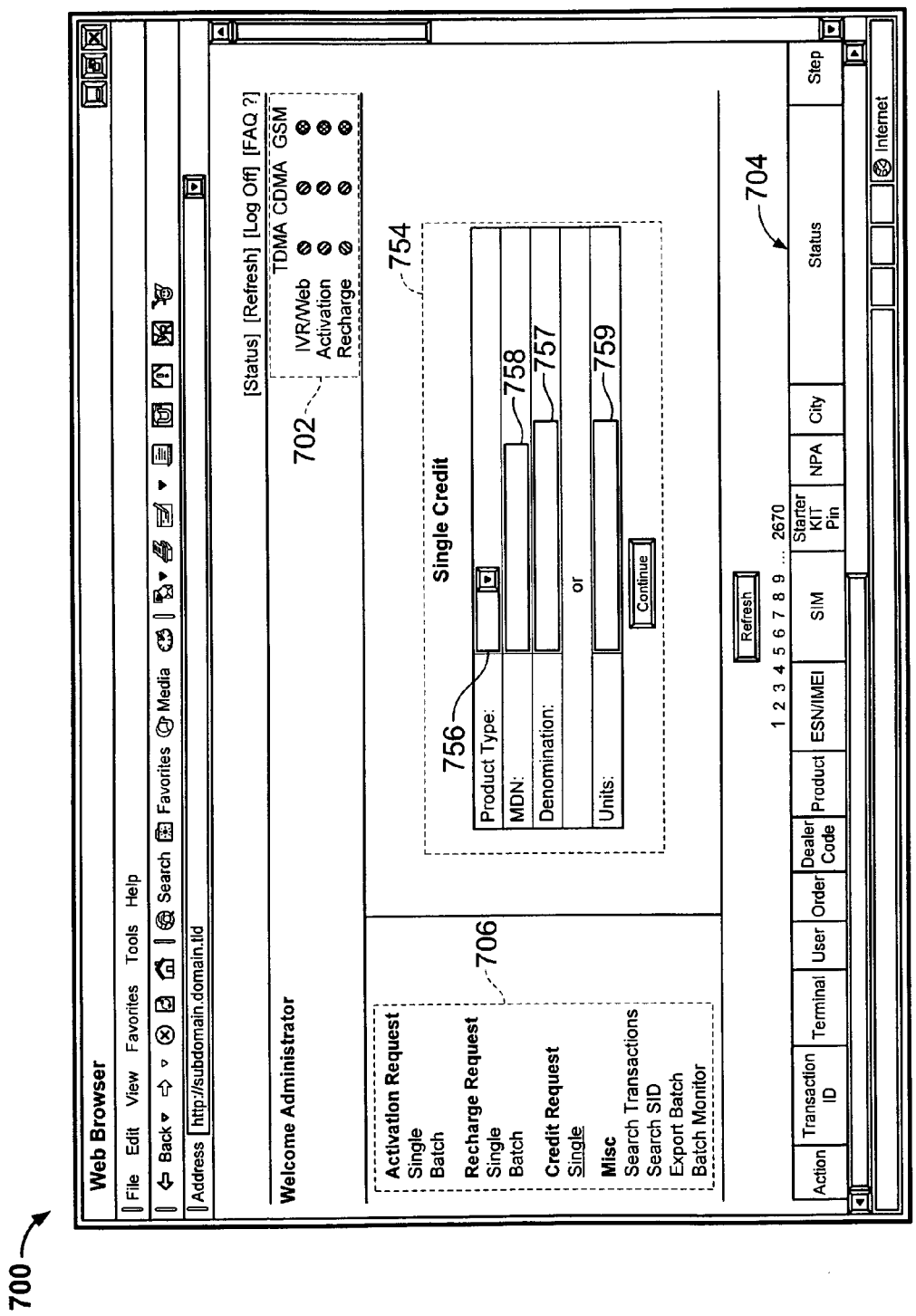
FIG. 13 is a screen shot of the interactive administrative display showing an interactive credit request panel.

Referring to FIG. 13, a credit request may be initiated from an interactive credit request panel 754 of the interactive administrative display 700, which corresponds to the Single Credit Request tab of the interactive menu 706. A credit may be appropriate, for example, when a user has been disconnected from a call, and requests a "refund" of airtime minutes. To initiate the credit, the customer service representative selects and/or inputs corresponding information into a product type drop-down menu 756 and an MDN field 758. The customer service representative also provides the airtime amount of the credit in either a denomination field 757 or a units field 759, depending on the preferences of the corresponding carrier.

Figure 14:
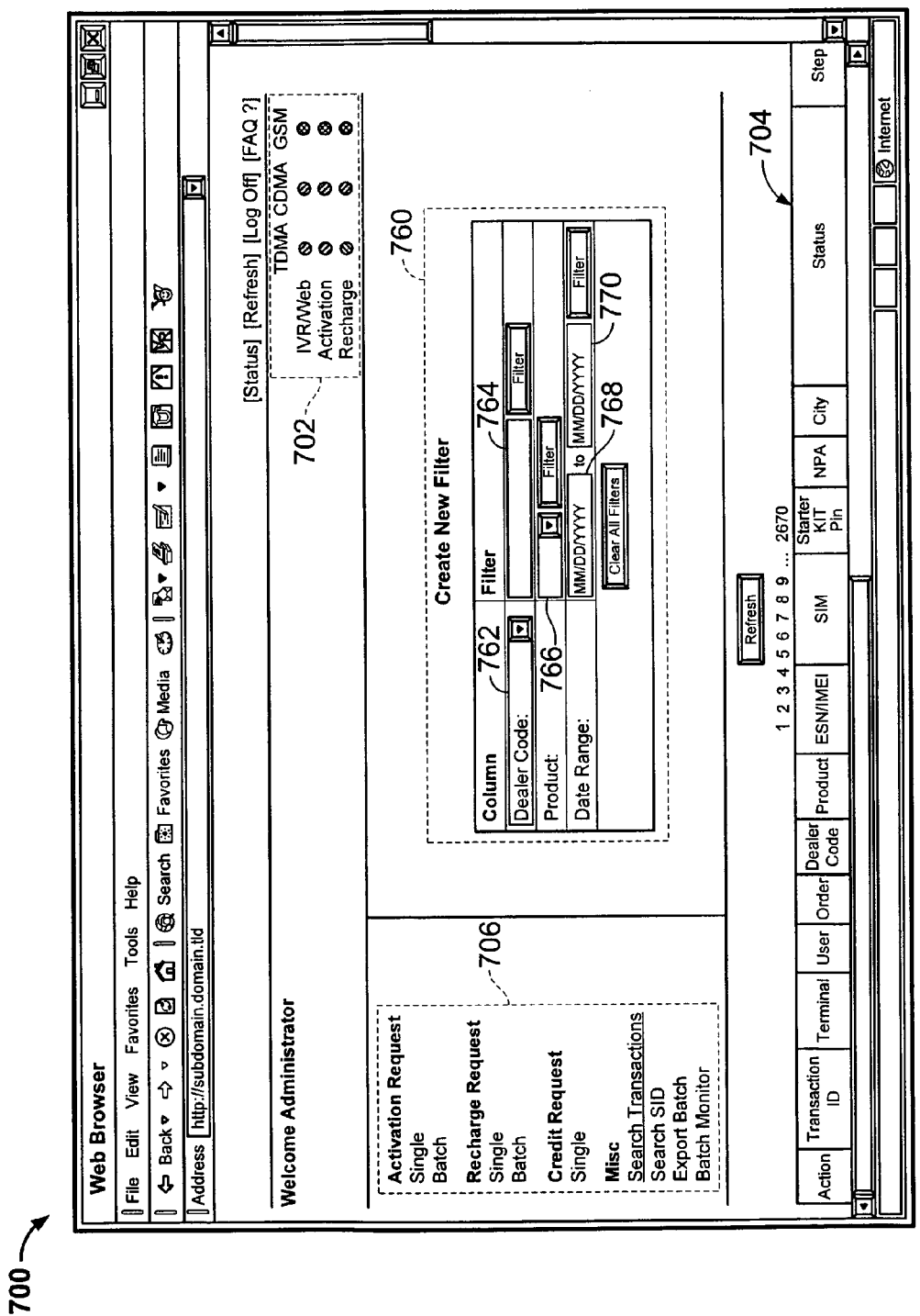
FIG. 14 is a screen shot of the interactive administrative display showing an interactive filter panel.
Figure 15:
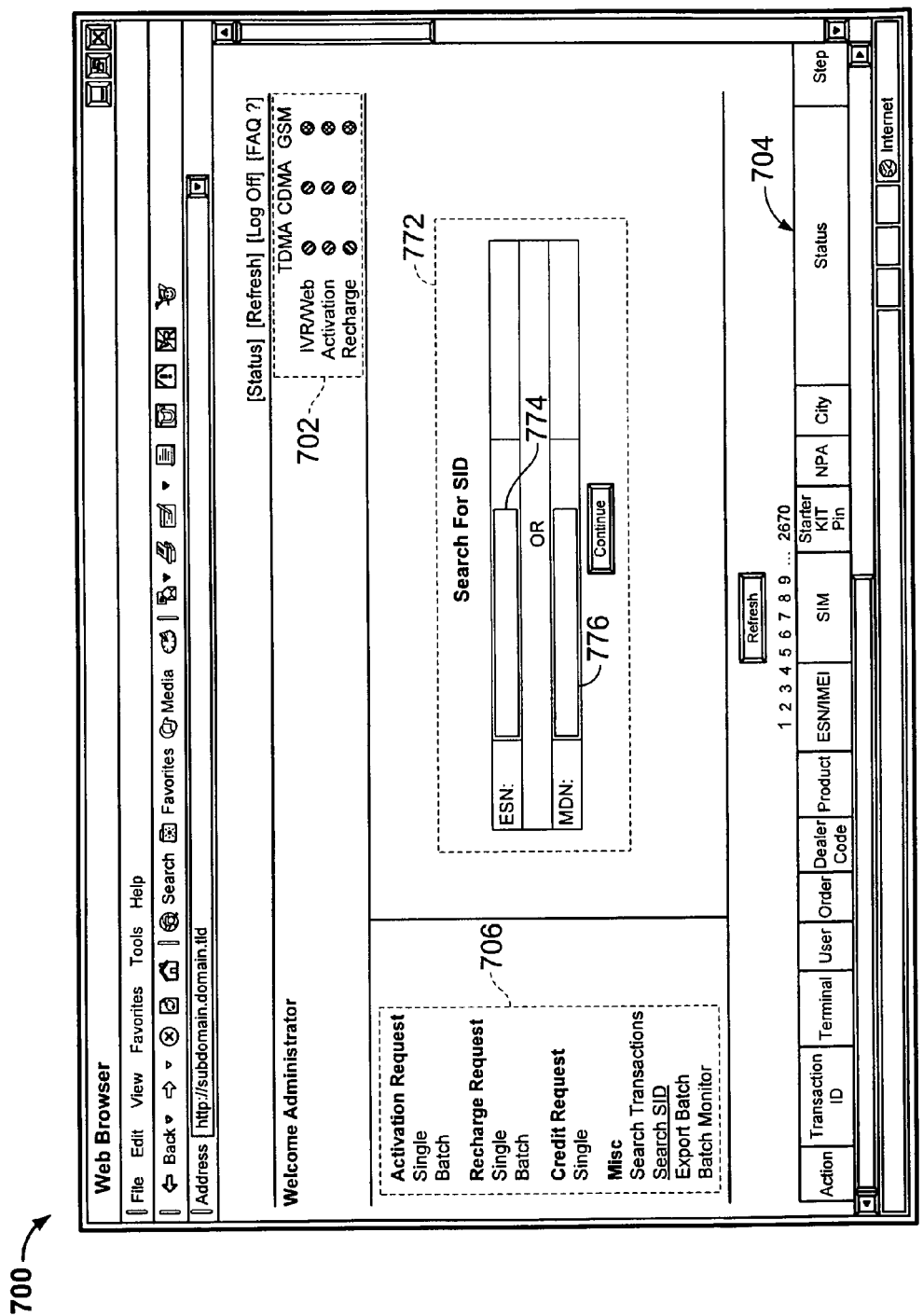
FIG. 15 is a screen shot of the interactive administrative display showing an interactive carrier-specific filter panel.

Referring to FIGS. 14 and 15, the customer service representative can review the transaction records and/or the preliminary data records associated with the successful and failed transactions using one of a plurality of filtering methods. For example, as shown in FIG. 14, the interactive administrative display 700 includes an interactive filter panel 760 corresponding to the Search Transactions tab of the interactive menu 706, which allows the user to query the transaction records and/or preliminary data records by inputting information into a dealer code drop-down menu 76, a filter field 764, a product type drop-down menu 766, and a plurality of record date range fields 768, 770. FIG. 15 shows the interactive administrator display 700 having a sample interactive carrier-specific filter panel 772, in which the user can search for an SID, which is a transaction-related value relating to certain CDMA carrier system(s). The sample interactive carrier-specific filter panel 772 corresponds to the Search SID tab of the interactive menu 706 and allows the customer service to search for the SID by inputting corresponding information into an ESN field 774 and/or a MDN field 776.

Figure 16:
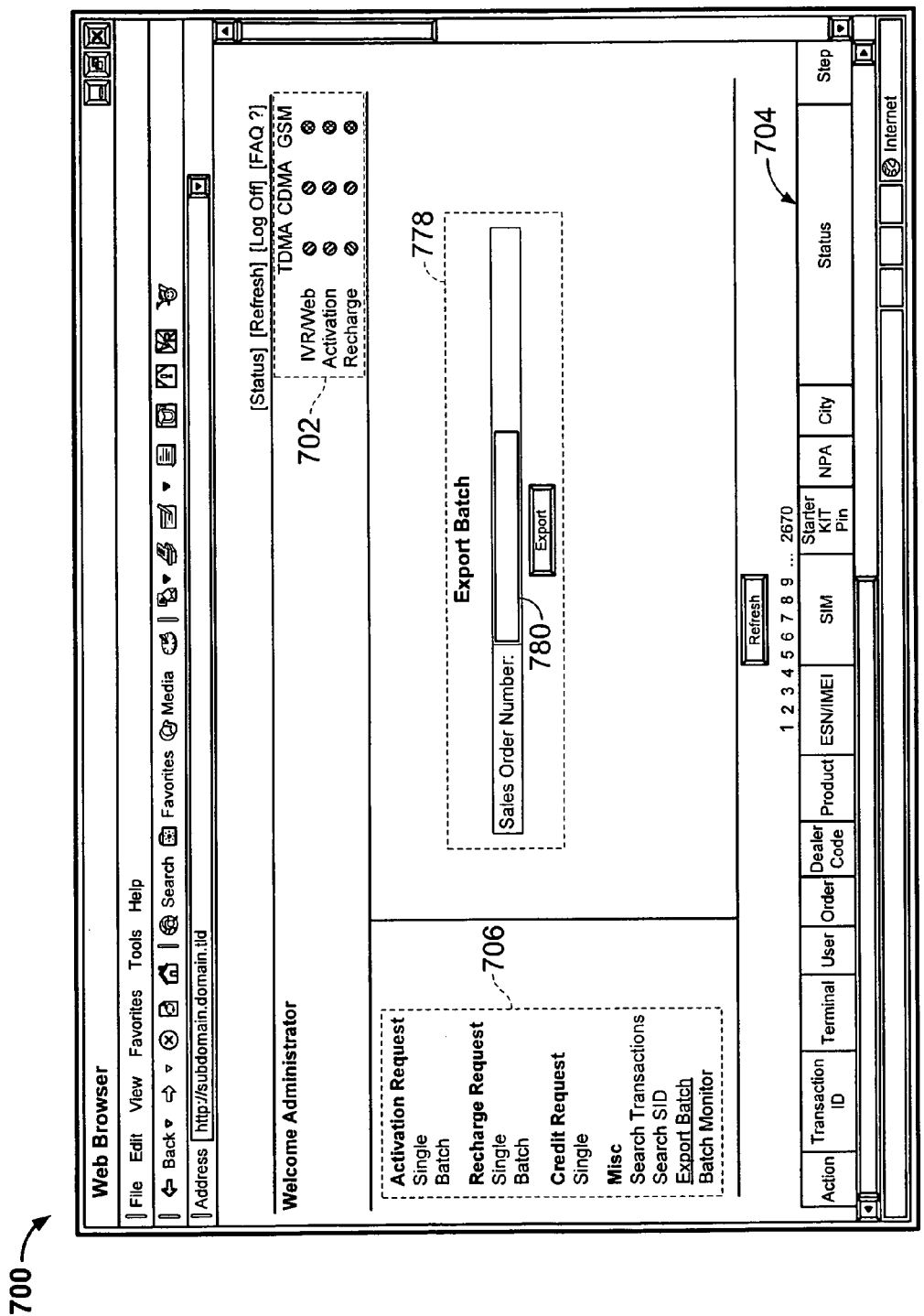
FIG. 16 is a screen shot of the interactive administrative display showing an interactive export batch panel.
Figure 17:
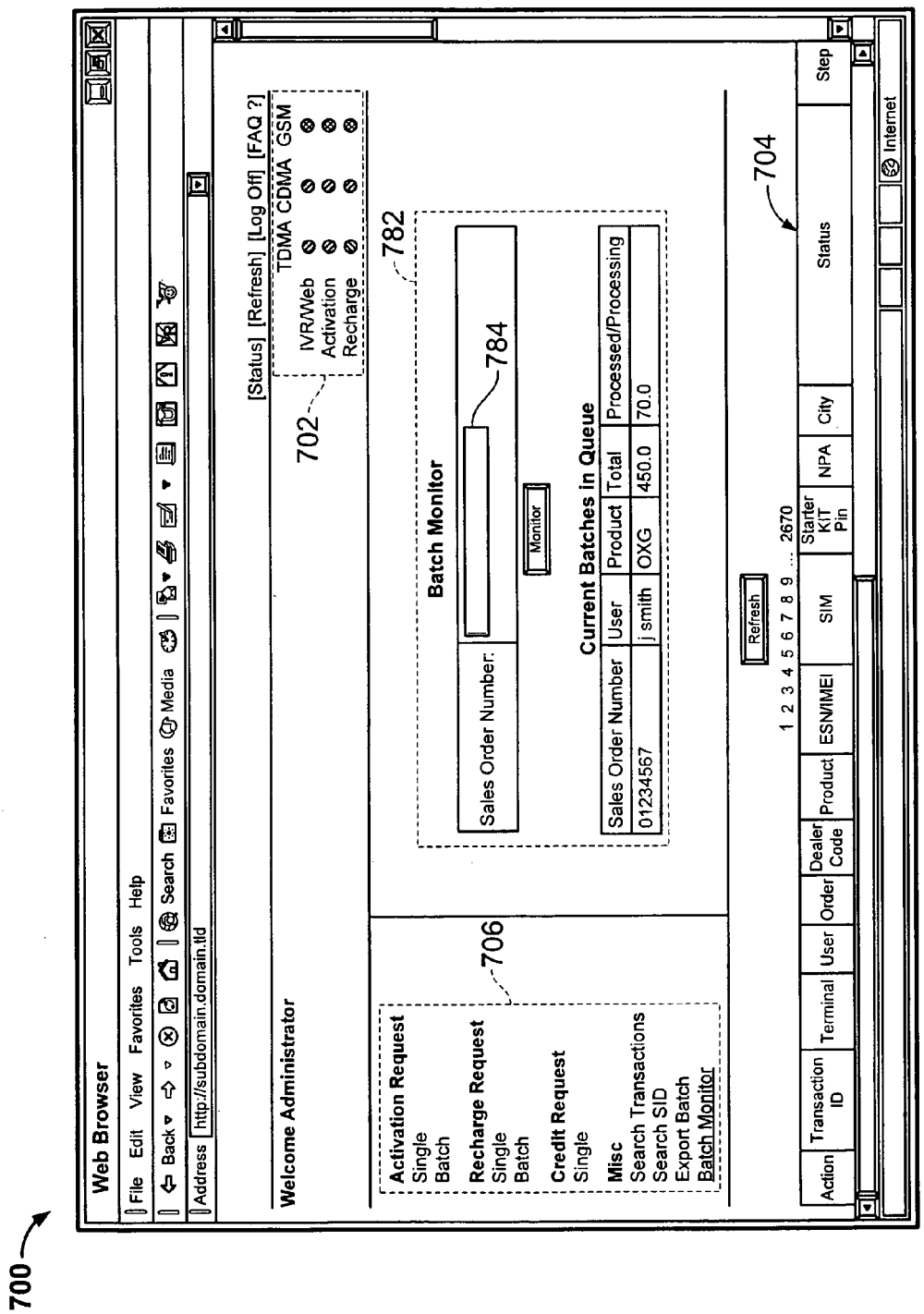
FIG. 17 is a screen shot of the interactive administrative display showing an interactive single recharge panel.

Referring to FIGS. 16 and 17, the customer service representative may enter a search query by order number in order to view the transaction associated therewith and/or export the transaction information to another application. In this regard, FIG. 16 shows an interactive export batch panel 778 corresponding to the Export Batch tab of the interactive menu 706, which allows the customer service number to input a sales order into a sales order field 780 to export transaction information corresponding thereto. FIG. 17 shows an interactive batch monitoring panel 782 corresponding to the Batch Monitor tab of the interactive menu 706, which allows the customer service representative to input a sales order into a search order field 784 to search for information corresponding thereto.

Figure 18A:
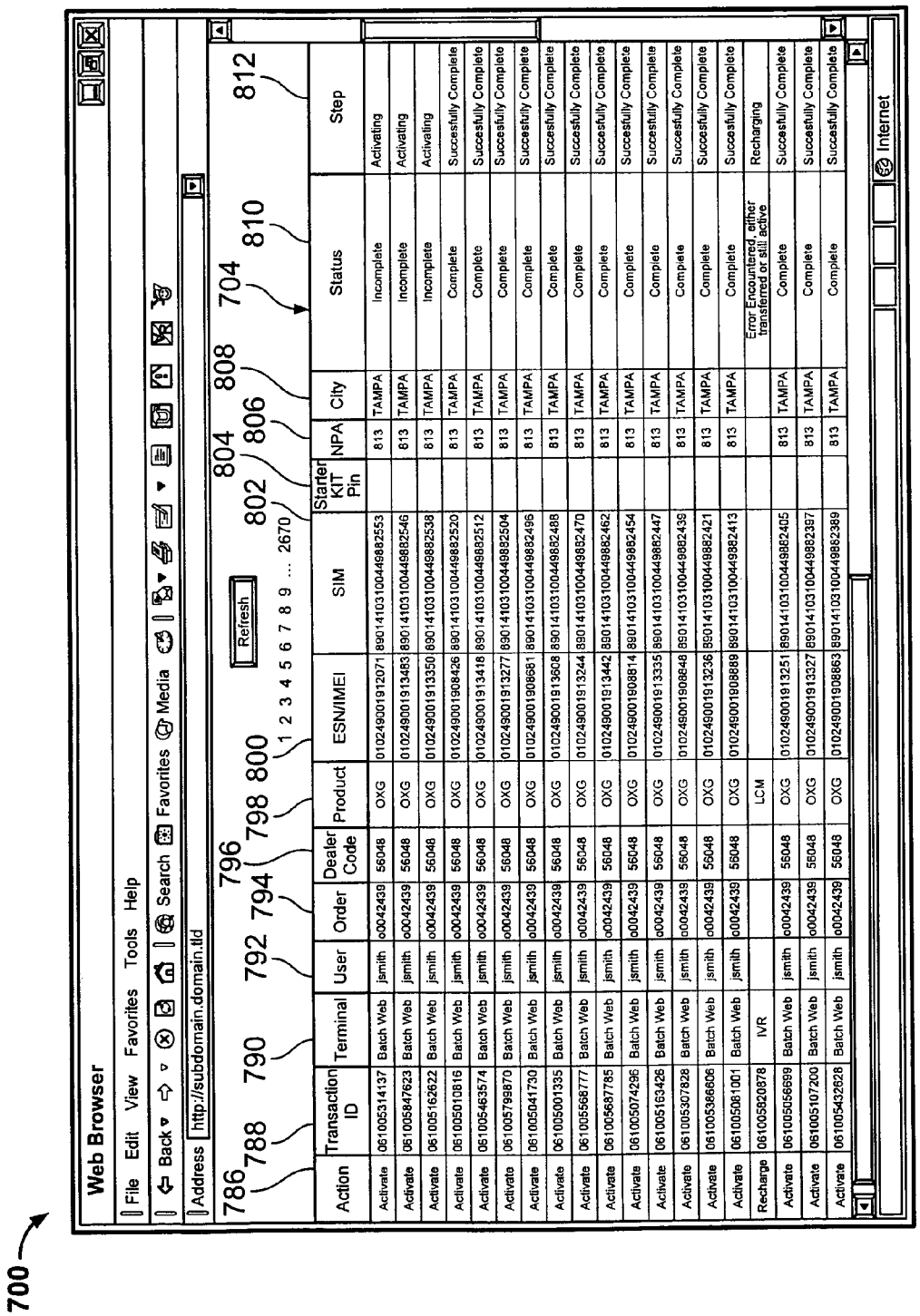
FIGS. 18a-b are screen shots of the interactive administrative display showing the transaction spreadsheet.
Figure 18B:
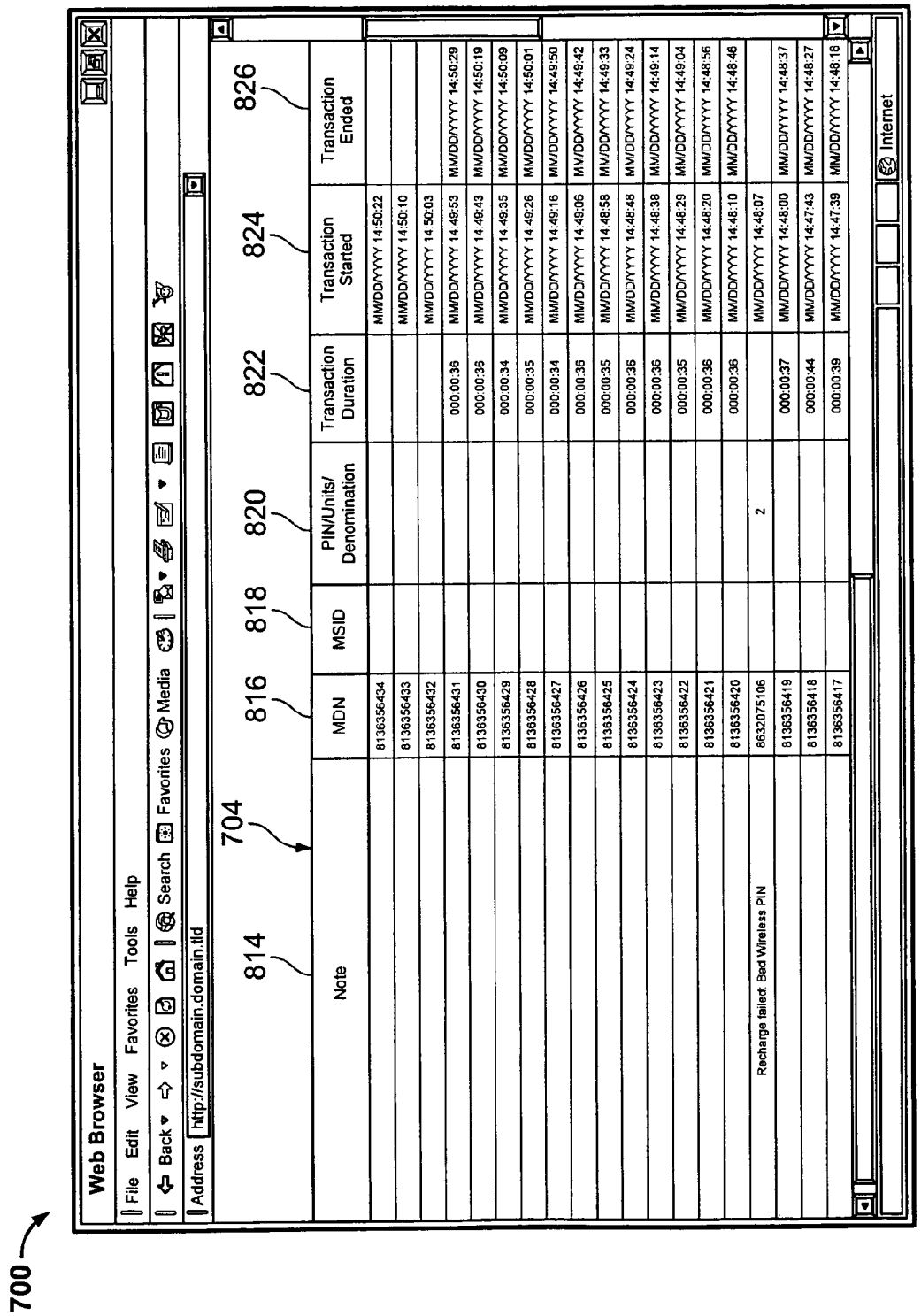

Referring to FIGS. 18*a*-*b*, the transaction information spreadsheet 704 is shown and described in further detail. The transaction information spreadsheet 704 is a representation of transaction information and, as shown, the transaction information spreadsheet 704 is disposed under the "Refresh" button, which is also shown in FIGS. 9-17. The transaction information spreadsheet 704 may, as shown, be so wide, so that the customer service representative is to scroll left and right to view the transaction information contained therein. For example, the transaction information spreadsheet 704 may include a left section, such as that shown in FIG. 18*a* and a right section, such as that shown in FIG. 18*b*.

The transaction record spreadsheet 704 preferably has disposed therein rows of information, each row being associated with a particular transaction. The columns of the transaction record spreadsheet 704 preferably correspond to a specific type of transaction information associated therewith. For example, referring to FIG. 18*a*, the transaction record spreadsheet 704 may include an action column 786 to indicate whether activation, recharge, or other action took place, a transaction ID column 788, a terminal column 790 to indicate which one of the client systems 16 were used for the action, a user name column 792 to indicate the identify of a customer service representative, an order number column 794, a dealer code column 796, a product type column 798, an ESN/IMEI column 800, a SIM number column 802, a starter kit PIN column 804, an NPA column 806, a city column 808 to indicate the city, rate area, and/or market, a status column 810, and a step column 812 to indicate the progress of a transaction. Continuing with the example, and referring to FIG. 18*b*, the transaction record spreadsheet 704 may include a notes column 814 to indicate inputted notes by the master server 20 of the customer service representative, an MDN column 816, an MSID column 818 (and/or a MIN column), a PIN/Units/Denomination column 820, a transaction duration column 822, a transaction started column 824 for indicating the start time and date of the transaction, and a transaction ended column 826 for indicating the end time and date of the transaction.

Referring to FIG. 19, the administrator interface modules 80 may provide a client stat monitor 900 to the administrator workstation 42 for display to the customer service representative or other administrator. The client stat monitor 900 includes a web stat monitor 902 and an IVR stat monitor 904. The web stat monitor 902 displays statistical web-based information derived from the transaction information associated with transactions initiated by web clients, such as the consumer web client system 34 and the dealer web client system 36. The IVR stat monitor 904 display statistical IVR-based information derived from the transaction information associated with transactions initiated by IVR clients, such as the telephone client system 32.

The control modules 74 derive the statistical IVR-based information and the statistical web-based information from transaction received from the IVR modules 76 and the web interface modules 78, and then pass the statistical IVR-based information and statistical web-based information to the administrator interface modules 80. The statistical IVR-based information and the statistical web-based information are arranged by carrier (e.g., the TDMA carrier system 44, the CDMA carrier system 46, the GSM carrier system 48, etc.) and by time period (e.g. the previous one hour period, the previous one day period, etc.). The web stat monitor 902 and the IVR stat monitor 904 preferably display statistical web-based information and statistical IVR-based information, respectively, such as the average duration of a transaction, the total number of attempted transactions, the number of attempted transactions that were successful, the number of attempted transactions that terminate or were incomplete, the percent of total attempted transactions that were successful, and the time of the last action. The client stat monitor 900 preferably also includes a stat table 904, and in this regard, the customer service representative can select statistical web-based information and/or statistical IVR-based information for display in a table format therein.

Referring to FIG. 20, the administrator interface modules 80 may also provide an action stat monitor 950 to the administrator workstation 42 for display to the customer service representative or other administrator. The action stat monitor 900 includes a provisioning stat monitor 952, a loading stat monitor 954, and a recharge/credit stat monitor 956. The provisioning stat monitor 952 displays statistical provisioning-related information derived from the transaction information associated with provisioning one of the prepaid wireless telephones 14, the loading stat monitor 954 displays statistical loading-related information derived from the transaction information associated with loading initial/promotional airtime minutes onto the account associated therewith, and the recharge/credit stat monitor 956 displays statistical recharge- and/or credit-related information derived from the transaction information associated with loading additional airtime minutes onto the account. The statistical information is preferably arranged by carrier and time period.

It is noted that the enablement method 100 and the control system 12, have been herein described with particular attention to the IVR modules 76 and the IVR system 24, as well as the administrator interface modules 80 and the administrator workstation 42. However, it shall be clear to one skilled in the art that embodiments of the invention may be implemented and/or constructed in connection with the web interface modules 78, the consumer web client system 32, and the dealer web client system 34. By way of nonlimiting example, the master server 20 may host a web site having different areas, wherein some of the areas are accessible by consumers and some of the areas are accessible by dealers.

It will also be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention as defined in the appended claims.

What is claimed is:

1. A method for enabling use of wireless telephones in connection with a plurality of carrier systems with the use of a control system, which includes a plurality of sets of stored procedures, each of the sets of stored procedures being configured for enabling use of wireless telephones in connection with a specific one of the plurality of carrier systems, the method comprising the steps of: receiving at a control system from a first client system a first request, including transaction information, for enabling usage of a first wireless telephone; determining that the first request is associated with a first one of the plurality of carrier systems; processing at least part of the first request at the control system in accordance with a first one of the sets of stored procedures corresponding to the first one of the plurality of carrier systems; sending at least part of the first request from the control system to the first one of the plurality of carrier systems such that usage of the first wireless telephone is enabled; receiving from a second client system a second request including transaction information for enabling usage of a second wireless telephone; determining that the second request is associated with a second one of the plurality of carrier systems; processing at least part of the second request in accordance with a second one of the sets of stored procedures corresponding to the second one of the plurality of carrier systems; and sending at least part of the second request from the control system to the second one of the plurality of carrier systems such that usage of the second wireless telephone is enabled.

2. The method of claim 1, wherein the first request is for recharging additional airtime minutes to an account associated with the first wireless telephone, and wherein said step of sending at least part of the first request includes the step of sending at least part of the first request to the first one of the plurality of carrier systems such that the first one of the plurality of carrier systems is caused to automatically recharge the account with the additional airtime minutes.

3. The method of claim 1, wherein the first request includes at least one code associated with the promotional airtime minutes, and wherein said step of sending at least part of the first request includes the step of sending at least part of the first request to the first one of the plurality of carrier systems such that the first one of the plurality of carrier systems is caused to automatically load the promotional airtime minutes onto an account associated with the first wireless telephone.

4. The method of claim 1, wherein each of the plurality of carrier systems is associated with one of a plurality of communication protocols, each of which is one of a TDMA communication protocol, a GSM communication protocol, and a CDMA communication protocol.

5. The method of claim 1, wherein the first client system includes a telephone client system, and the control system includes an IVR system, said step of receiving the first request including the ststep of receiving the first request from the telephone client system at the IVR.

6. The method of claim 1, wherein the first client system includes a web client system, and the control system includes a server, said step of receiving the first request including the step of receiving the first request from the web client system at the server.

7. The method of claim 1, wherein said step of receiving the first request includes: (a) if the first client system is a telephone client system, receiving the first request at the control system from the telephone client system, and (b) if the first client system is a web client system, receiving the first request at the control system from the web client system.

8. The method of claim 1, wherein said step of processing at least part of the first request includes the step of validating at least part of the transaction information of the first request received against additional transaction information.

9. The method of claim 1, wherein said step of processing at least part of the first request includes the step of detecting a fraudulent attempt at enabling usage of the first wireless telephone by comparing at least part of the transaction information of the first request against additional transaction information.

10. The method of claim 1, wherein said step of processing at least part of the first request includes the step of processing the first request to include additional transaction information associated with the transaction information of the first request.

11. The method of claim 1, wherein the first request is for provisioning the first wireless telephone, and wherein said step of sending at least part of the first request includes the step of sending at least part of the first request to the first one of the plurality of carrier systems such that the first one of the plurality of carrier systems is caused to automatically provision the first wireless telephone.

12. The method of claim 1, wherein the first request is for activating the first wireless telephone, and wherein said step of sending at least part of the first request includes the step of sending at least part of the first request to the first one of the plurality of carrier systems such that the first one of the plurality of carrier systems is caused to automatically activate the first wireless telephone.

13. The method of claim 1, wherein the first request is for loading airtime minutes onto an account associated with the first wireless telephone, and wherein said step of sending at least part of the first request includes the step of sending at least part of the first request to the first one of the plurality of carrier systems such that the first one of the plurality of carrier systems is caused to automatically load the airtime minutes onto the account.

14. The method of claim 1, wherein at least part of the first one of the sets of stored procedures corresponding to the first one of the plurality of carrier systems constitutes at least part of the second one of the sets of stored procedures, the second one of the sets of stored procedures being configured to enable usage of the second wireless telephone in connection with the second one of the plurality of carrier systems.

15. A control system for enabling use of wireless telephones in connection with a plurality of carrier systems, the control system comprising: a network interface device; and an electronic processor including a plurality of sets of stored procedures, each of said sets of stored procedures being configured for enabling use of wireless telephones in connection with a specific one of the plurality of carrier systems, said electronic processor being operative to receive from a first client system through said network interface device a first request, including transaction information, for enabling usage of a first wireless telephone corresponding to a first one of the plurality of carrier systems, said electronic processor being operative to process at least part of the first request in accordance with a first one of said sets of stored procedures corresponding to the first one of the plurality of carrier systems and being further operative to cause at least part of the first request to be sent to the first one of the plurality of carrier systems such that usage of thefirst wireless telephone is enabled; and wherein said electronic processor is operative to receive from a second client system through said network interface device a second request, including transaction information, for enabling usage of a second wireless telephone corresponding to a second one of the plurality of carrier systems, said electronic processor being operative to process at least part of the second request in accordance with a second one of said sets of stored procedures corresponding to the second one of the plurality of carrier systems and being further operative to cause at least part of the second request to be sent to the second one of the plurality of carrier systems such that usage of the second wireless telephone is enabled.

16. The control system of claim 15, comprising a memory device that at least temporarily includes the stored procedures.

17. The control system of claim 15, wherein said first client system includes a web client system; and wherein said network interface device is operative to receive the first request from said web client system and, to send at least part of the first request to the first one of the plurality of carrier systems such that usage of the first wireless telephone is enabled.

18. The control system of claim 15, wherein said network interface device includes an IVR system operative to receive the first request from a telephone client system.

19. The control system of claim 18, comprising a second network interface device operative to send at least part of the first request to the first one of the plurality of carrier systems such that usage of the first wireless telephone is enabled.

20. The control system of claim 15, wherein the first request is for at least one of provisioning the first wireless telephone, activating the first wireless telephone, loading airtime minutes onto an account associated with the first wireless telephone, and recharging the account with additional airtime minutes.

21. The control system of claim 15, wherein said electronic processor is operative to selectively associate the first one of the plurality of carrier systems with the first request, and wherein each of the plurality of carrier systems is associated with one of a plurality of communication protocols, each of which is one of a TDMA communication protocol, a GSM communication protocol, and a CDMA communication protocol.

22. The control system of claim 15, wherein at least part of said first one of said sets of stored procedures corresponding to the first one of the plurality of carrier systems constitutes at least part of said second one of said sets of stored procedures, said second one of said sets of stored procedures being configured to enable usage of the second wireless telephone in connection with the second one of the plurality of carrier systems.

* * * * *